United States Patent [19]
Erskine

[11] Patent Number: 6,115,121
[45] Date of Patent: *Sep. 5, 2000

[54] SINGLE AND DOUBLE SUPERIMPOSING INTERFEROMETER SYSTEMS

[75] Inventor: David J. Erskine, Oakland, Calif.

[73] Assignee: The Regents of the University of California, Oakland, Calif.

[*] Notice: This patent is subject to a terminal disclaimer.

[21] Appl. No.: 08/963,682

[22] Filed: Oct. 31, 1997

[51] Int. Cl.[7] ........................................................ G01B 9/02
[52] U.S. Cl. ............................ 356/345; 356/28.5; 356/352
[58] Field of Search .................... 356/345, 346, 356/351, 352, 357, 359, 28.5

[56] References Cited

U.S. PATENT DOCUMENTS 5,642,194   6/1997   Erskine .................................... 356/345

OTHER PUBLICATIONS

Rernhard Beer, "Remote Sensing by Fourier Transform Spectrometry," John Wiley & Sons, New York, 1992, QD96.F68B415, p. 17.

P. Connes, "L'Etalon de Fabry–Perot Spherique," Le Journal De Physique et le Radium, 19, pp. 262–269, 1958.

R. L. Hilliard and G. G. Shepherd, "Wide Angle Michelson Interferometer for Measuring Doppler Line Widths," J. Opt. Soc. Am., vol. 56, No. 3, pp. 362–369, Mar. 1966.

S. Gidon and G. Behar, "Multiple–line laser Doppler velocimetry," Applied Optics, vol. 27, No. 11, pp. 2315–2319, 1988.

Pierre Connes, "Deuxieme Journee D'Etudes Sur Les Interferences," Revue D'Optique Theorique Instrumentale, vol. 35, p. 37, Jun. 1956.

Book by Eugene Hecht and Alfred Zajac, "Optics," Addison Wesley, Reading Massachusetts, pp. 307–309, 1976.

David J. Erskine and Neil C. Holmes, "White Light Velocity," Nature, vol. 377, pp. 317–320, Sep. 28, 1995.

David J. Erskine and Neil C. Holmes, "Imaging White Light VISAR," Proceedings of 22nd International Congress on High–speed Photography and Photonics, October 1996.

*Primary Examiner*—Samuel A. Turner
*Attorney, Agent, or Firm*—John P. Wooldridge; Alan H. Thompson

[57] ABSTRACT

Interferometers which can imprint a coherent delay on a broadband uncollimated beam are described. The delay value can be independent of incident ray angle, allowing interferometry using uncollimated beams from common extended sources such as lamps and fiber bundles, and facilitating Fourier Transform spectroscopy of wide angle sources. Pairs of such interferometers matched in delay and dispersion can measure velocity and communicate using ordinary lamps, wide diameter optical fibers and arbitrary non-imaging paths, and not requiring a laser.

32 Claims, 34 Drawing Sheets

$D = 1/2\, c\, \tau$

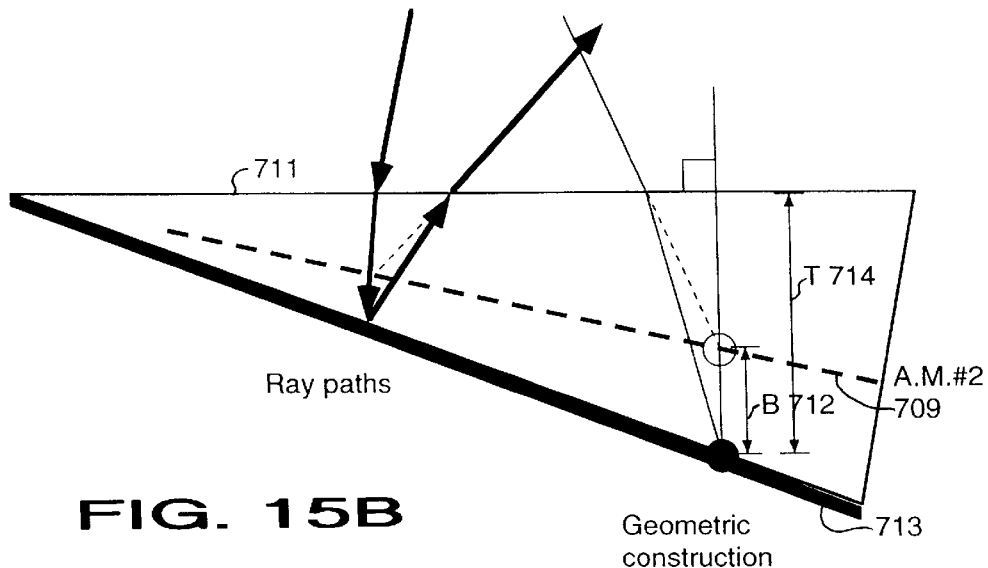
FIG. 15B  Ray paths / Geometric construction
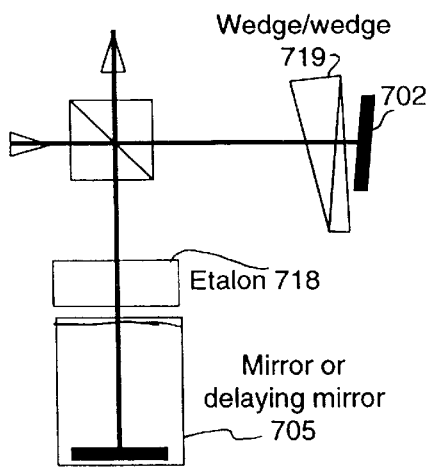
FIG. 15C
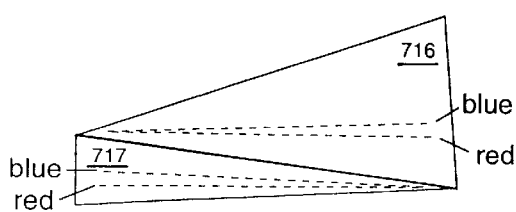
FIG. 15D
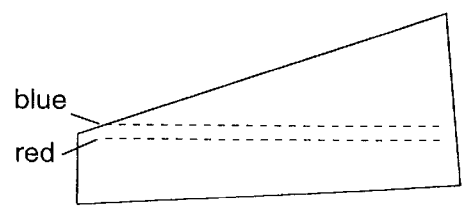
FIG. 15E

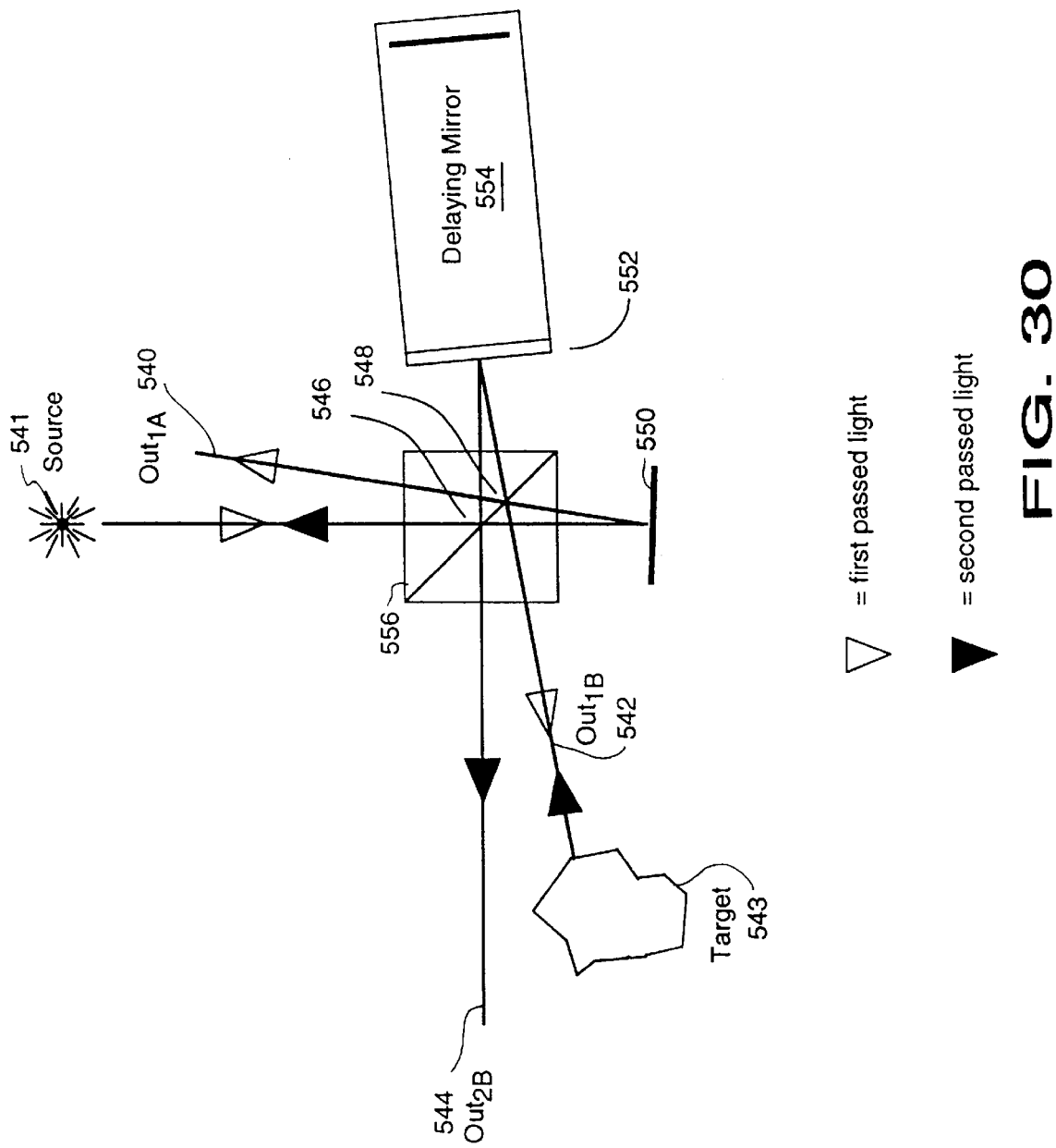

SINGLE AND DOUBLE SUPERIMPOSING INTERFEROMETER SYSTEMS

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to the design of interferometers, and more specifically, it relates to the design of single interferometers and pairs of interferometers which can use broadband uncollimated light from an extended source.

2. Description of Related Art

Interferometers in single and in double arrangements are very useful devices in a variety of applications in optics, metrology and communications. These interferometers have a delay $\tau$ between their arms which can produce fringes in the output density. Single interferometers having zero or near zero delay can be used with short coherence illumination to compare distances between one arm containing a sample and a reference arm. Single interferometers having larger delays can be used to measure the spectrum of a source, or to measure Doppler shifts of laser illuminated targets to measure motion, since slight differences in wavelength ($\lambda$) cause changes in fringe phase. Double interferometers having non-zero delays are useful in optical communications and measurement of velocity of targets illuminated by broadband radiation.

Prior art interferometers have a design which requires parallel light, or which is not optimized for very broadband usage, or was impractical for very long delays. Consequently, these interferometers are impractical for many applications involving white light and light from an extended source, such as from a common lamp, which produces non-parallel (uncollimated) beams. This is a serious handicap, because the majority of inexpensive compact sources are then excluded.

The present invention includes the use of interferometers, in single or in pairs, which are capable of working with broadband uncollimated light. These are called achromatic "superimposing" interferometers because they superimpose the images or ray paths associated with each interferometer arm. A similar concept has been discussed previously by others and called "field compensation." However, previous interferometer designs may have been superimposing only for a very limited wavelength range, or are impractical to create large delays, or are impractical to scan the delay.

Generally, the goal in a superimposing interferometer is to split an input beam into two or more separate beams, coherently delay one beam relative to the other, and recombined them to form an output beam. (Usually just two beams are split and recombined in the case of a Michelson-type interferometer, or an infinite number in the case of a recirculating Fabry-Perot type interferometer). The separate, splitted beams are also called interferometer "arms", and the arms can have different lengths which create a relative delay. For each input pulse, two or more pulses are outputted. The earliest output pulse, from the shortest arm, could be called the "undelayed" signal. The later pulses, from the longer arms, are called "echos." The interval between the undelayed signal and the echo is the interferometer delay $\tau$.

The term "coherently delayed" is explained in FIG. 1A. A pattern of light (which could be called an image) may be presented to the input image plane 40, and the interferometer transports the pattern to an output plane 42 by imaging optics, so that there is a correspondence between input and output pixels 46 and 50, and between 44 and 48. The pattern appears for each instance of the output pulses discussed above. We are interested in the delay between instances. The term "coherently" delayed means that the time delay $\tau_1$ for rays of light arriving at output pixel 50 is the same for all the rays of the bundle arriving at 50, within a tolerance of a quarter wave (a time interval of $\lambda/4c$, where c is the speed of the wave). The delay associated with another output pixel 48 could be called $\tau_2$, and this may be different or the same at $\tau_1$. Thus, even though the delay $\tau$ may change from output pixel to pixel, within the bundle of rays associated with each pixel the delay is very uniform. This uniformity is necessary to create fringes having significant contrast (visibility).

In some applications it is desired that $\tau$ have the same value for all pixels of the input beam. This will produce an infinitely wide fringe on output of the interferometer. In other applications it may be desired that $\tau$ vary linearly across the output beam. This will generate an evenly spaced and parallel fringe "comb", where the phrase of the fringe varies linearly transversely across the beam. (This is usually easily accomplished by tilting an interferometer arm end mirror). Only superimposing interferometers can produce infinitely wide or evenly spaced parallel fringe combs. (Conventional Michelson interferometers produce rings of fringes which are not linear of evenly spaced, except very far off axis). A superimposing interferometer could also be called angle-independent or solid-angle independent, because $\tau$ is independent of the angle of each ray within the bundle associated with a given image pixel.

A note on terminology: the delay value can be specified several ways, by single-trip path length D, by the round trip path length $c\tau$, or by a time interval $\tau$. Strictly speaking, the units of $\tau$ should be time, but for convenience $\tau$ is sometimes specified in terms of length units, in which case it is implied that the length should be first divided by c to yield the equivalent time value. Secondly, these delay values usually refer to the difference in path length or travel times between interferometer arms, except when an isolated means for creating a delay is discussed, in which case it could refer to the propagation time through this means. When an optical element or assembly is inserted into an optical path, the increase in the propagation time t causes over the original time is called an "insertion" delay. For example, a 20 mm thick glass etalon having a refractive index of n=1.5 would have an insertion delay $\Delta D=(n-1)20=10$ mm, due to the slower propagation of light through glass compared to vacuum or air. Thirdly, the term "delay" has dual meanings in this document. It may refer to a value, such as $\tau$, $c\tau$ or D, or it may refer to the means for creating the delay value, such as "an etalon delay" or a "relay delay".

FIG. 2A shows a common Michelson consisting of a beamsplitter 24 and two end mirrors 20 and 22. This interferometer is not superimposing because mirrors 20 and 22 do not superimpose in view of the beamsplitter. This has the consequence that $\tau$ has depends on incident ray angle. The single-trip path lengths between the beamsplitter and end mirrors differ by an amount D for rays parallel to the optic axis. This causes a round trip delay time of $\tau=2D/c$ between the two arms, where c is the speed of the illumination (which is spoken of as light, but can be any radiation that travels as rays, such as microwaves, sound, x-rays). FIG. 2B shows the optical equivalent of FIG. 2A, because the partial reflection off the beamsplitting surface 24 puts the two mirrors 20 and 22 apparently in the same path, but longitudinally displaced. When a ray of light 25 enters with an angle θ to the optic axis, it encounters a path difference which depends on angle as 2Dcosθ. Thus the delay deviates from its nominal value of τ by τ(1−cosθ), which is of the order $(½)τθ^2$, for small angles with θ in radians. This deviation can smear the delay which reduces fringe visibility. Note also that the ray 10 reflecting off mirror 20 does not overlap the path of ray 11 from the other mirror 22. For the same reason, an object seen in reflection of the two mirrors 20 and 22 will be seen as two images that are longitudinally displaced. Thus, the Michelson having a nonzero delay does not superimpose ray paths nor images, except for perfectly parallel incident light. The non-superposition and the angle-dependence of the interferometer are related.

The common Fabry-Perot interferometer (FIG. 2C) consisting of two flat partially reflecting mirrors 21, 23 separated by a distance D, is non-superimposing and suffers an angle dependence to the delay analogous to the Michelson example. The output rays 26, 27, 28 for a single given input ray 29 do not superimpose in path. Furthermore, the multiple images of an object observed through the interferometer will be longitudinally displaced from each other. Thus this interferometer does not superimpose paths nor images.

The angle dependence of these non-superimposing interferometers creates practical difficulties, because the fringe visibility is small unless the incident light is very parallel. An illumination source producing rays having a range of cone angles up to θ will smear the delay by $∼(½)τθ^2$, which destroys the fringe visibility if this is more than a quarter wave (λ/c4). This puts a limit of $θ∼(λ/2cτ)^{1/2}$ for the maximum cone angle. In order to produce this degree of parallelism from an ordinary lamp, which is an extended source, a small pinhole must be used a far distance from the interferometer. This greatly reduces the amount of power available from the lamp. For example, for a 4-meter delay (such as used to measure Doppler velocities typical of automobiles) and green light (λ=500 nm), θ must be less than 0.00025 radian. This limits the numerical aperture of the illumination source to f/2000, which greatly reduces the amount of power available from a filament. Secondly, this restriction on parallelism also applies to the reflected light from the target as it enters the detecting interferometer in a velocity interferometer application. This severely reduces the depth of field of the target motion, so that when the optics imaging the target into the interferometer become slightly out of focus, visibility of the fringes is diminished.

Single interferometers (Fabry-Perot and Michelson) are used as for spectroscopy, such as Fourier Transform spectroscopy. The small cone-angle tolerance of these non-superimposing interferometers limits the spectral resolution. A book by R. Beer shows that for conventional Michelson interferometers there is a reciprocal relationship between the solid angle $Ω=πθ^2$ of a source and the best resolution (λ/Δλ) achieved with a single channel detector, so the higher the spectral resolution the smaller the signal power. (Reinhard Beer, "Remote Sensing by Fourier Transform Spectrometry", John Wiley & sons, NY 1992, QD96.F68B43, page 17). The limit on Ω for a given spectral resolution severely limits the etendue or light gathering power (beam area times Ω), and prevents high spectral resolution on diffuse sources such as the aurora, plasmas, light from speckling images of stars, or light communicated through large diameter optical fibers.

In contrast, with a superimposing interferometer the delay is independent of ray angle and all the light can be accepted from an extended source and have the same delay imprinted on it coherently. This can dramatically increase signal power. For the above example where the numerical aperture of a conventional Michelson was limited to f/2000, for a superimposing Michelson the numerical aperture could be, say f/10. It is not limited by anything having to do with the delay time, but instead by the diameter of the optics used in its construction. The amount of light power is increased by the ratio $(2000/10)^2$ or 40,000. This is a tremendous advantage.

A method of making an angle-independent delay is to superimpose the ray paths (FIG. 1B) associated with each interferometer arm. This is the best solution. A less desirable method, but still useful, is to superimpose images associated with each interferometer arm (FIG. 1C). FIG. 1B shows the rays for a single pulse 58 that enters a pixel at the input image plane will appear at a pixel at the output plane, and there will be at least one echo 56 to the main signal 60, and that the ray paths for the echos superimpose the paths of the main signal. In FIG. 1C the rays for the echos 52 and signal 54 do not share the same path, but still intersect at the output pixel. Note that superimposing paths automatically superimposes images, but not vice versa. Superimposing paths is preferred because then the detector can be placed anywhere along the output optical path. If only images are superimposed, then the detector must be placed at the output plane or a re-image of this plane, otherwise the rays from all the arms do not intersect properly at the appropriate pixels and the fringe visibility is poor. Devices that are ideally designed to superimpose paths may in practice have slight aberrations that cause the paths of one arm to deviate from the intended path, so that strictly speaking only a superimposition of images is achieved. Thus there is not a black-and-white distinction between the two kinds, it is a matter of degree.

FIG. 1D shows an example, using a Michelson interferometer having zero delay. The interferometer has a plane mirror 62, and an irregular mirror 64 superimposed longitudinally in reflection of the beamsplitting surface 68. Let both the input and output planes 65 be at these mirrors. Then the irregular surface of mirror 64 will cause the output ray 67 to have a different angle and hence path than output ray 66 from the flat mirror, yet both rays appear to come from the same pixel 69 of the output plane. Thus images are superimposed while paths are not. In these cases, it is very important that the detector be at the output image plane or a re-image of that plane. This discussion is meant to illustrate the utility of defining input and output planes for realistic interferometers, that is, those having slight aberrations.

The ray path superposition principle has been discussed in the design of the spherical Fabry-Perot (FIG. 3A) [Pierre Connes, "L'Etalon de Fabry-Perot Spherique", Le Journal De Physique et le Radium 19, p262–269 (1958)], and the wide-angle Michelson interferometer [R. L. Hilliard and G. G. Shepherd, "Wide-angle Michelson Interferometer for Measuring Doppler Line Widths", J. Opt. Soc. Am. 56, p362–369 (1965)], where it was called "field compensation". These interferometer designs have properties that discourage or prevent their use in applications where broadband illumination is used, or long delays are needed, or adjustability of delay is desired.

FIG. 3A shows a Spherical Fabry-Perot, consisting of two spherical mirrors spaced such that the two mirror focal points 30 coincide in the middle of the distance separating the mirrors. Each mirror has a half 32 which is totally reflective, and a half 33 which is partially reflective. A ray 34 entering the cavity recirculates between the left and right mirrors, emitting a series of output pulses with geometrically decreasing intensities. The interval between output pulses is called the interferometer delay τ. Because of the overlap of foci, τ is independent of input ray path and the output rays for a given input ray 34 superimpose in output path 35.

The bottom half 32 of each mirror must be totally reflecting to allow only rays that have made an even number of round trips between the left/right halves to emerge. If both halves (32, 33) of the mirror were partially transparent, then output rays would be emitted which would not superimpose with rays 35. Another way to think about it is that if both halves were partially transparent, then an image plus an upside down version of that image would be outputted. The presence of the upside image would spoil the fringe visibility. Note that the edge between the totally 32 and partially reflective halves 33 lies on the optic axis 31. This is inconvenient because it prevents full use of the circular region of the output image around the optic axis where aberrations, such as spherical aberration, are smallest. The spherical Fabry-Perot must therefore be used slightly off-axis.

For the Spherical Fabry-Perot it is not possible to adjust τ and maintain the superimposing condition because the focal lengths are fixed. FIG. 3B shows that when the separation of the mirrors is changed, the two mirror foci 36 come out of overlap. Then the undelayed 37 and first echo output ray 38 for a given input ray no longer superimpose and the delay τ becomes dependent on input ray path.

The wide-angle Michelson discussed by R. L. Hilliard achieves path superposition for monochromatic light by use of a glass etalon, as shown in FIG. 4A. Due to refraction through the glass etalon 76, the mirror 72 behind the etalon appears at 74, close to the beamsplitter 71 by a displacement B given by $T(n-1)/n$, where T is the etalon thickness and n is the refractive index of the etalon. Mirror 70 of the other arm is arranged to superimpose with the apparent mirror position 74. This creates a time delay between the two arms due to the sum of two effects: the actual mirrors are at different distances from the beamsplitter, and secondly, light travels slower through glass by the factor n. The net delay is $c\tau=2[T(n-1)/n+T(n-1)]$.

Due to glass dispersion the apparent mirror position 74 is different for different wavelengths. This prevents the superposition condition to be achieved for all the wavelengths of white light, so that this interferometer is inappropriate for a white light velocity interferometer. Secondly, long delays such as $c\tau=4$ meters, are not practical. (These long delays are useful for measuring meter/sec velocities found in industry). Thirdly, the delay value cannot be adjusted by a significant amount. (Tilting the etalon adjusts it slightly, but introduces astigmatism).

These disadvantages are not important when the etalon Michelson (FIG. 4A) is used as a velocity interferometer with monochromatic laser illumination. However, there is great utility in being able to use cheap ordinary white light sources for illumination instead of an expensive laser, and these call for a different kind of interferometer.

Recently, an interferometric method of using broadband illumination to measure target motion has been invented by the present author. The theory of operation is described in U.S. Pat. No. 5,642,194 by David J. Erskine, which is included herein by reference. In concept, it uses two interferometers in series, with the target interposed. In order to use white light, and uncollimated light from extended sources, the interferometers must be superimposing for a wide range of wavelengths. Furthermore, in order to measure slow velocities, of order meter/second, long delays of several meters in length are needed. In this white light velocity interferometer, the two interferometer delays must match. This requires adjustability of the second interferometer delay. All these requirements hinder practical use of the prior art interferometers in the white light interferometer, or in other double interferometer applications, such as communication, where incoherent lamps or multimode fibers are desired for illumination sources.

The topology of a double superimposing interferometer configuration used for broadband velocimetry is shown in FIG. 5A. (The configuration for optical communication is similar, except the target 5 is omitted). Two superimposing interferometers (3 & 7) are in series with an interposed target 5 and illuminated by a broadband source 1. When the delays $\tau_1$ and $\tau_2$ match within a coherence length of the source illumination, fringes are created in the intensity of the outputs 8, 9, which are complementary in phase. In some embodiments, a single actual interferometer is used to implement the first and second conceptual interferometers by using retro-reflected light from the target. This automatically matches $\tau_1=\tau_2$, in spite of gross mechanical vibration of the instrument that may change τ. This makes the retro-reflecting configuration attractive for industrial environments, and reduces weight and cost of the optical platform, since this does not have to be as rigid.

Target displacement or refractive index along the round trip path to the target during the interval τ cause a proportional shift $\Delta\phi$ in the fringe phase, where $\phi$ is in units of fringe. (One fringe is 1 revolution, 360° or $2\pi$ radians). Thus, this is essentially a radial velocity measurement, as opposed to some other systems which measure transverse velocity (such as those involving the intersection of two incident laser beams to create standing waves, through which a particle to be measured travels). However, the combination of several simultaneous radial velocity measurements taken at different angles to the target can provide all 3 components of the velocity vector if desired.

When the light reflects normally off the target so that it approximately doubles back on itself, the displacement $\Delta x$ during an interval τ is $$\Delta x=(\lambda/2)\Delta\phi$$

and the average velocity v over that interval is $$v=(\lambda/2\tau)\Delta\phi$$

so that the velocity per fringe proportionality is $(\lambda/2\tau)$. The phase shift produced by a moving target is $\Delta\phi=v(2\tau/\lambda)$. Hence, in order to produce a significant fringe shift to detect a slow moving target, long delays are desired. A $c\tau=4$ meter delay produces a fringe shift porportionality of ~20 m/s per fringe. Since fractional fringe shifts down to $\lambda/100$ can be easily measured, a 4-meter delay can have a velocity resolution of 0.2 m/s, suitable for industrial settings. Now the challenge is to build a 4-meter superimposing interferometer that is achromatic. Clearly, a 4-meter thick glass etalon is not practical due to its cost and chromatic aberration. Some of the designs presented below are a solution to this challenge.

There are different ways of detecting and interpreting the interferometer output. The output light can be detected by a single detector that is sensitive to a wide bandwidth, in which case an average λ is used. Alternatively, the output can be spectrally resolved into multiple channels. In this case, the velocity can be computed for each channel using the λ specific to each channel. These will give redundant velocity answers which can be used to check for consistency.

One advantage of using wide bandwidth illumination is the unambiguous velocity determination. That is, the lack of integer fringe skips when the velocity jumps more rapidly than the detecting electronics can follow. Essentially, the velocity measurement taken in different colors, such as red, green, blue, can be combined to determine the absolute velocity unambiguously, even though individually each color channel may have an integer fringe ambiguity. This is because each channel has a different velocity per fringe proportionality.

In contrast, in the conventional monochromatically illuminated systems, the fringe phase is ambiguous to an integer due to the periodicity of monochromatic fringes. This creates a great uncertainty in the gross value of the velocity when the target is first acquired (such as a car coming over the horizon) or if the signal drops out temporarily. This fringe skip uncertainty hinders the use of these monochromatic systems in applications where there is no other confirming method of velocity measurement, or where theoretical prediction of velocity is poor.

A similar velocimetry method using two Fabry-Perot interferometers and laser illumination was described in a journal article by S. Gidot and G. Behar, "Multiple-line laser Doppler velocimetry", Appl. Opt. 27, p2316–2319 (1988). However, since the Fabry-Perot is not a superimposing interferometer, this method is not practical with uncollimated illumination. Uncollimated rays passing through the Fabry-Perot will blur the delay value, which can cause a loss of fringe visibility. This produces a severe trade-off between degree of non-parallelism and maximum source bandwidth which preclude practical use of common white light sources such as lamps.

FIG. 4B shows what is meant by the term "beam shortening", which is an important part of creating a superimposing interferometer. When real or virtual imaging by an optical element 966 causes an object or source 960 to appear by ray tracing to be at a different location 962 than the actual physical location 960, then the difference 964 is called a beam shortening or beam length shortening. The beam length could be measured from some reference plane 968. The apparent beam length 970 is from plane 968 to the apparent object location 962. The physical beam length 972 is from plane 968 to the physical object location 960. FIG. 4B shows a positive beam shortening, when the apparent beam length is less than the physical beam length. Negative beam shortenings are also possible.

In those interferometers where the beam reflects off an end mirror, such as 72 in FIG. 4A, and nearly doubles back on itself, the beam shortening changes the position of the end mirror 72 from its physical position 72 to an apparent position 74. The roundtrip beam shortening would be twice B. When beam shortening involves an end mirror, the combination of the end mirror and the optical element performing the imaging could be called a "delaying mirror". In FIG. 4A, the delaying mirror would be etalon 76 and end mirror 72. The term "delaying mirror" replaces the term "superimposing delay" used in the previously mentioned U.S. Pat. No. 5,642,94 by the present author.

A delaying mirror is a set of optics that acts like a mirror in terms of ray tracing, but delays the waves in time compared to an actual mirror. Delaying mirrors are useful elements in forming a superimposing interferometer. This document present designs of delaying mirrors and designs of superimposing interferometers that may be useful because of their achromatic character, their possible long delay times, adjustability, or wide image field.

SUMMARY OF THE INVENTION

It is an object of the present invention to provide single interferometers and pairs of interferometers which can use broadband uncollimated light from an extended source.

A superimposing interferometer involves beam shortening so that two paths appear to have the same length by ray tracing, but may have different propagation times. Many interferometers involve beams that reflect off an end mirror, so that the path nearly doubles back on itself. When beam shortening is applied to such configurations, a virtual mirror is formed that appears to be in a different location than its actual location. This could be called a "delaying mirror".

A delaying mirror is a name for an apparent mirror (A.M.) created by real or virtual imaging of an actual mirror, called an end mirror. The rays incident the A.M. surface leave the surface in a direction as if they reflected from an actual mirror located at the A.M. surface, except they are delayed in time compared to if an actual mirror were located at the A.M. surface. The delay time is controlled in part by the distance between the A.M. and the end mirror, and the amount of glass thickness used in the optics that performs the imaging. The A.M. can be curved or flat, but is usually flat. The position of the A.M. is calculated by imaging the surface of the end mirror. The center of curvature of the A.M. is calculated by imaging the center of curvature of the end mirror. The A.M. is optimally independent of illumination wavelength. Delaying mirror kinds can be classified by the method of imaging used, real or virtual, the arrangement and number of elements performing the imaging, and the kind of end mirror.

A superimposing interferometer is a kind of interferometer that superimposes the path of each of at least two output rays produced by a given input ray. There may be a delay between each of these output rays, and this delay could be zero. The superimposing interferometer has the desirable property that the delay is independent of incident ray angle, for a given location of the ray where it intersects a so-called input plane. (This location is also called a pixel of an input image.) This allows a coherent delay to be imprinted on an uncollimated beam, and allows the use of extended illumination sources in interferometry. The superimposing interferometer is most useful when the superposition is maintained over a range of illumination wavelengths (and thus is called achromatic), so that interferometry may be performed with uncollimated beams of white light, from ordinary lamps that are extended sources.

If the exact superposition of path is not achieved, a lesser, but still useful, kind of superimposing interferometer can be formed by requiring that the at least two output rays associated with each input ray superimpose in location at a so-called output plane. This could be called superposition of images, where each interferometer arm has an image associated with it. The images must superimpose longitudinally, transversely, in magnification. (Note that the superposition of path is a more stringent requirement equivalent to superposition of images while also matching wavefront curvatures.) By placing the detector that records the fringes at the output plane or some relayed image of it, fringes with significant visibility are still observed. An interferometer that satisfies the superposition of paths is more useful than one that satisfies only superposition of images because when paths are superimposed, the detector can be placed anywhere to record visible fringes.

Superimposing interferometers can be formed by superimposing one or more mirror-like elements by the partial reflection of surfaces such as a beamsplitters. The mirror-like elements may be actual mirrors or apparent mirrors (delaying mirrors). The interferometer kinds can be classified by how the superposition is configured, and by the kind of delaying mirror involved. If the mirrors face generally in the same direction as seen in the beamsplitters, then a finite number of output pulses is emitted for each pulse incident on the interferometer, and an N-path interferometer is formed. A superimposing Michelson is a kind of 2-path interferometer. If the mirrors face each other so that a beam bounces back and forth in a recirculating path, then an infinite number of geometrically decreasing intensity pulses is emitted for each input pulse. Then the interferometer is of the recirculating class. A Fabry-Perot interferometer is a member of this class.

Superimposing interferometers can be formed without delaying mirrors, by explicitly routing the beams so that there are more than one path between input and output planes, and by requiring that for each path the input and output planes are superimposed. Both N-path and recirculating classes (kinds) can be formed this way.

Single superimposing interferometers are useful for spectroscopy, especially from extended or wide angle sources. Series pairs of superimposing interferometers with matched delays and dispersions are useful for velocity interferometry and communication using illumination which can be broadbanded and extended, such as from common lamps. A procedure for matching the delays and dispersion between interferometers while individually maintaining the superposition condition for each interferometer involves iteration. The superimposing condition is optimized for one interferometer by temporarily using the interferometer in a retro-reflective mode by observing a retro-reflective target. The second interferometer is then matched in delay, and then in dispersion while holding the delay constant.

In some applications, having a coherent delay which varies across the output plane is useful, since this measure a range of delays in a single moment. This is called an inclined delay. Tilting a mirror is a method of achieving an inclined delay. However, only small values of inclination are practical by this method before the fringe visibility diminishes. A large inclination can be achieved by the use of wedges. Furthermore, by use of more than one wedge having different dispersive powers, an achromatic inclined delay can be achieved. In an analogous fashion, achromatic delays using etalons of different dispersive powers can be achieved. This removes a previous limitation of etalon delays in broadband interferometry.

When a single interferometer is used to observe as well as illuminate the target, this arrangement is called using the interferometer in a retro-reflective mode. The advantage is that the delay and dispersion matching conditions are automatically approximately satisfied, in spite of severe change in the delay such as due to vibration of the mounts holding the optics. However, in order to use this configuration, a method of preventing illuminating light from reaching the detection before reflecting off the target must be found. Several methods are described, including having the beams travel at an angle to the optic axis, offsetting the images of the target for incoming and outgoing beams, and using orthogonal polarizations.

A superimposing interferometer can be constructed that outputs more than two pules for each input pulse, so there could be two or more delay values between the first output pulses and its echos. This would be an N-path interferometer with N greater than two. When the delay values are different, this is useful for generating simultaneous fringe patterns characterized by different delays. This is useful, for example, in velocimetry for reducing velocity ambiguity and in spectroscopy for measuring different portions of a Fourier Transform fringe record simultaneously, to make the measurement more robust to a fluctuating source. The different delays could also be distinguished by polarization by incorporating polarization elements in the interferometer.

A superimposing interferometer can be combined in series with a prism or diffraction grating to make a spectrum that has uniformly spaced fringes on it, with an adjustable spacing. This is useful, for example, for increasing the fringe visibility in Fourier Transform spectroscopy or velocity interferometry.

Methods of using a delaying mirror to coherently delay a beam are shown, where it is desirable to separate the incoming from outgoing beams.

BRIEF DESCRIPTION OF THE DRAWINGS

FIG. 15B is a detail of a wedge showing ray path entering normal to apparent mirror, and a geometric construction locating apparent mirror surface.

FIG. 15C shows an achromatic inclined delay achieved by a wedge combination in one arm and a compensating etalon in another.

FIG. 15D shows the apparent mirror surfaces for red and blue light when the elements of the wedge combination are considered separately.

FIG. 15E shows the parallelism between red and blue apparent mirrors when the combination of 15D is considered as a whole.

FIG. 24C is an electrical equivalent of a N-path interferometer.

FIG. 30 shows the use of beam angle to separate double passed light from first passed light in a retro-reflecting application of an interferometer.

DETAILED DESCRIPTION OF THE INVENTION

A superimposing interferometer can be made by superimposing a delaying mirror with an ordinary mirror, or with another delaying mirror. The different kinds of interferometers can be classified by how the superposition is configured, and by how the delaying mirror is formed. If the delaying mirror and other mirror are superimposed facing the same direction, such as by using partial reflection/transmission from a beamsplitting cube, then the interferometer formed is a kind of Michelson interferometer. If the delaying mirror and other mirror face each other so that light is reflected back and forth, then a recirculating interferometer is formed, similar to the Fabry-Perot (F-P).

Figure 6A:
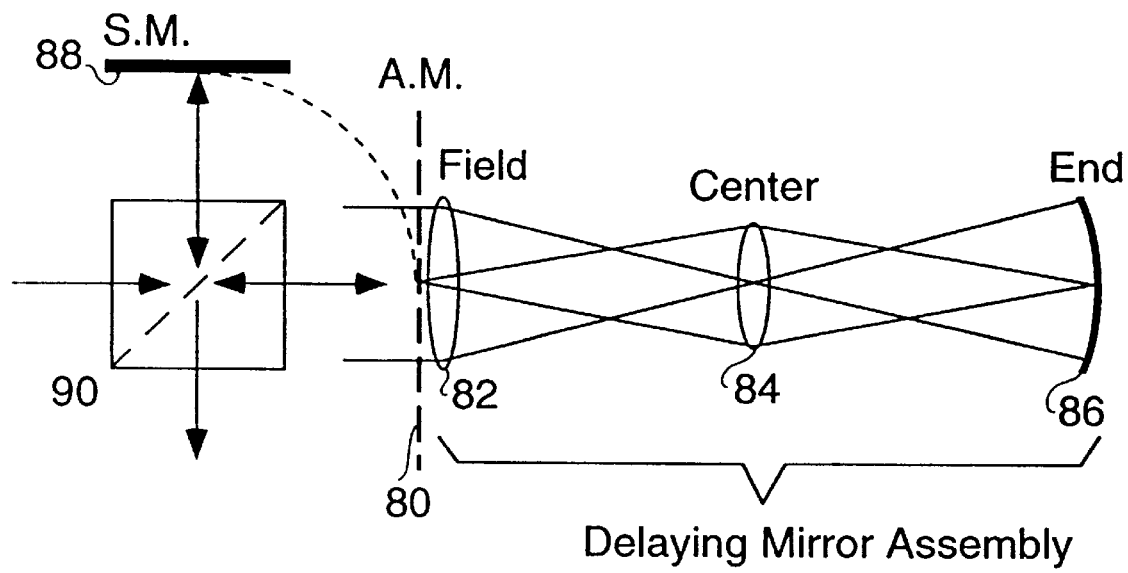
FIG. 6A shows a superimposing interferometer using a relay lens delay with a spherical end mirror.

A delaying mirror is a set of optics that acts like a mirror in terms of ray tracing, but delays the waves in time compared to an actual mirror located at the same place. In FIG. 6A the delaying mirror assembly is the set of optics 82, 84 and 86 that act as a mirror for one arm of a Michelson class interferometer. The "business" end of the delaying mirror assembly is the apparent mirror (A.M.) surface 80. This is where the delaying mirror appears to be. In general, the A.M. is created by real or virtual imaging of an actual mirror 86, which is called the end mirror, located a distance away. In FIG. 6A real imaging is used, and this is accomplished by the center lens 84. The field lens 82 is used to flatten the A.M. surface, which would otherwise be curved. The delay time of the delaying mirror assembly is controlled by the distance between the A.M. and the end mirror and the net amount of glass along the optic axis.

Michelson-class interferometers usually are considered to have just two arms. The arm containing the delaying mirror could be called the long arm, and the other arm the short arm. The mirror 88 could be called the short arm mirror (S.M.). In general, the S.M. 88 could be an actual mirror, as in FIG. 6A, or a second delaying mirror assembly, as will be discussed in the section on differential interferometers.

To create the superimposing interferometer, the A.M. surface is superimposed with the S.M. This creates an interferometer that for ray tracing purposes acts like a zero-delay interferometer, and is therefore independent of ray angle. By time-of-flight however, there is a non-zero delay time because it takes a finite amount of time for light to pass through the delaying mirror assembly and leave out the A.M. Thus, the spectral properties of a non-zero delay interferometer are achieved while having angle independence.

Optimally, the overlap between the A.M. and the mirror-like elements of the other arms is as perfect as possible everywhere across the A.M. The greater the deviation of the A.M. from the S.M., the greater the loss of fringe visibility for uncollimated beams. Since usually the S.M. is a flat mirror, usually the A.M. should be flat. When the S.M. is a curved mirror, the A.M. should be curved with the same radii of curvature. For concreteness, we will generally assume the S.M. is flat and thus a flat A.M. is desired.

Figure 1A:
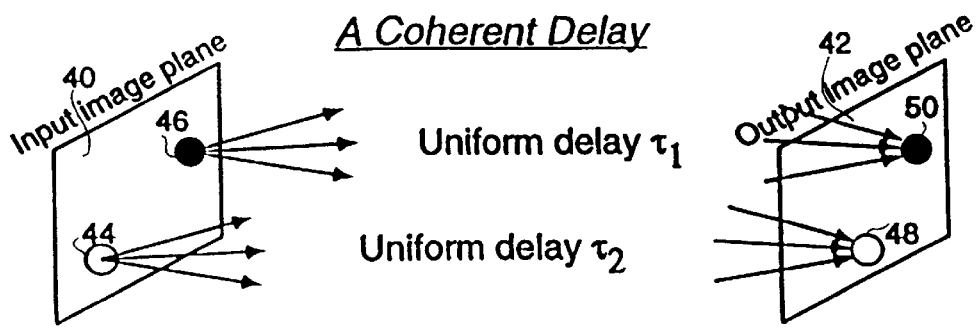
FIG. 1A shows a coherent delay between pixels of input and output planes.
Figure 1B:
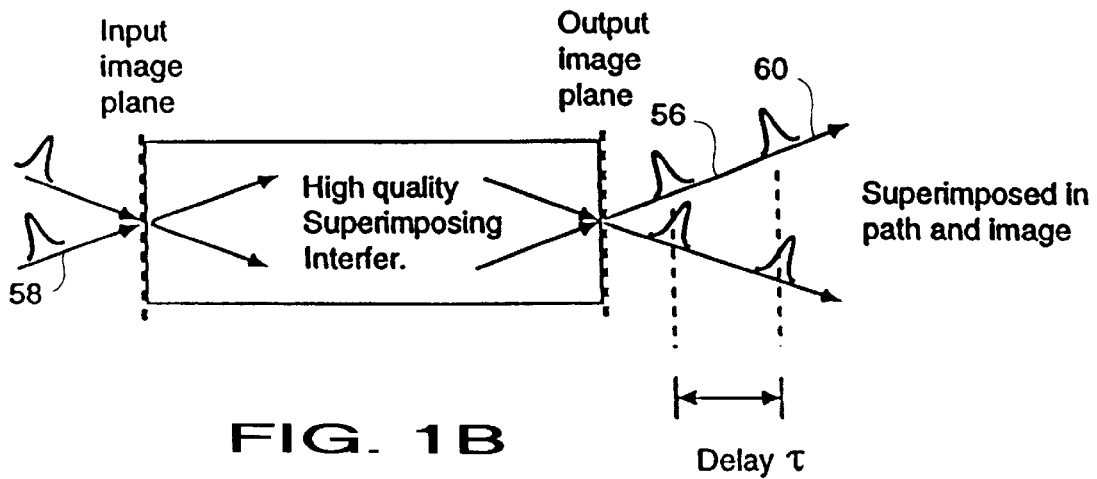
FIG. 1B shows the echo and undelayed signal superimposed in path (and also image).
Figure 1C:
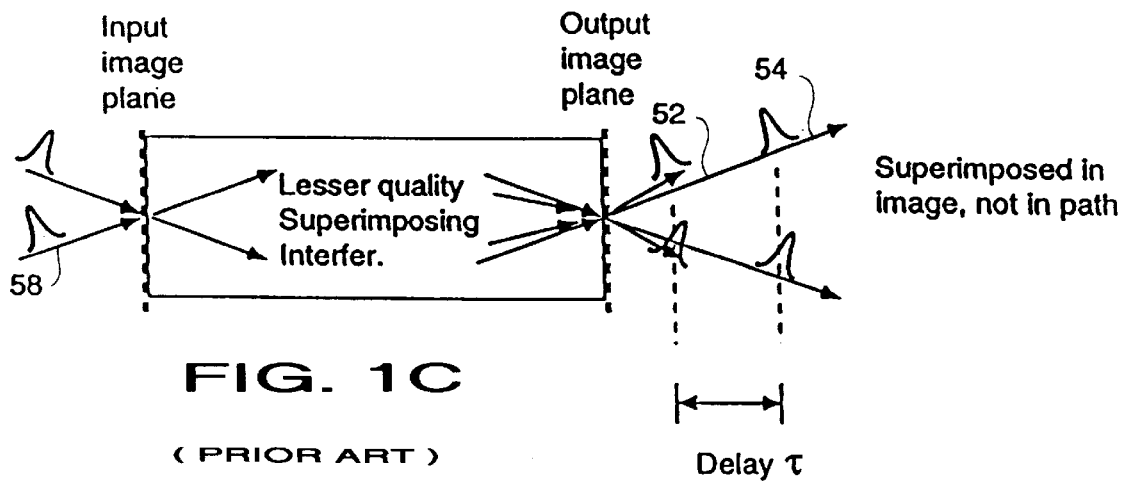
FIG. 1C shows the echo and undelayed signal superimposed in image but not path.
Figure 1D:
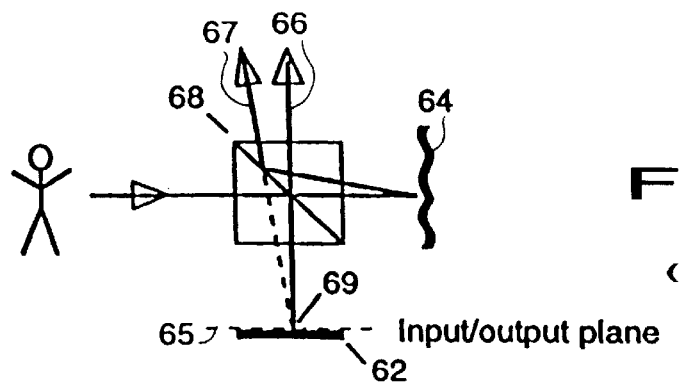
FIG. 1D is an example interferometer that superimposes images but not ray paths.
Figure 2A:
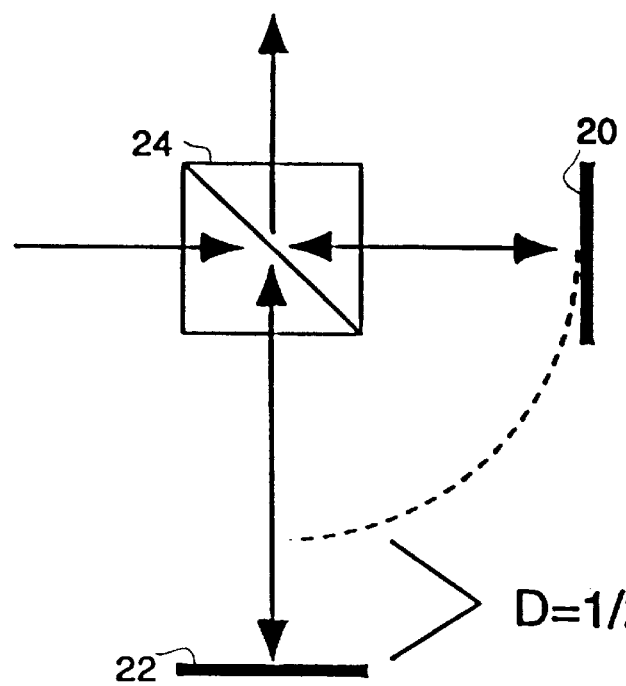
FIG. 2A is a conventional Michelson interferometer.
Figure 2B:
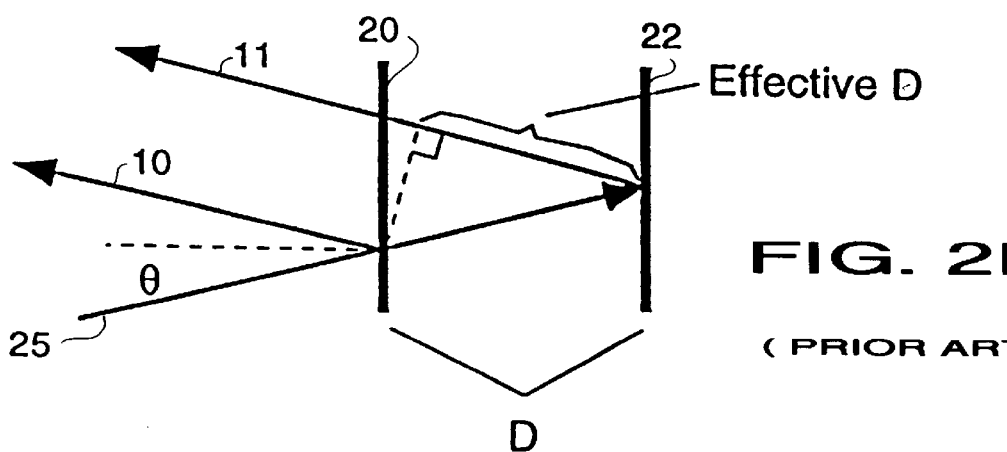
FIG. 2B is the optical equivalent of FIG. 2A and shows the angle dependence of delay and lack of superposition of output paths.
Figure 2C:
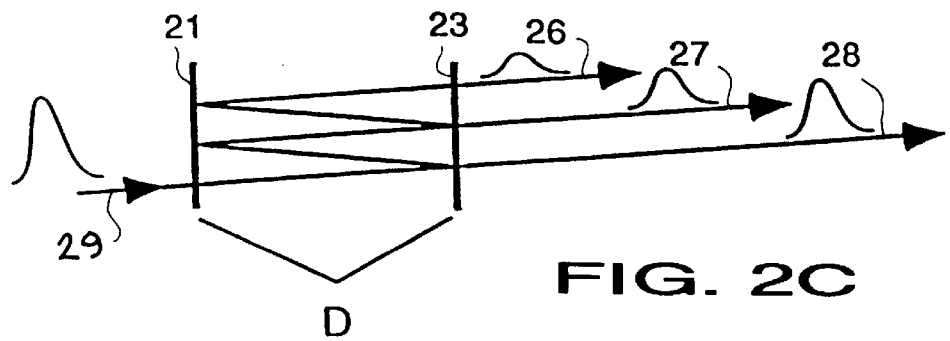
FIG. 2C shows the lack of superposition for a conventional Fabry-Perot interferometer.

If the A.M. surface is perfectly superimposed with the S.M. surface, then superposition of paths has been achieved (as in FIG. 1B), which is ideal. In this case, the input and output image planes for the interferometer can be anywhere. However, due to aberrations of the optics, the A.M. surface curvature may not perfectly match the S.M. curvature. In this case, it is possible to overlap the location of the A.M. and S.M. for some sections of the beam, while the angles of the surfaces are slightly different. This superimposes images but not paths (as in FIG. 1C). This can still produce visible fringes provided the detecting device is placed at a relayed image of the A.M. surface. That is, the input and output image planes should be located at the A.M. (This assumes that the beamsplitting surface is flat. Generally, the input and output planes should be optimally placed closest to the optics that generates the most wavefront irregularities, whether this be the beamsplitter or A.M.).

A description of different interferometer kinds using different delaying mirror kinds follows.

1. Michelson-class interferometers using real imaging

Figure 6B:
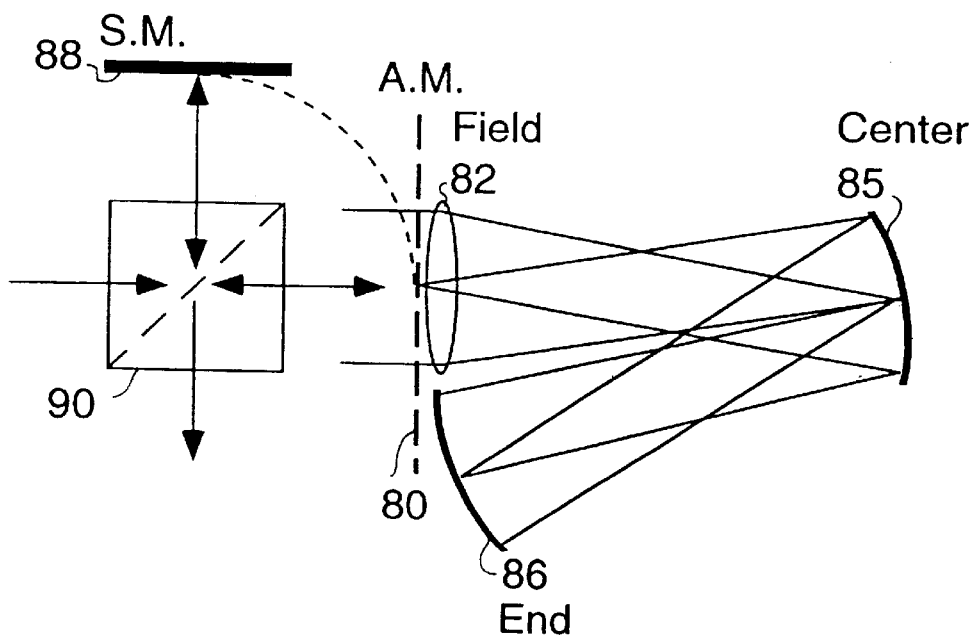
FIG. 6B shows the center lens of the relay delay implemented by a spherical mirror.
Figure 6C:
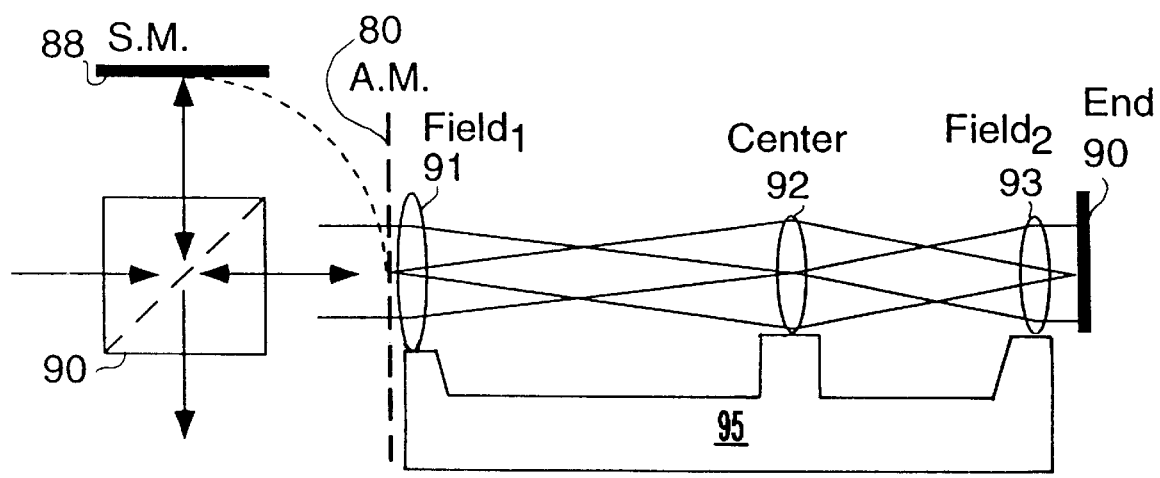
FIG. 6C shows the relay delay implemented by transmissive lenses and a plane end mirror.

Superimposing Michelson-class interferometers are shown in FIGS. 6A, 6B and 6C. These have delaying mirrors that use real imaging to form the A.M. This delaying arrangement is also called a relay lens delay. The A.M. is superimposed with the mirror 88 of the other arm by partial reflection in the beamsplitter 90. In FIG. 6A, the delaying mirror is a relay lens system comprising a field lens 82, a center lens 84, and a spherical end mirror 86. In FIG. 6B the transmissive center lens is replaced by equivalent spherical mirror 85. This minimizes the number of glass elements to reduce dispersion and chromatic aberration. In FIG. 6C the spherical end mirror is substituted by a plane end mirror 90 and a transmissive lens 93. This introduces another degree of adjustment which can be an advantage. Then the three lenses 91, 92 and 93 form a telescope and can be moved as a group 95.

The A.M. is formed by real imaging of the end mirror surface (86 or 90). The imaging is mostly accomplished by the center lens (84, 85 or 92). The primary purpose of the field lens (82, 91) is to make the A.M. appear flat, but it may also contribute to the imaging of the A.M. surface if the field lens is not exactly at the A.M. Usually the A.M. is desired to be flat, so that in general the center of curvature of the end mirror should be imaged to infinity by the optics of the delaying mirror assembly. If the center lens 84 lies near the center of curvature of the end mirror 86, then most of the responsibility for imaging the center of curvature lies with the field lens 82. Typically, the center lens is approximately midway between end mirror and A.M., and the field lens is near the A.M. However it is optimal if the center lens is not exactly in the middle, because this reduces focusing adjustability.

Figure 7A:
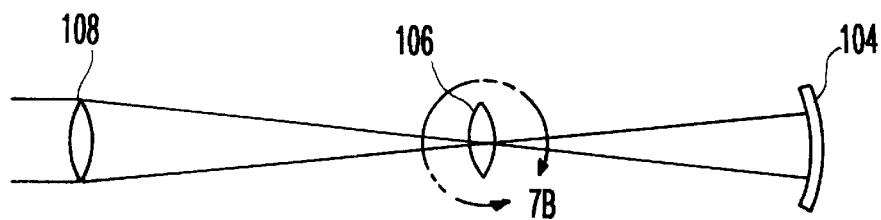
FIG. 7A shows calculation of the center of curvature of the apparent mirror for a delaying mirror assembly.
Figure 7B:
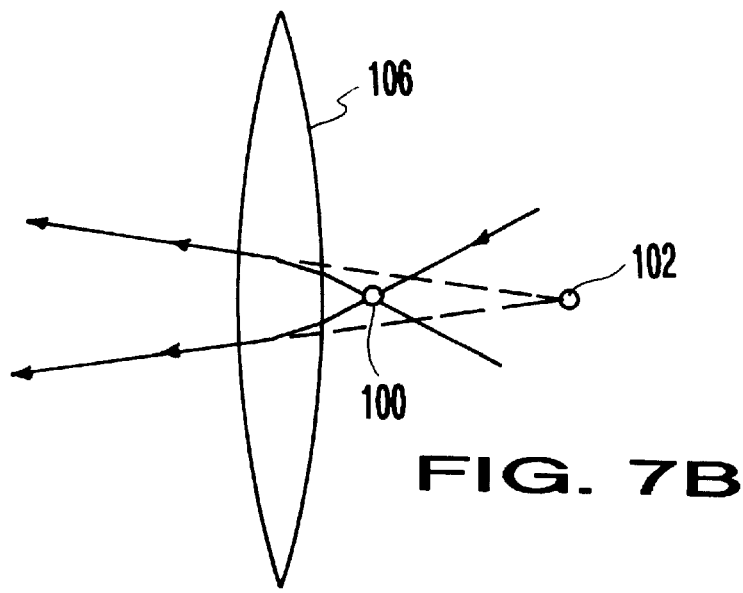
FIG. 7B shows calculation of the apparent mirror location for a delaying mirror assembly.
Figure 7C:
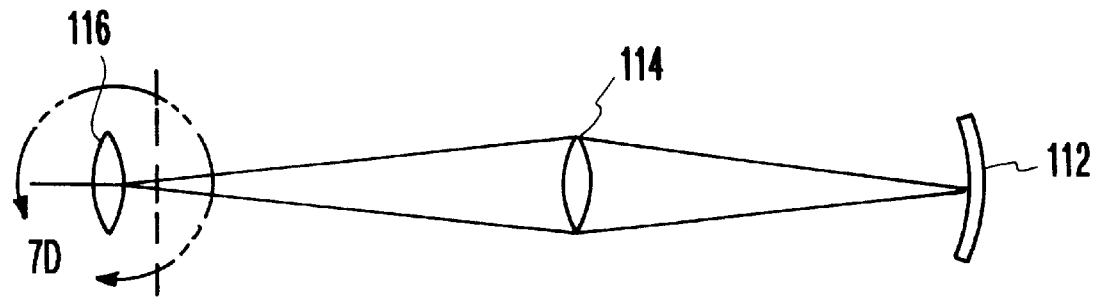
Figure 7D:
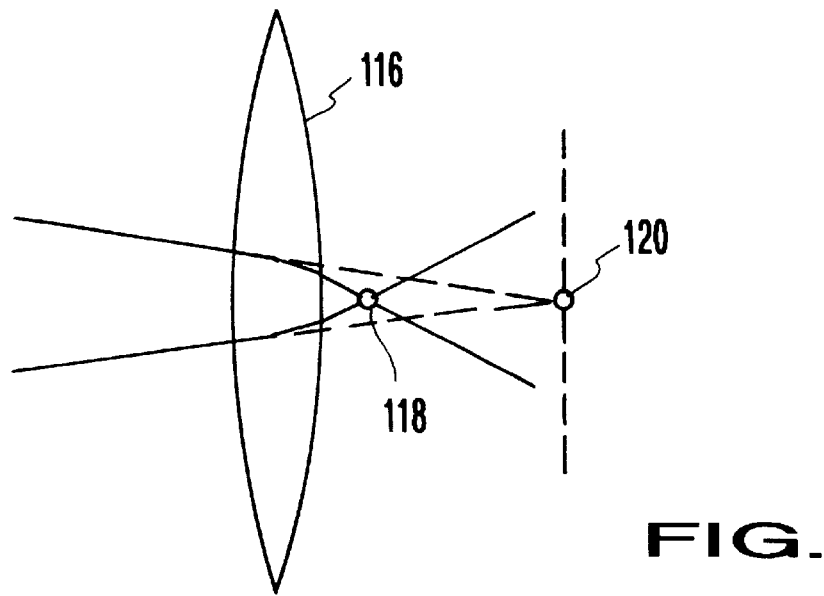

FIGS. 7A and 7B shows how to calculate the A.M. curvature and position. The center of curvature 100 (CC) of the end mirror 104 is re-imaged by the optics 106 and 108 to form the CC of the A.M. The inset to FIG. 7A shows that the center lens may slightly shift the initial CC location 100 to an intermediate point 106. This slight displacement must not be ignored in the calculation. Then to make a flat A.M., the focal point of the field lens 108 is arranged to coincide with the intermediate point 102 so that the final CC is at infinity. To calculate the A.M. location, the image of the end mirror surface 112 is first re-imaged by the center lens 114 to an intermediate point 118. The inset of FIG. 7B shows the field lens 116 re-images point 118 to point 120, which then defines the apparent mirror location. This slight shift from 118 to 120 must not be ignored.

The interferometer delay time is given by $\tau=2D/c+\tau_{glass}$, where D is the difference in single-trip lengths of the two arms measured from the beamsplitter where it intersects the optic axis to the end mirrors 88 and 86. The term $\tau_{glass}$ is the insertion delay contributed by glass components measured down the optic axis, given by $\tau_{glass}=2T(n-1)$, where T is the glass thickness and n is the refractive index. This glass term is much smaller than the 2D/c term, but can add dispersion due to the wavelength dependence of n. Thus, the glass term must be considered when discussing dispersion matching between two interferometers. Otherwise it can usually be ignored.

It is preferred that the delaying mirror be as achromatic as practical. This can be achieved by having the lenses and mirrors in the assembly be individually achromatic, by using first surface mirrors and standard multi-element achromatic lenses. In some cases, non-achromatic elements having chromatic effects of opposite polarity can be combined so that the net chromatism is reduced. For clarity, the multi-element nature of the lenses are not drawn in some of the Figures. However it is implied that achromatic lenses be used where-ever possible, unless explicitly stated that the lens need be a simple lens.

Spherical mirrors have superior achromatism over lenses, and when used at a 1:1 conjugate ratio, can have less spherical aberration than a transmissive lens for large numerical apertures. However, the use of a curved mirror as the center lens 85 requires an off-axis reflection which introduces undesired astigmatism. (This astigmatism and other irregularities can be greatly reduced by using a differential configuration described later.)

Delaying mirrors made from real imaging optics such as FIGS. 6A, B and C are useful because they provide a practical way of generating long achromatic delays, such as several meters in length, having a reasonably large numerical aperture, and having an adjustable delay value. The numerical aperture (f/number) is approximately set by that of the center lens and could be f/10, for example. In contrast, glass etalons longer than 30 centimeters and having a sufficient diameter to achieve a similar numerical aperture are impractically expensive, and have prohibitively large dispersion for broadband use. Furthermore, their delay time can't be adjusted practically.

The end mirror of either the short or long arms (88 or 86) can be tilted so that the A.M. is inclined relative to the S.M., by a small enough amount that the superposition is not significantly degraded. This generates a delay value $\tau$ which is a function of transverse location across the beam at the input/output plane. This is called an inclined delay. When fringes are present in the output, this creates an evenly spaced fringe comb of parallel fringes. This is useful for determining fringe phase because all portions of the sinusoidal fringe shape can be observed simultaneously, allowing separation from any constant component. In contrast, in a non-superimposing Michelson, the fringes are rings due to the dependence of $\tau$ on ray angle. Methods of creating large values of inclination without sacrificing A.M. overlap are discussed in a later section.

2. Manifold of element positions for a relay delay

There are a large variety of lens/mirror spacings, choice of number of elements, selection of focal lengths/mirror curvatures which will produce a flat A.M. by real imaging. This variety produces freedom to adjust the A.M.-to-end mirror spacing while maintaining a constant curvature A.M. Including more lenses/mirrors yields even more degrees of freedom. The freedom to adjust can be used either to modify the delay time $\tau$ while maintaining the superposition condition, or to adjust the overlap quality while maintaining a constant delay $\tau$.

Two example calculations are given, one for the configuration of FIG. 6A, and one for FIG. 6C. A calculation for FIG. 6B would be similar, with the exception that movement of the center mirror changes the total path length as well as the spacing between elements. The configuration of FIG. 6C has an extra degree of freedom allowed by substituting two elements (lens and plane mirror) for the single curved end mirror. The focal lengths for the FIG. 6C example were chosen to be asymmetrical, that is, the center lens is decidedly more asymmetrically placed between the end mirror and A.M. than in the calculation of FIG. 8A.

Figure 8A:
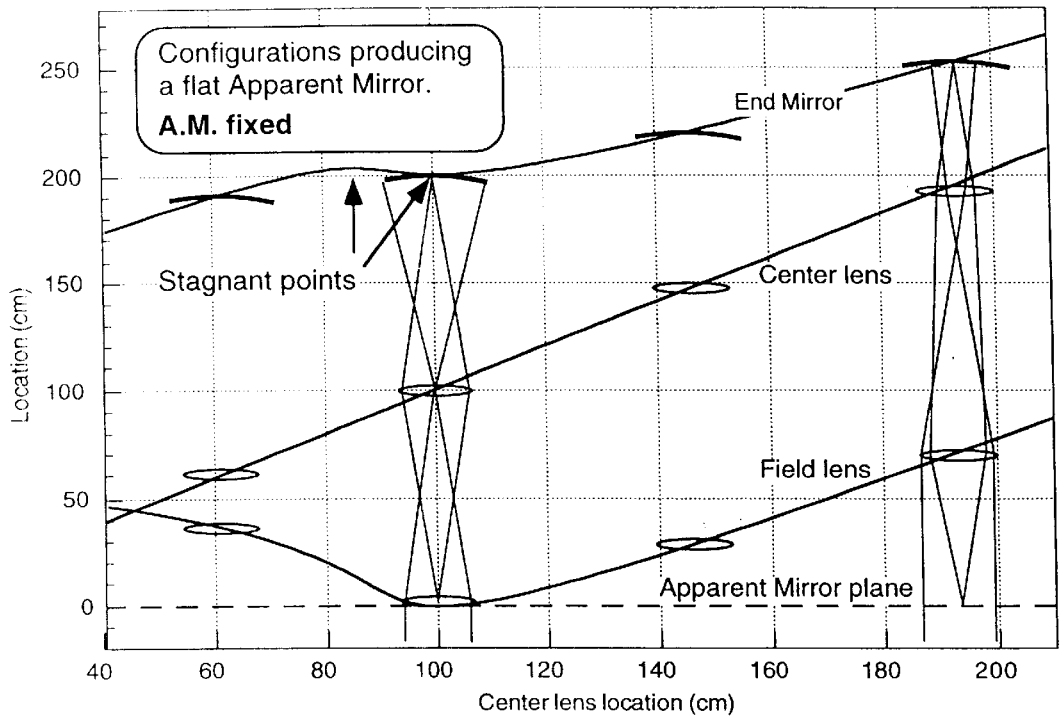
FIG. 8A shows a manifold of configurations for a flat delaying mirror, when positions are measured from the apparent mirror.
Figure 8B:
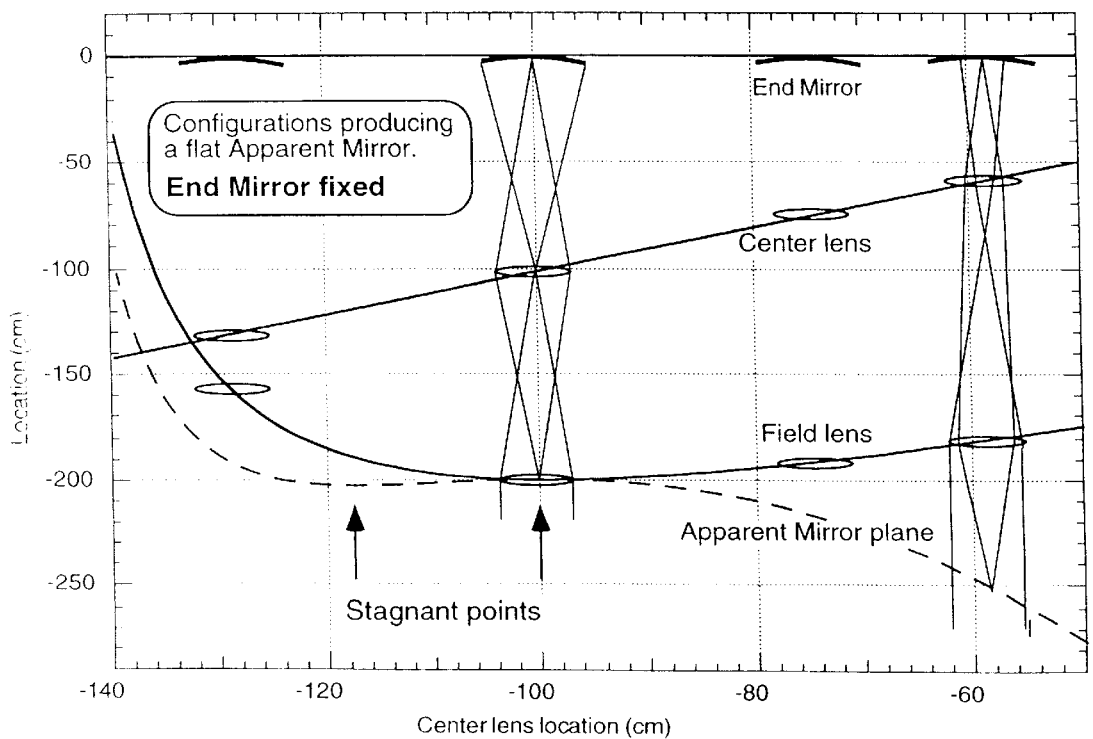
FIG. 8B shows the same manifold of configurations of FIG. 8A, when positions are measured from the end mirror.

The calculation for configuration FIG. 6A are shown in FIG. 8A and 8B. These are the manifold of possible positions of the optics which produce a flat apparent mirror, calculated for the specific example of field lens 82 focal length=100 cm, center focal length 50 cm, and end mirror radius of curvature 100 cm. In both FIG. 8A and B, the A.M. to end mirror distance is plotted versus center lens position. However, FIG. 8A the A.M. is fixed, and in FIG. 8B the end mirror is fixed. FIG. 8A would be more useful for when the superimposing overlap must be maintained while the delay time $\tau$ is being changed, such as in a Fourier Transform spectrometer with a scannable delay. FIG. 8b would be more useful in a double interferometer application where the overlap quality of a second interferometer is being adjusted while trying to maintain a specific delay, (such as the delay value defined by the first interferometer).

Stagnant configurations should be avoided, since they have no adjustability. The stagnant configurations are when the derivative of the A.M.-end mirror distance is zero. These configurations are indicated in FIG. 8A & B by the thick arrows. Generally, they occur when the optics is in, or near to, a symmetrical configuration. For this reason, the magnification performed by the center lens should usually be arranged to be something other than exactly unity.

Figure 9A:
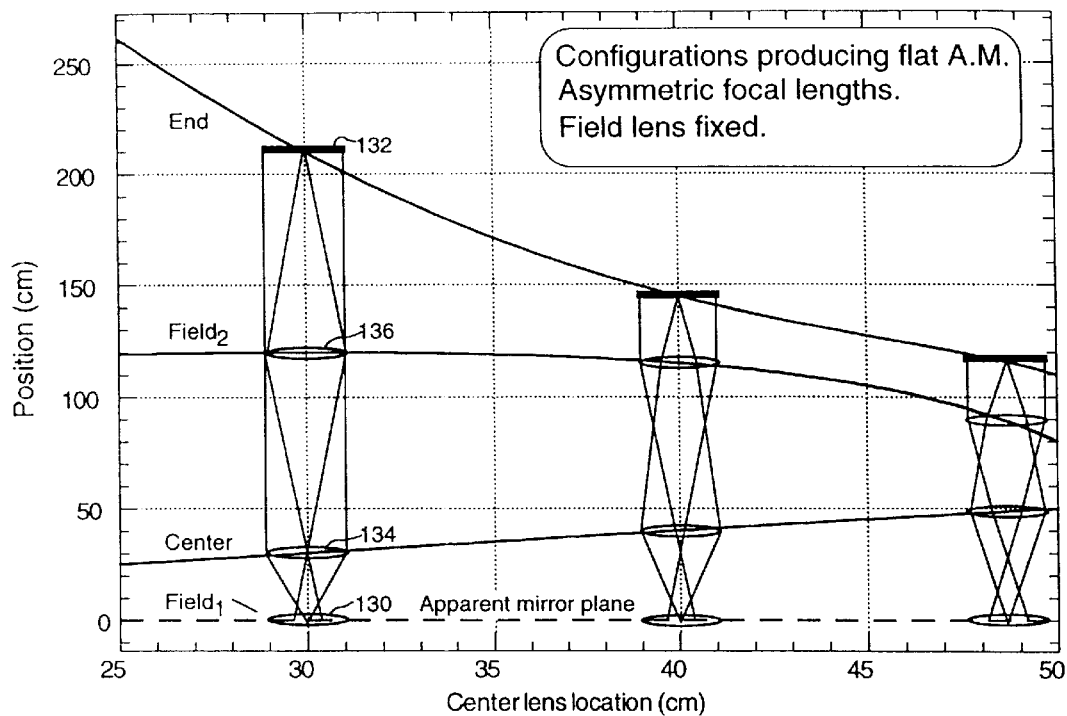
FIG. 9A shows a manifold of configurations for a flat delaying mirror, for an asymmetrical group of lenses and when one field lens is stationary.
Figure 9B:
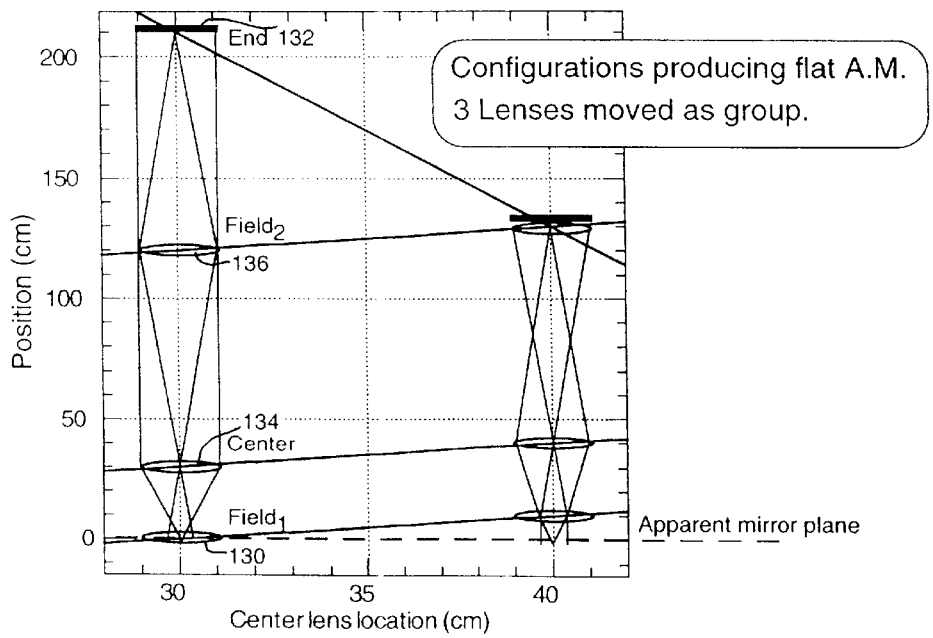
FIG. 9B shows a manifold of configurations for a flat delaying mirror, when 3 lenses are moved as a unit.

FIGS. 9A and 9B show the manifold of configurations producing a flat A.M. when the spherical end mirror is replaced by a plane mirror 132 and a second field lens 136. The additional element 136 introduces another degree of freedom, so that the complete manifold must be represented by a 3-dimensional chart showing configuration versus two parameters, which could be the center lens position and one of the field lens positions. For simplicity, only a subset of the possible configurations are shown in FIG. 9A and 9B, using 2-dimensional charts.

Since both ends 130, 132 of the cavity are intended to be flat, the positions of the A.M. and end mirror could be interchanged. Secondly, partially reflecting mirrors could occupy both the A.M. and the end mirror so that a recirculating cavity is formed. This is also true of the configurations in FIG. 8A and 8B. Thus this or analogous calculations could apply to recirculating cavities, which will be discussed later.

In FIG. 9A, 9B the focal lengths were chosen to asymmetrically place the center lens between the two field lenses, to illustrate that this avoids stagnation points. Field$_1$ 136 focal lengths=30 cm while field$_2$ lens focal length=90 cm. Center lens 134 focal length=30 cm. The A.M.-end mirror separation with the A.M. position fixed is plotted versus center lens position. FIG. 9A shows the case where the Field$_1$ lens 130 is fixed at the A.M.

FIG. 9B shows the case where the three lenses 130, 134, 136 are moved together as a group. This is an easy method of adjusting the relay delay length while keeping the A.M. constant. The three lenses are mounted on a platform 95 (FIG. 6C) which can be moved relative to the end mirror. The three lenses form a telescope. The three lenses are first spaced properly amongst themselves so that collimated light incident to the telescope is outputted from the telescope as collimated. This can be accomplished by illuminating the interferometer with HeNe light and obtaining a fringe comb of parallel fringes instead of rings. The parallelism of the fringe comb indicates that the A.M. is flat. Once the A.M. is flat, the telescope 95 can be translated relative to the end mirror in the fashion indicated by FIG. 9B to adjust the A.M.-end mirror spacing.

Displacement of the telescope 95 only affects the A.M.-end mirror spacing if the telescope comprises lenses with asymmetrical focal length values (field$_1$≠field$_2$ focal length). The greater the asymmetry, the greater the change of the A.M.-end mirror separation per telescope displacement. For example, in the symmetrical case where field$_1$=field$_2$ focal length, there is zero such adjustability.

3. Applications for an Adjustable Delay Superimposing Interferometer

An interferometer with an adjustable delay time is useful in Fourier Transform (FT) spectroscopy, or as one interferometer in a pair of matched interferometers for white light velocimetry or communications. The FT spectroscopy application requires scanning the delay over a significant range. The matched-pair interferometer application requires adjusting the second interferometer to match the delay of the first, while preserving the superimposing overlap condition. Previous superimposing interferometers (spherical F-P or etalon delayed Michelson) did not have a practical method to adjust the delay over a significant range. Consequently, the interferometer commonly used for FT spectroscopy is the conventional Michelson, and because this is non-superimposing it has a limited solid angle over which it can produce a uniform phase fringe. Now the superimposing interferometer using a relay delay can be used for FT spectroscopy. This increases the available solid angle at high spectral resolutions (which require long delays), so that wide angle sources such as aurora can be viewed).

It is advantageous to use a superimposing interferometer for FT spectroscopy of wide-angle sources because then fringe rings are not produced. Instead, a single infinitely wide fringe can be produced for use with a single channel detector to boost signal strength. Or, a uniform fringe comb can be produced for use with a multi-channel detector. The fringe comb is simpler to analyze than a fringe ring.

The delay is scanned by moving the elements of the relay delay in a coordinated fashion set by a schedule analogous to FIGS. 8A, 9A and 9B, where the A.M. is held fixed. The elements, individually or in groups where appropriate, can be mounted on translation stages that are controlled electronically or mechanically to follow the schedule. Fringes from a reference wavelength, such as a HeNe laser, can be used to monitor the A.M. curvature and tilt during the scan and correct for deviations by mounting optics on piezoelectric tilt actuators and using a feedback control loop. The change in τ can also be monitored by counting passing fringes.

4. Multi-Stage Relay Delay and Waveguide

Figure 10A:
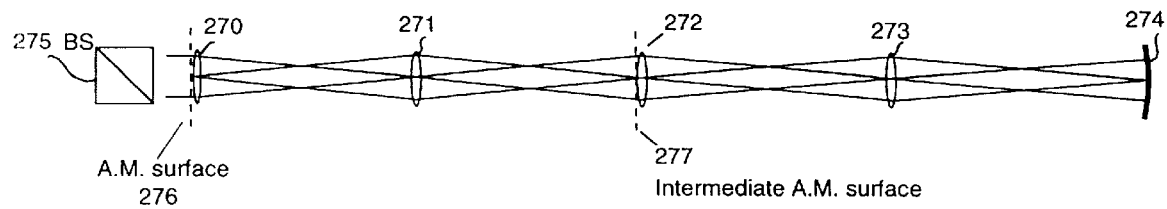
FIG. 10A shows a delaying mirror comprising a relay lens delay with added stages to increase its length.

FIG. 10A shows a method of increasing the length of the relay delay system by adding more stages. That is, besides the A.M. 276, one or more additional intermediate images 277 of the end mirror 274 are created that are intermediate in position between the A.M. 276 and the end mirror 274. The A.M. 276 and intermediate A.M. surfaces 277 do not have to be near any lens, as shown, they could lie in between lenses. The details of the number of lenses, their spacings and focal lengths are not important as long as the last apparent mirror 276 produced has the same curvature as the short arm mirror and significant vignetting does not occur along the chain from 274 to 270.

Figure 10B:
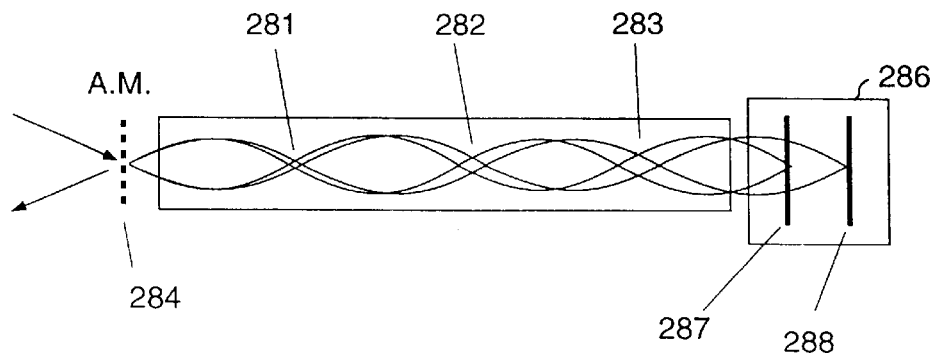
FIG. 10B shows a delaying mirror implemented by a waveguide and a distributed mirror which compensates for chromatic aberration in the waveguide.

The logical extrapolation of the multi-stage long relay chain of FIG. 10A is a waveguide (FIG. 10B), since this also forms intermediate A.M. surfaces 281, 282, 283 between the apparent mirror 284 and the distributed end mirror 286. A waveguide is a conduit having a refractive index that varies quadratically cylindrically from the center axis. This could also be formed from an infinite number of infinitely weak positive lenses. A ray traveling through this waveguide makes sinusoidal like paths that periodically come to foci (at 281, 282, 283). These waveguides are commercially available in short lengths. In principle, a very long waveguide could be constructed.

These waveguides require a distributed mirror to counteract the dispersion in the medium. For example, if a simple plane mirror was placed at the end of the waveguide, the apparent mirror would be at different positions for different wavelengths. This chromatic dispersion can be compensated for by using a distributed mirror 286 for the end mirror, where the effective position of the end mirror for red light 288 is different for blue 287 and exactly compensates the dispersion so that the apparent mirror 284 is at the same location for all wavelengths.

Figure 10C:
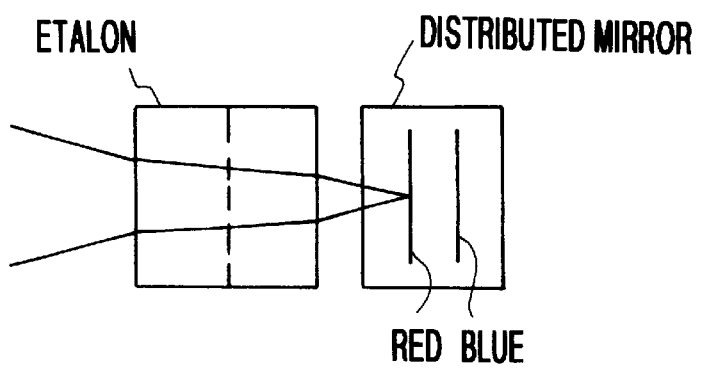
FIG. 10C Red and blue rays passing through an achromatic etalon formed from the combination of an etalon and a distributed mirror.

The distributed mirror could be constructed using volume holographic or interference filter technology. The distributed mirror would consist essentially of a stack of dielectric mirrors, each reflecting a narrow range of wavelengths and positioned at the appropriate depth to compensate for the dispersion of the waveguide, or other delay optics. Note that the method of using a distributed mirror could be used in any of the optical designs discussed in this document, not restricted to the waveguide kind, to correct for chromatic dispersion of the A.M. For example, the distributed mirror could be combined with an etalon to make an achromatic etalon as shown in FIG. 10C.

5. Delaying Mirrors Using Virtual Imaging

Delaying mirrors can be made using virtual imaging instead of real imaging. Virtual imaging generally occurs when the spacing of optical elements is closer than their focal lengths. One kind of this delay can be called a "2-element" delay to distinguish it from 3-element designs.

Figure 11A:
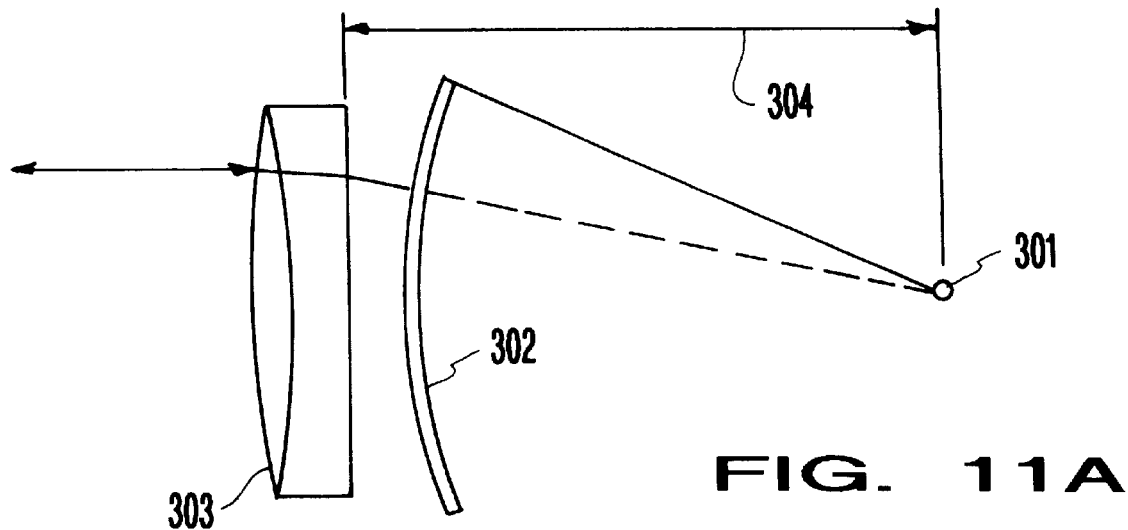
FIG. 11A shows a 2-element delaying mirror using a positive lens, a convex mirror and virtual imaging.

An achromatic 2-element delay can be made from the combination of an achromatic lens and a curved mirror. FIG. 11A shows a 2-element delay comprising a positive lens 303 which is close to a convex mirror 302, and FIG. 11C comprising a negative lens 305 which is close to a concave mirror 306.

Figure 11B:
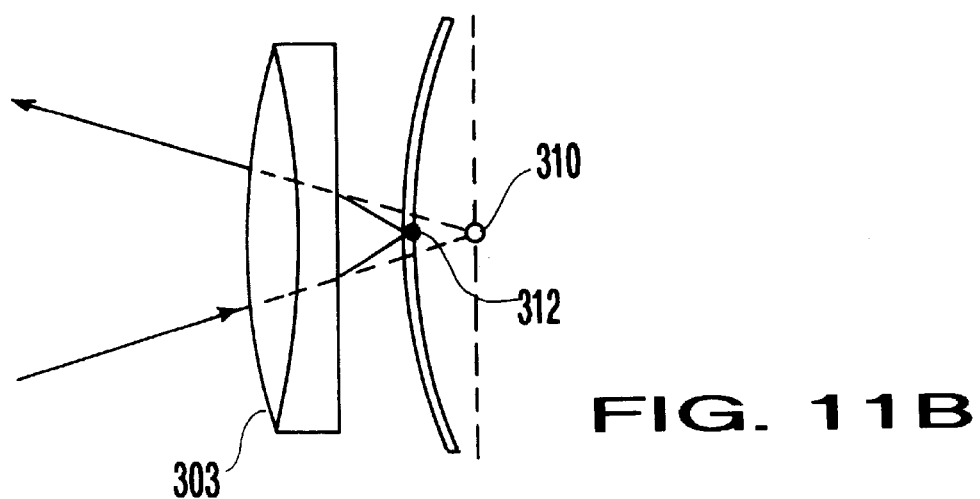
FIG. 11B shows that the apparent mirror position for the delaying mirror of FIG. 11A is a virtual image of the end mirror.
Figure 11C:
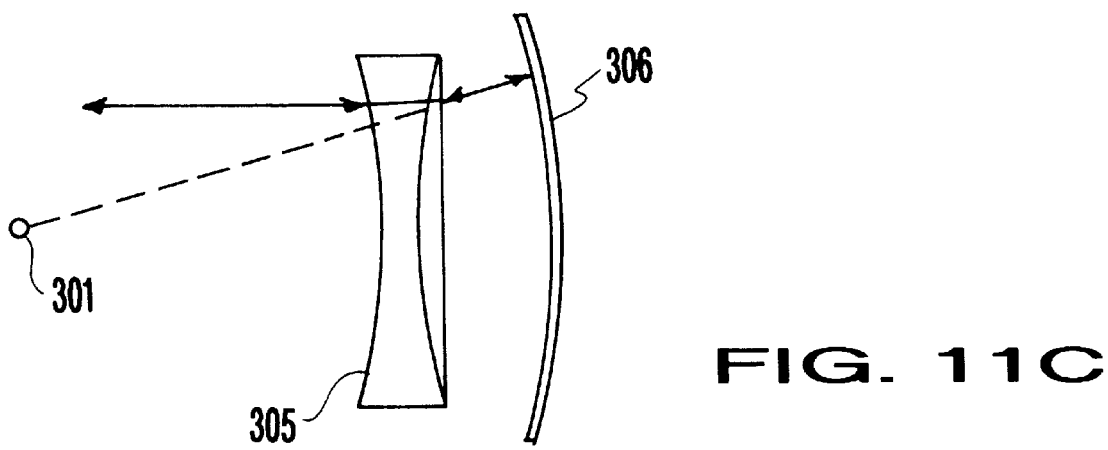
FIG. 11C shows a 2-element delaying mirror using a negative lens, a concave mirror, and virtual imaging.

In both kinds, the focal point 301 of the transmissive lens 303 or 305 is arranged to superimpose the center of curvature (CC) of the spherical end mirror 302 or 306. This images the CC to infinity, so that the apparent mirror formed is flat. Other A.M. curvatures can be obtained by appropriately adjusting the spacings between elements. FIG. 11B shows that the location 310 is found by virtually imaging the end mirror surface 312 by lens 303.

Figure 12A:
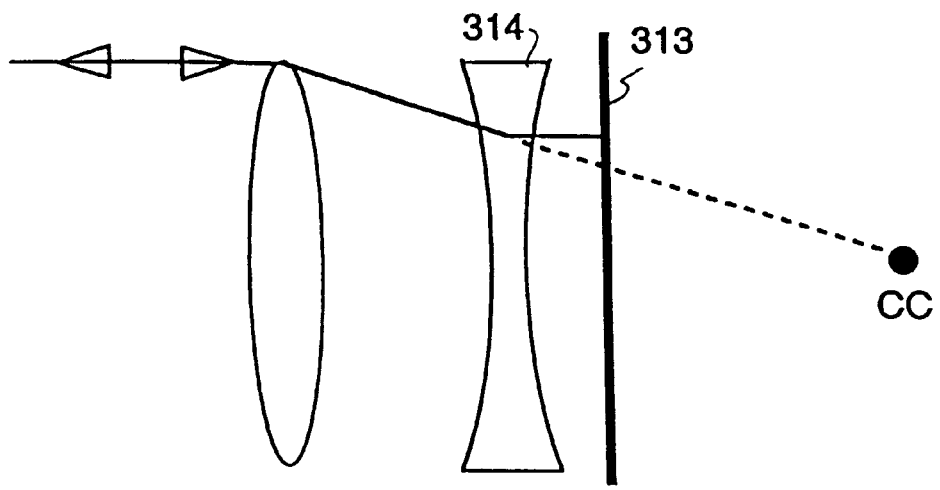
FIG. 12A shows a 3-element delaying mirror using virtual imaging.
Figure 12B:
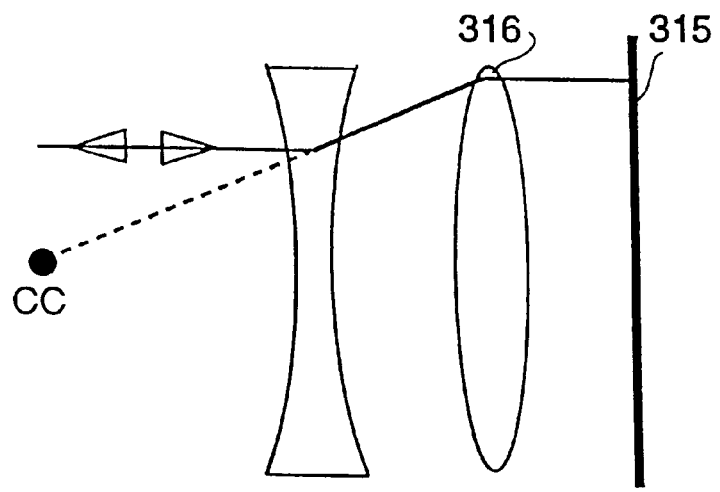
FIG. 12B shows another 3-element delaying mirror using virtual imaging.

FIGS. 12A and 12B show 3-element delays described by Pierre Connes ("Deuxieme Journee D' Etudes Sur Les Interferences," Rev. Optique Theorique Instr., vol. 35, p 37, 1956). These use a plane mirror and two lenses to create an apparent mirror. The combination of lens 314 and plane mirror 313 acts as a convex spherical mirror analogous to 302, and lens 316 and plane mirror 315 acts as a concave spherical mirror analogous to 306. The advantage of the 2-element configuration over the 3-element is the smaller amount of unwanted reflections at the lens surfaces, the smaller thickness of glass the light has to travel through, which reduces unwanted dispersion in the delay time, and simpler construction and alignment, since one less element is required.

Figure 13A:
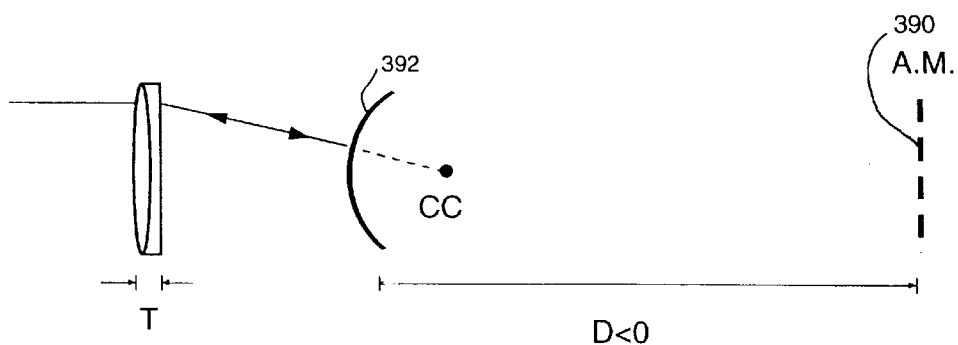
FIG. 13A is an example of when the apparent mirror is far behind the end mirror.
Figure 13B:
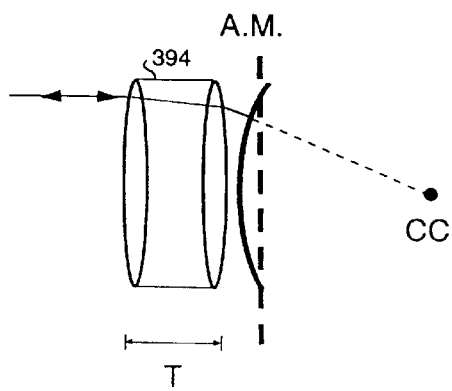
FIG. 13B is an example of when the apparent mirror is very near the end mirror.
Figure 13C:
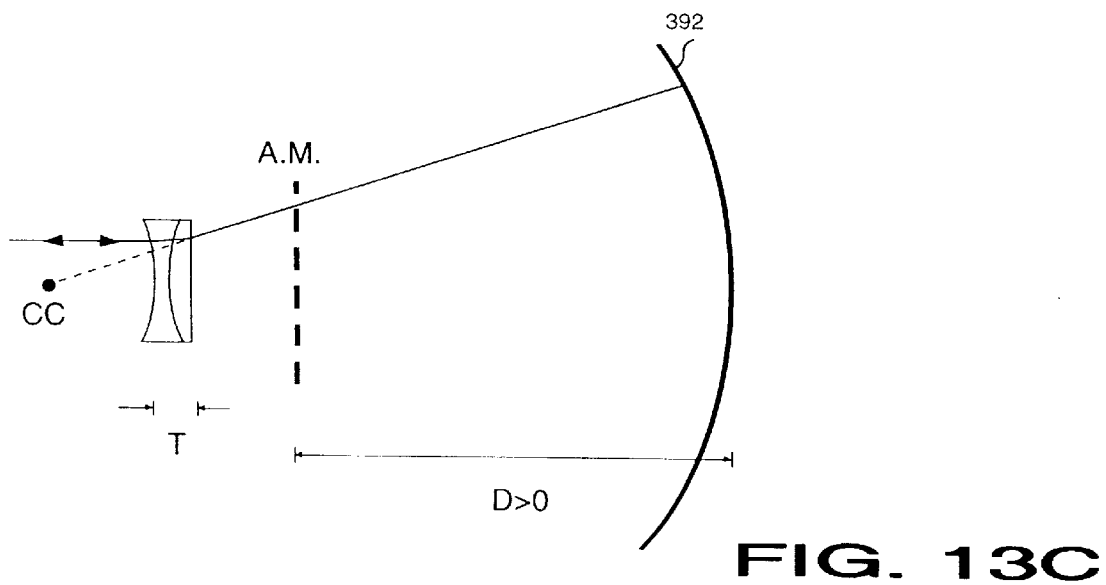
FIG. 13C is an example of when the apparent mirror is in front of the end mirror.

Both positive and negative delay times can be created by the 2-element delay. The net delay time $\tau=2D/c+2T(n-1)/c$, which is a sum of a contribution due to the displacement D of the A.M. relative to the end mirror, and a contribution from an insertion delay due to the thickness of the glass lens. The former contribution can be positive or negative. The latter contribution is always positive. The former contribution can be positive when the A.M. is in front of the end mirror, as in FIG. 13C. The former contribution can be negative when the A.M. is behind the end mirror, as in FIG. 13A. FIG. 13B shows that a thick lens 394 can produce a positive delay even though the A.M. is slightly beyond the end mirror.

Figure 14:
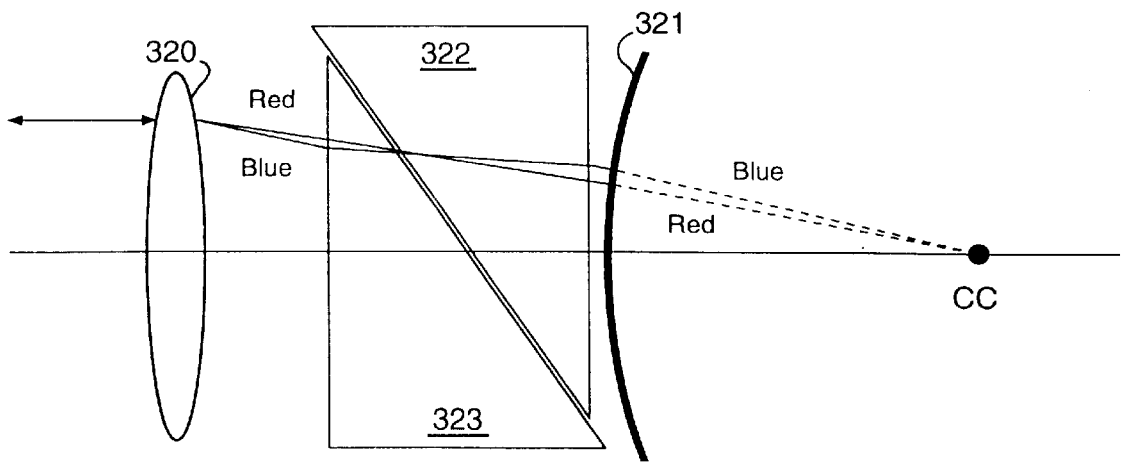
FIG. 14 shows how the chromatic dispersion of a simple lens and an adjustable etalon in a delaying mirror can cancel.

These delays are optimally achromatic by using lenses and mirrors which are individually achromatic, such as standard multi-element achromatic lenses and first surface mirrors. Alternatively, non-achromatic elements having chromatic effects of opposite polarity can be combined so that the net chromatism is reduced. This is shown in FIG. 14 which shows the paths 323, 325 of red and blue rays, respectively, and how the chromatic dispersion of a simple lens 320 can be compensated for by the dispersion of an etalon 322 of a sufficient thickness. The simple lens will refract the blue more than the red toward the optic axis. The etalon will refract the blue so that it has a shallower angle within the etalon. The net effect is to have both the red and blue share the same focal point, which is arranged to coincide the CC of the end mirror 321. The etalon thickness can be adjusted by using a pair of wedges 322 and 323 having equal angles that slide against each other, or by using one or more etalons in the path and tilting them.

6. Wedge and Inclined Delay

In many applications it is useful to have a delay value which varies spatially across the apparent mirror, usually linearly, so that an interferometer may produce a fringe comb having parallel fringes. This allows correspondence between a spatial position in the output image and a specific delay value. This might be called an "inclined" delay. A large inclination would be useful for example in Fourier Transform (FT) spectroscopy for taking a snapshot fringe record spanning a large delay range. This allows measuring an accurate fringe record for a pulsating source. (Conventional FT spectrometers mechanically scan the delay, which takes time and therefore isn't suitable for pulsed sources).

For small degrees of inclination, the incline can be achieved by tilting an interferometer end mirror so that the overlap between the A.M. or the end mirror of each arm varies across the beam. However, for large degrees of tilt this is unsatisfactory because the larger separations degrade the fringe visibility, so visible fringes would only occur in some section of the A.M. where the overlap separation passes through zero.

Figure 15A:
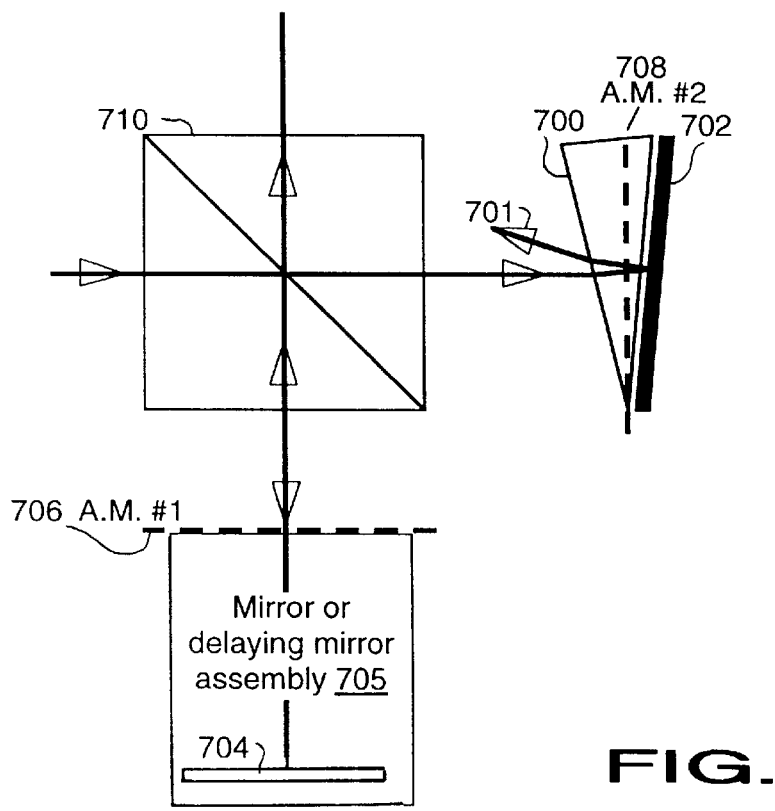
FIG. 15A shows the use of a wedge to create a delay which varies transversely across the beam.

FIG. 15A shows a method of maintaining the A.M. superposition in spite of a large mirror tilt. This is a method of achieving a large delay incline without degrading superposition quality.

A wedge prism 700 is inserted into the optical path. Since this deviates the output beam path of one arm relative to the others, perfect superposition of output paths (as in FIG. 1B) will not be achieved. However, superimposition of images can be achieved (as in FIG. 1C and D) if the wedge is located near the input/output plane. The input/output plane is usually best located near the apparent mirror. Thus the wedge could be located near A.M. 706, or the end mirror 702, or near the end mirror 704 of the delaying mirror assembly 705, since this is imaged to the A.M. The detector which records the fringes should be placed at an image of the input/output plane, so that paths from the different interferometer arms converge on the same pixels.

Note that in some applications it is desired to have an interferometer having an inclined delay that passes through zero delay or its vicinity. To achieve this, an ordinary mirror is substituted for the delaying mirror 705.

Figure 4A:
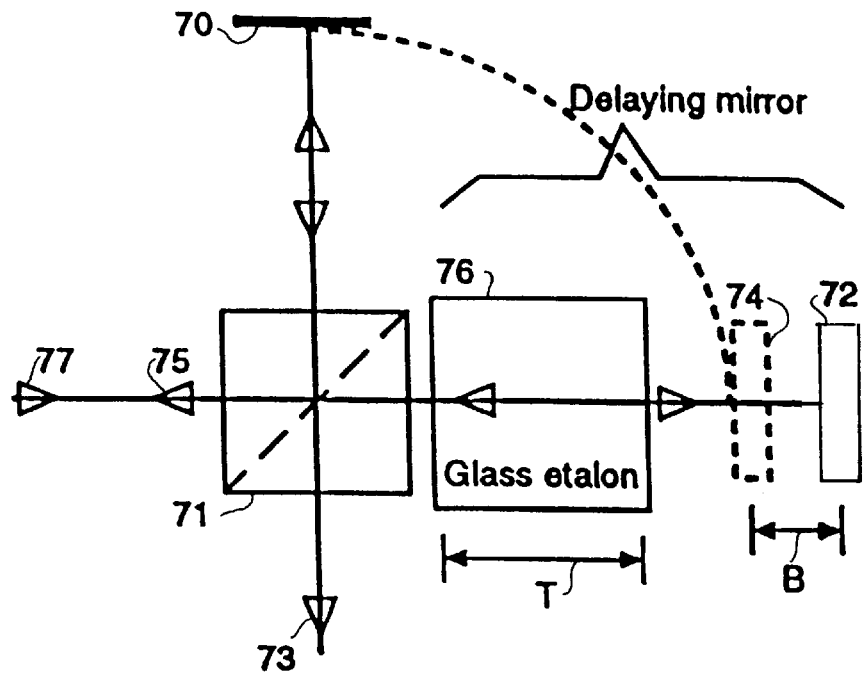
FIG. 4A is a Michelson using an etalon to achieve superposition.
Figure 4B:
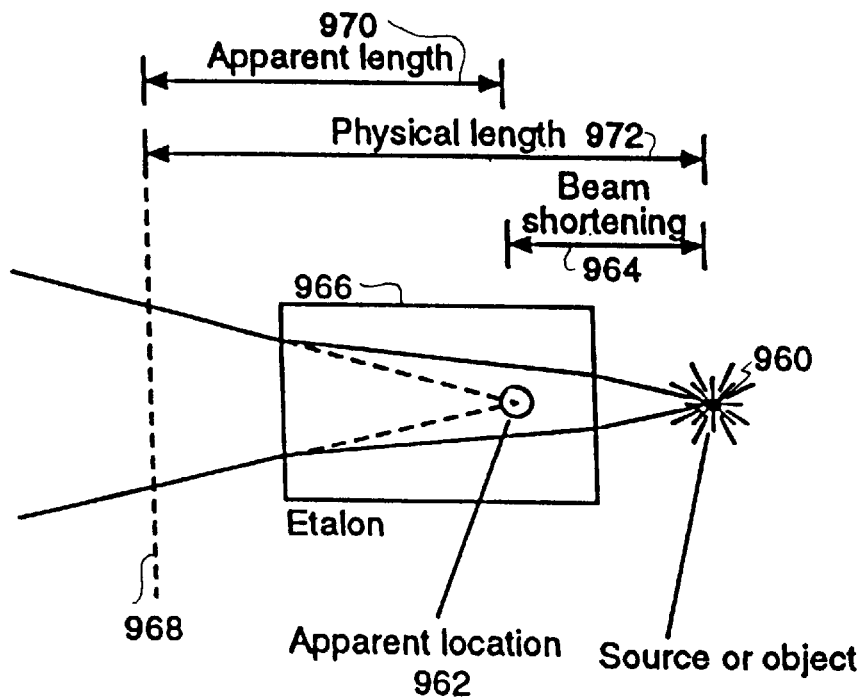
FIG. 4B shows what is meant by the term "beam shortening."

FIG. 15A shows the wedge next to the short arm mirror 702. The angles in FIG. 15A may be exaggerated for clarity. FIG. 15B shows a detail of the action of the wedge on rays. The left side of FIG. 15B shows the path of a ray (bold arrows) incident perpendicular to the A.M. #2 (709). The right side is a geometric construction for locating the second apparent mirror A.M. #2 (709), assuming the end mirror 713 is immediately adjacent to the wedge. This is done by pretending that the surface 711 is the first surface of a etalon and that the mirror 713 is embedded inside the etalon. For the same reason that the etalon 76 in FIG. 4A displaces the apparent position of the mirror 72 due to refraction, the refraction at surface 711 makes each point on the surface of mirror 713 appear closer to surface 711 by an amount B that is proportional to the wedge thickness as measured from surface 711. This creates an apparent mirror A.M. #2 (709) which is inclined to both surface 711 and to the mirror 713. The apparent displacement is $B=T(n-1)/n$ at 712, where n is the refractive index, and T at 714 is the thickness of the wedge normal from surface 711. In FIG. 15A, the end mirror 702 and wedge 700 combination is tilted so that A.M. #2 (708) superimposes the first apparent mirror 706 in reflection about the beamsplitting surface 710.

This creates an inclined delay time which varies linearly transversely along the apparent mirror, while satisfying the superimposing condition for monochromatic light. The inclination magnitude $\Delta c\tau$, which is the change in delay across the beam, is given by $\Delta c\tau=2[T(n-1)/n+T(n-1)]$ is the sum of the component due to apparent mirror displacement, and the component due to the slower speed of light through the wedge thickness. This formula is accurate for small angles of incidence where $\sin\theta\approx\theta$.

Due to wedge glass dispersion, the A.M. overlap is perfect only for a single wavelength. However, the amount of chromatic mis-overlap is only approximately 2% of the delay, so it is much smaller than if the mirror were tilted alone to create the same amount of incline. Since a certain amount of mis-overlap can be tolerated, this method allows a 50 times greater tilt to be created for the same loss of fringe visibility.

Figure 16:
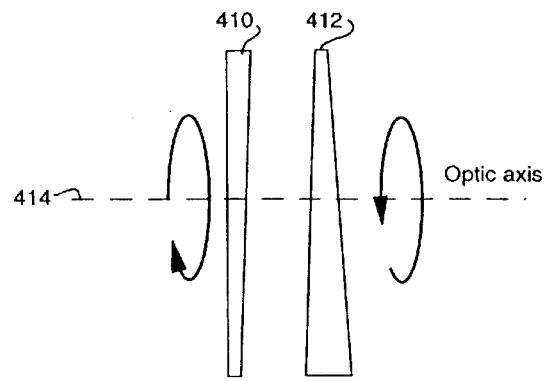
FIG. 16 shows the net wedge angle being adjusted by twisting component wedges about a common axis.

An example follows: suppose we desire a round trip delay incline of $1000\lambda$ across the A.M. If the wedge refractive index is n=1.5, then $\Delta c\tau=1000\lambda\approx 2T(0.83)$. Thus we need a thickness T of $600\lambda\approx 300$ microns for green light where $\lambda=500$ nm. FIG. 16 shows that such a shallow wedge can be conveniently made by combination of two component wedges 410, 412 whose wedge angles may be slightly different, or whose refractive indices may be slightly different. The net wedge incline is the sum of component inclines, and can be adjusted by twisting the component wedges relative to each other about the common optic axis 414.

Birefringent wedges can be used to create an incline which has different values for different polarizations. This is useful in a polarization resolving retro-reflecting interferometer, discussed later in FIG. 31, to produce an inclined delay for the detected light, but a uniform delay for the illuminating light, even though the detected and illuminating light pass through the same interferometer apparatus.

7. Achromatic Inclined Delays

An achromatic inclined delay can be made use of two or more wedges in combination 719 in one arm together, with an ordinary etalon 718 in the opposite arm (FIG. 15C). The wedge elements are made of materials having differing dispersive powers, such as crown and flint glass, analogous to the method of making an achromatic lens. (Dispersive power is the ratio $(n_B-n_R)/(n_B+n_R)$, where $n_B$ and $n_R$ are the refractive indices for blue and red light. "Flint" glass has a greater dispersive power than "crown" glass.) The component wedges are oriented thin side to thick side, as shown in FIG. 15D.

FIG. 15D shows the wedge combination when the A.M. of each component wedge are considered individually, and FIG. 15E show the net effect when they are combined. For any dispersive material, because the refractive index for blue and red differ, the A.M. formed for red light differs from that formed for blue. The red and blue A.M. for each individual wedge 716, 717 are drawn as dashed lines. They make a slight angle to each other. The goal is to match the red/blue angle in wedge 716 to be opposite that in wedge 717. When this is achieved, the net A.M. for red and blue for the combination of wedges are parallel to each other, as shown in FIG. 15E. The wedge with the more dispersive glass will be the thinner of the wedges.

Since both the red and blue A.M.s are inclined relative to the thickness variation of the net wedge combination, an inclined time delay is created. An etalon 718 is placed in the other arm with an appropriate thickness to cancel the parallel displacement between the blue and red A.M.s.

Specifically, let $n_{1B}$, $n_{1R}$, $n_{2B}$, $n_{2R}$ be the refractive indices for blue and red light for two wedge materials #1 and #2, and $T_1$ and $T_2$ be the thickness of the wedges at their thick sides, and let the thin side of the wedge have zero thickness, then we require $$T_1\left[\frac{n_{1B}-1}{n_{1B}} - \frac{n_{1R}-1}{n_{1R}}\right] = T_2\left[\frac{n_{2B}-1}{n_{2B}} - \frac{n_{2R}-1}{n_{2R}}\right]$$

in order to make parallel blue and red A.M.s. Then we select the etalon 718 on the other arm having a thickness $T_3$ and refractive indices $n_{3B}$, $n_{3R}$ by requiring $$T_3\left[\frac{n_{3B}-1}{n_{3B}} - \frac{n_{3R}-1}{n_{3R}}\right] = T_2\left[\frac{n_{2B}-1}{n_{2B}} - \frac{n_{2R}-1}{n_{2R}}\right]$$

If $\alpha$ is a parameter describing the fractional position across the wedge, then the net delay $c\tau$ varies linearly with $\alpha$ as $$c\tau = \alpha 2T_1\left[\left(\frac{n_1-1}{n_1}\right) + (n_1-1)\right] + (1-\alpha)2T_2\left[\left(\frac{n_2-1}{n_2}\right) + (n_2-1)\right] - D_E$$

where $D_E$ is the constant delay contributed by the etalon in the opposite arm and is $$D_E = 2T_3\left[\left(\frac{n_3-1}{n_3}\right) + (n_3-1)\right]$$

and the indices $n_1$, $n_2$, $n_3$ are color dependent refractive indices for materials #1, #2 and #3.

Realistic wedges have non-zero thickness on the thin side. These can be used in the above equations by considering them to comprise a wedge with a zero thickness then side, plus an etalon. These new etalons add an additional constant displacement between red and blue A.M., so the etalon 781 on the other side must be increased in thickness appropriately to cancel this out.

8. Achromatic Etalon Delays

Figure 15F:
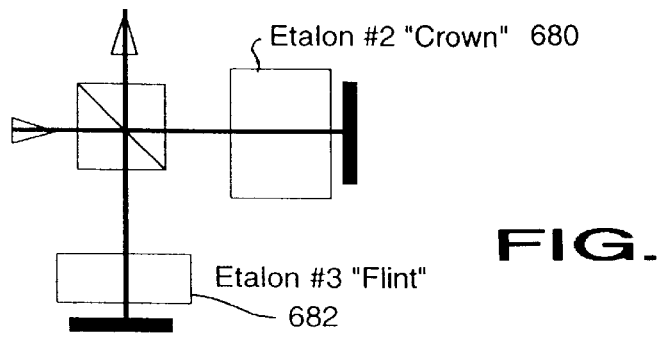
FIG. 15F shows etalons having different dispersive powers placed in opposite arms to form an achromatic etalon delay.

A conventional etalon delay creates an A.M. that has different locations for red and blue light due to dispersion in the refractive index. This prevents application of thick etalons in broad bandwidth superimposing interferometers. A method of creating an achromatic etalon has already been discussed in FIG. 10C using a distributed mirror. An other method is by using two etalons 680, 682 placed in opposite arms (as shown in FIG. 15F), and having materials of different dispersive powers, such as "crown" and "flint" glass. In analogy with an achromatic wedge discussed above, the thickness of the etalons 680, 682 are chosen so that the red-blue A.M. displacement created by etalon 680 is canceled by the red-blue A.M. displacement by the other etalon 682. Thus if etalons 680 and 682 are identified by subscripts "3" and "2", then we require that the etalon thickness are related by the same formula as above:

$$T_3\left[\frac{n_{3B}-1}{n_{3B}} - \frac{n_{3R}-1}{n_{3R}}\right] = T_2\left[\frac{n_{2B}-1}{n_{2B}} - \frac{n_{2R}-1}{n_{2R}}\right]$$

and the net delay created will be described by the formula for $c\tau$ stated in the previous section, but with $\alpha=0$. The etalon of the less dispersive material would be thicker than the etalon of the more dispersive material.

A consequence of creating delays using chromatically dispersive media such as glass is that even though good overlap is achieved for all colors (so that fringe visibility is good), the value of delay $\tau$ may be a function of color. This is called dispersion in $\tau$. Thus, the term "achromatic" in this document refers primarily to a wavelength independent A.M. overlap, and only secondarily to a wavelength independent value of $\tau$. Dispersion in $\tau$ is not a serious problem, because if the fringe is visible, its phase can be adjusted during data analysis after it is recorded. Secondly, in pairs of matched interferometers, the dispersion in $\tau$ can often be matched, so that the fringe phase will not be affected.

Etalon delays are useful because the delay value is independent of transverse position of the etalon, which simplifies alignment compared to delaying mirrors that use lenses.

9. Differential Interferometer

Figure 17A:
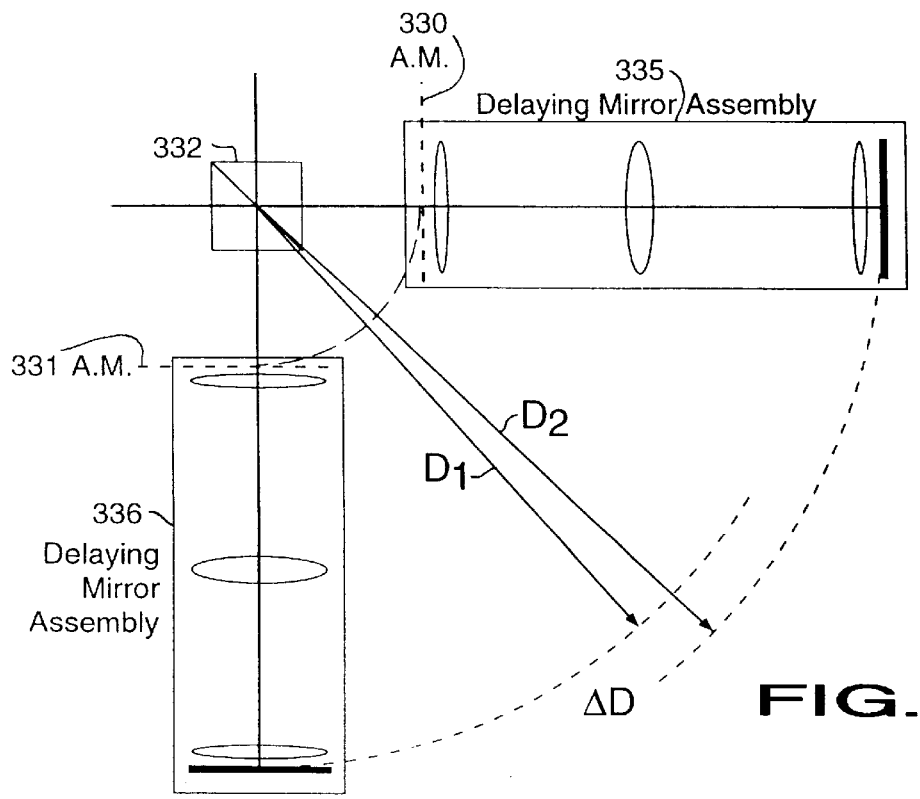
FIG. 17A shows a differential superimposing interferometer using real imaging in the delaying mirrors.

A method of creating a superimposing interferometer with a relative small or zero delay, which can be adjustable, and which as a wide distortionless image field, is to have a delaying mirror in both arms. This is called the differential interferometer. FIG. 17A shows a differential embodiment having delaying mirrors 335 and 336 which use real imaging. The apparent mirrors 330 and 331 are overlapped in partial reflection of the beamsplitter 332. The two arms may be only slightly different in length ($D_1$ and $D_2$) and the difference in length $\Delta D$ forms the net delay, $\tau=2\Delta D/d$. A key advantage is that since $D_1$ and $D_2$ can be much longer than the difference ΔD, the wavefront curvatures inside the delaying mirrors 335, 336 can be very shallow (nearly flat) which reduces aberrations in the A.M. they produce. Secondly, these aberrations tend to be similar in shape and magnitude, and thereby improve the overlap between A.M. 330 and A.M. 331 compared to if one of these A.M. were being overlapped with a flat mirror.

This is an advantage, for example, when using an off-axis reflection in the delaying mirror (such as in FIG. 6B) which introduces astigmatism. Since the astigmatism in each arm will nearly match, then net aberration is reduced. Similarly, chromatic and spherical aberrations can be reduced. The result is that the differential configuration produces a wider diameter region at the A.M. having good overlap than a non-differential configuration, for the same delay time.

For example, suppose the goal is to generate a 1 cm (single-trip) net delay. If this is done by a single ~1 cm long delaying mirror assembly in one arm overlapped with a flat mirror in the other, then the aberrations at the A.M. grow very rapidly with radius away from the optic axis. (This is because the center lens of a 1 cm real imaging delay would have a small focal length of only ¼ cm.) The "good overlap region" may only be 1 or 2 millimeters radius. However, if a differential configuration is used with a 400 cm length relay compared against a 401 cm relay, then the wavefront curvature inside each delaying mirror assembly is long. This creates a very large good overlap region of many centimeters radius from the optic axis.

10. Increasing Fringe Visibility by A.M. Placement

Figure 17B:
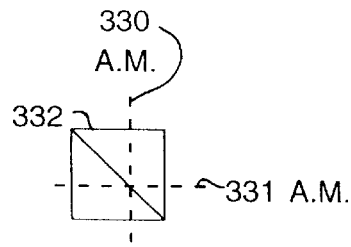
FIG. 17B shows that the apparent mirrors of FIG. 17A can be located in the vicinity of the beamsplitter to reduce effect of beamsplitter surface irregularities.
Figure 18A:
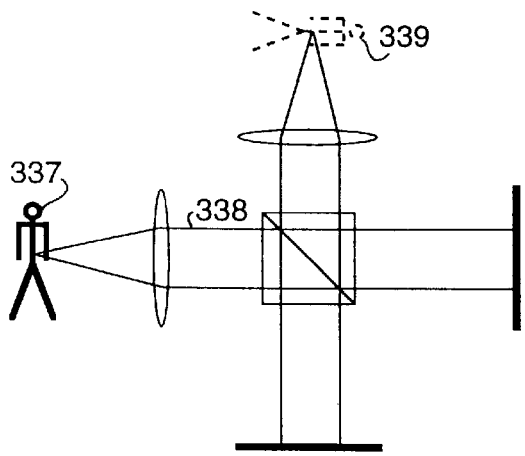
FIG. 18A shows how parallel beams in a conventional interferometer are effected by surface irregularities from all of the beamsplitter area.
Figure 18B:
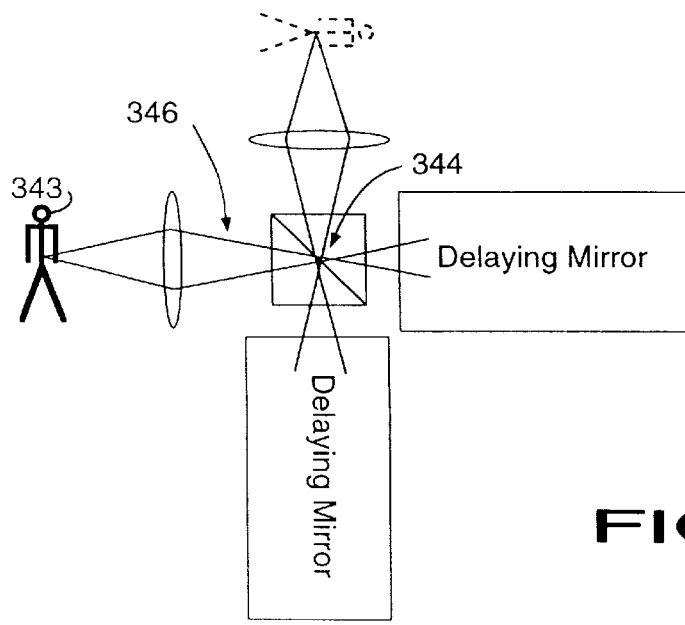
FIG. 18B shows that the beams in the superimposing interferometer from a given object pixel may sample only small portions of the beamsplitter.

In the differential configuration, the apparent mirrors 330 and 331 can be located within the beamsplitter as shown in FIG. 17B. In the non-differential configuration this is not possible, because the A.M. must overlap the short arm mirror, which is necessarily outside the beamsplitter. Having the A.M. overlap the beamsplitter maximizes the fringe visibility in the presence of irregularities in the beamsplitter surface. The explanation is shown by FIG. 18A & B.

In a non-superimposing Michelson interferometer (FIG. 18A), the beamlet 338 from an object pixel 337 fills the entire beamsplitting surface because the rays must be parallel to produce a coherent delay. This is also the case anytime the A.M. is far from the beamsplitter. The wide beamlet samples the full range of irregularities across the beamsplitting surface. This reduces fringe visibility.

In contrast, by placing the A.M. at the beamsplitter and by making the A.M. the input/output plane, then the beamlet of rays 346 leaving an object pixel 343 passes through a minimal area of the beamsplitting surface, so that over this small region the beamsplitting surface is uniform so the fringe visibility is high. Thus, any irregularities in the beamsplitter cause a irregularities in the phase of the fringe and not its visibility. This is better, because the phase irregularities are constant and can be corrected numerically at a later time.

11. Recirculating Interferometer

Figure 3A:
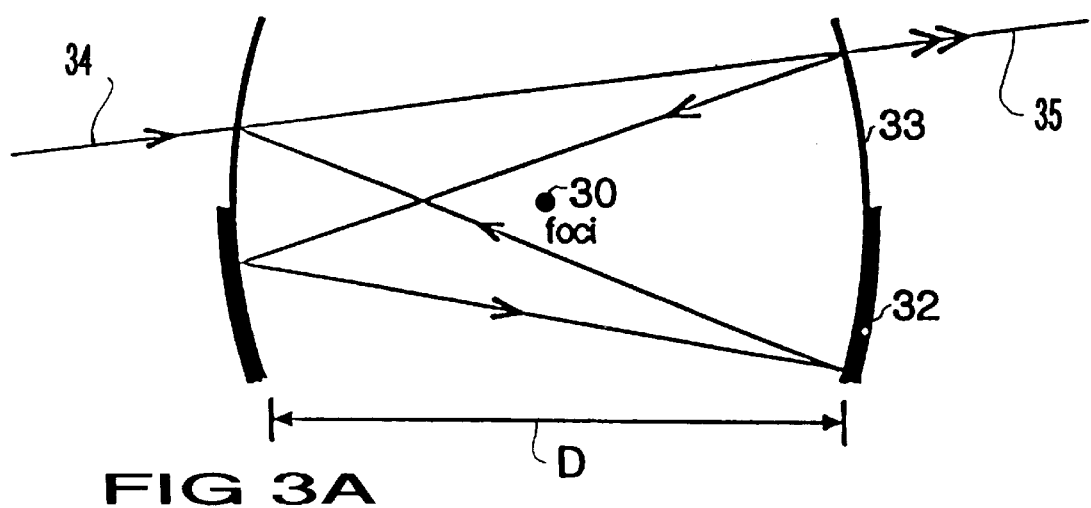
FIG. 3A shows a Spherical Fabry-Perot interferometer.
Figure 3B:
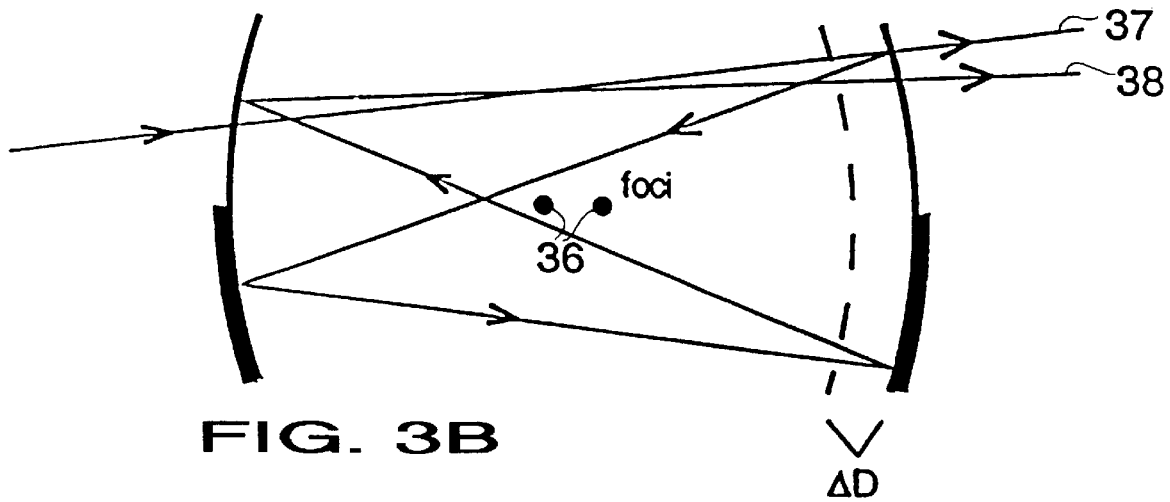
FIG. 3B shows the effect of changing the mirror separation of a Spherical Fabry-Perot interferometer.

The Michelson interferometer is a two-path interferometer which generates one echo in addition to the original pulse, for a given applied pulse. Another kind of interferometer, called the recirculating interferometer, generates an infinite progression of gradually decreasing echos all separated by the same delay τ, which corresponds to the round trip time. A conventional Fabry-Perot is an example of a recirculating interferometer, however it is non-superimposing. The spherical Fabry-Perot of FIG. 3A is a superimposing, but its delay time is not adjustable because the mirror center of curvatures are fixed and must overlap. Secondly, the beam can't pass exactly down and partially reflective regions 33, 32. This is unfortunate because the minimum aberrations of the curved mirrors are achieved for rays going down the optic axis.

Figure 19A:
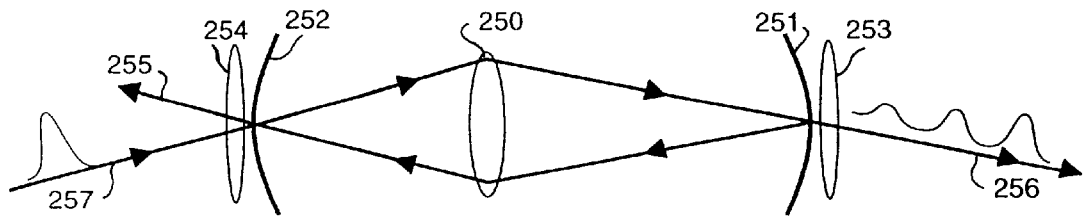
FIG. 19A shows a simple superimposing recirculating interferometer.

New superimposing versions of a recirculating interferometer are shown in FIGS. 19A, B C and D. Some of these versions allow adjustability for the mirror spacing, and hence delay, while maintaining the superimposing condition. In FIG. 19A, a positive achromatic lens 250, called the center lens, lies in between two curved partially reflecting mirrors 251 and 252 and images the surface of mirror 252 to the other mirror 251, and produces positive unity magnification per round trip so that a ray returns to its same place on the mirror surface after one circuit. In contrast, the roundtrip magnification of the spherical Fabry-Perot in FIG. 3A is not positive unity, but negative unity, since the ray does not return to the same place on and end mirror after one roundtrip between the two end mirrors. It requires two roundtrips to return to the same place.

Figure 19B:
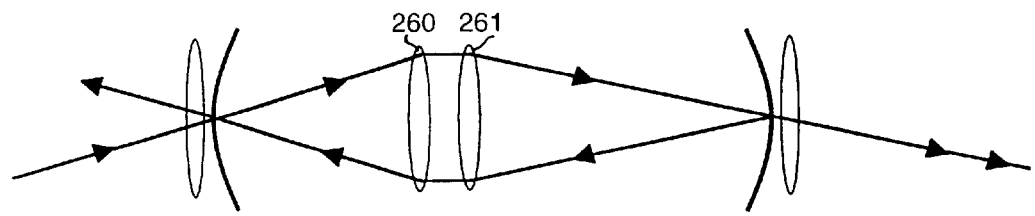
FIG. 19B shows use of a center lens combination to increase adjustability.

The center lines 250 can be replaced by a combination of lens elements to increase the adjustability of configuration. In FIG. 19B, two lens elements 260 and 261 act as the center lens.

Figure 19C:
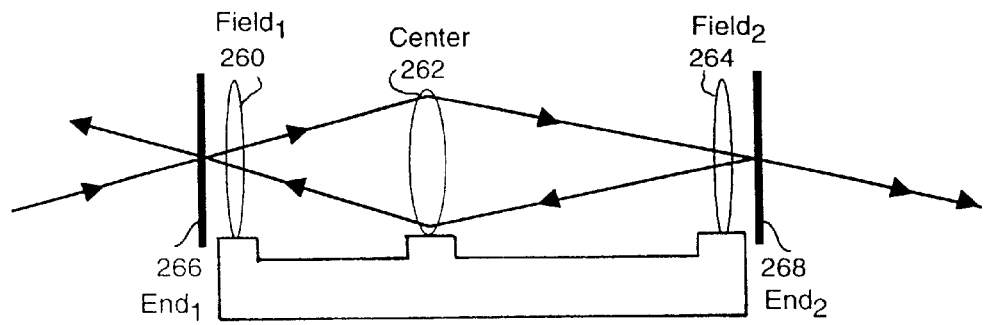
FIG. 19C shows a recirculating interferometer with plane end mirrors and lenses substituted for curved mirrors.

The curved mirrors 252 and 251 of FIG. 19A & B can be replaced by combinations of a flat mirror and lens, such as 266 & 260, 268 & 264 in FIG. 19C. In general for FIG. 19A, B & C, the center of curvatures (CC) of the two end mirrors must overlap after accounting for any imaging effect by the internal lenses. Thus, in FIG. 19C, left infinity must be imaged by the 'lenses 260, 262, 264 to right infinity. It optimal to have the center lens 250 or lens combination 260 and 261 asymmetrically placed between the end mirrors 251 and 252 to create adjustability for imaging the surface of 251 to surface 252.

Figure 19D:
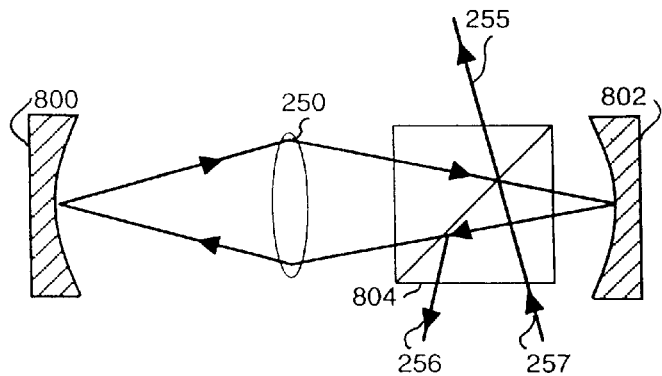
FIG. 19D shows coupling light in and out of a recirculating interferometer using a beamsplitting surface not at the end mirrors.

At least one partially reflecting surface must be provided so that light can be coupled into and out of the cavity. This can be accomplished by making the mirrors 252 and 251 partially transmitting/reflecting. These two mirrors do not have to have the same amount of reflectivity/transmissivity. Alternatively, an explicit beamsplitting surface such as the beamsplitting cube 804 in FIG. 19D can be placed anywhere in the recirculating path. This allows the end mirrors to be totally reflecting, which is very practical. For an input beam 257, two output beams 255 and 256 are created.

The recirculating interferometer has spectral properties that are analogous to the conventional Fabry-Perot used directly on axis. That is, whereas the Fabry-Perot has a circular central fringe which subtends a small cone angle about the optic axis, the superimposing interferometers can have an extremely wide central fringe that fills the entire field of view. This is a practical advantage.

The spectral character of a Fabry-Perot class of interferometer consists of a comb filter with peaks that can be very narrow compared to the spacing between peaks. Smaller loss of intensity per round trip produces narrower peaks (i.e., smaller transmittance of the end mirrors or larger transmittance of the beamsplitting cube 804). Numerous textbooks describe the spectral behavior of Fabry-Perot class interferometers versus the reflectivity and loss in the cavity. For example, on pages 307–309 in the book by Eugene Hecht and Alfred Zajac, "Optics", Addison-Wesley, Reading, Mass. 1976, Library of Congress No. 79-184159. Thus the reflectivities of the elements in a recirculating interferometer are chosen by deciding how narrow of a spectral peak is desired (related to a quantity called the finesse in textbooks).

In FIG. 19A, the lenses 254 and 253 outside the recirculating cavity cause the wavefront curvature of light entering and leaving the cavity to match that of light inside the cavity.

This allows a collimated incident beam at 257 to pass through the interferometer and be outputted at 256 as collimated. The focal point of lens 254 would be superimposed with the center of curvature of curved mirror 252, for example, to achieve this. Similarly for lens 253 and the CC of mirror 251. This is not necessary for when the end mirrors are flat, as in FIG. 19C.

A convenient method of designing the optics of a recirculating cavity of to consider a group of elements on one side of the cavity to form a delaying mirror which produces some apparent mirror surface, which may be curved or flat. Then the remaining optic or optics must superimpose with this A.M. and face it so that the light recirculates. For example, the surface and center of curvature of mirror 252 must match t he surface and CC of the A.M. computed for the combination lens 250 and mirror 251 in FIG. 19A. Secondly, the roundtrip magnification of an image must be positive unity, and not negative unity. Otherwise, there will be upside down images combined with the rightside up images in the output. When these conditions are met, superposition of paths is achieved.

Note that the combination of lenses are internal to the cavity in FIG. 19C should form a telescope that passes collimated light as collimated. By making the lens configuration asymmetric, the movement of the telescope allows the end mirror 266 to end mirror 268 spacing to be adjusted while maintaining the superimposing condition. Thus, the chart of FIG. 9B applies to the recirculating interferometer of FIG. 19C by placing a flat end mirror after the field lens 130.

12. Interferometers Made Without Delaying Mirrors

Figure 5A:
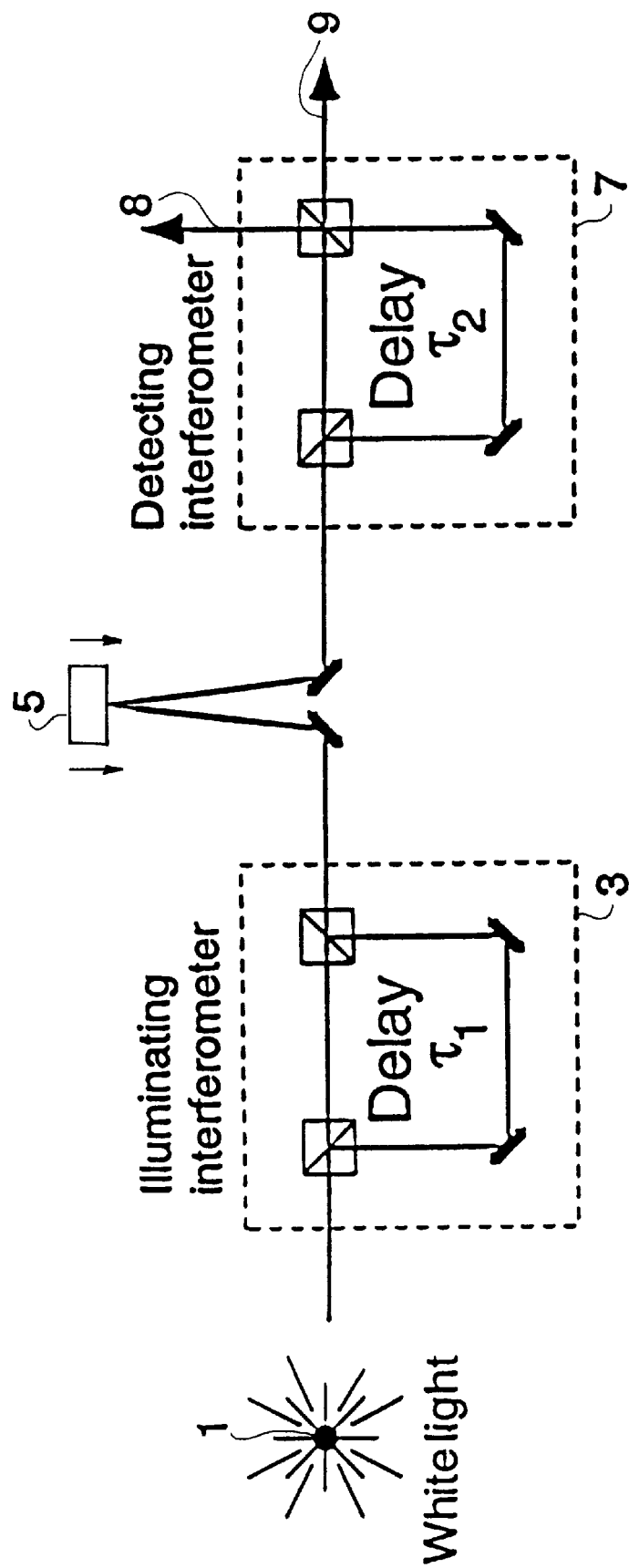
FIG. 5A is a topological diagram of a double interferometer configuration able to measure velocity.

Superimposing interferometers can be made without delaying mirrors by explicitly routing the beams using one or more beamsplitters into the topological configuration desired, such as the 2-path topology shown as interferometer 3 of FIG. 5A. The advantage is that this can avoid having the beam come back on itself, so that all of the interferometer output beams are easily accessible. In contrast, for the Michelson configuration (FIG. 4A) where the incident beam 77 enters normal to the mirror 72, there are two complementary outputs at 73 and 75. However, the output 75 comes back in the same direction as the incident beam 77, making it difficult to access. (One solution is to angle the incident beam off-normal. This is more easily done with a superimposing interferometer than non-superimposing because of the lack of strong angle dependence to the delay.)

Figure 20A:
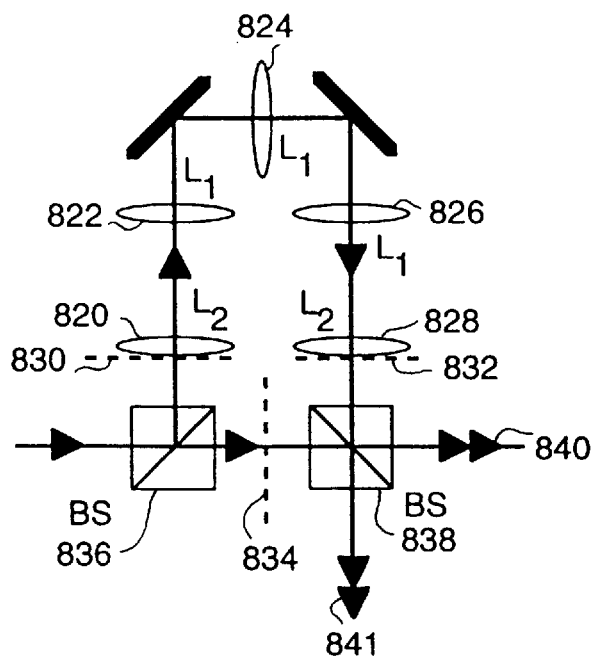
FIG. 20A shows a superimposing 2-path interferometer made without a delaying mirror by explicitly routing the beams using relaying optics.

A large variety of configurations are possible. FIG. 20A shows one embodiment for a 2-path interferometer. Beamsplitter 836 splits the incident beam into two paths, and beamsplitter 838 recombines them to form two complimentary outputs (840, 841). The difference in path lengths yields the delay time. In order to superimpose output paths for a given input ray, a relay lens system is used generally in one or both arms. In the case of FIG. 20A, it is only used in the longer arm. Any relay lens systems that are used must superimpose the input planes for each arm, and superimpose the output planes for each arm, and match magnifications. Optimally, in order to superimpose paths it should further match wavefront curvatures. Otherwise, it will only superimpose images, which is useful but less desirable. In FIG. 20A, the input planes are 834 and 830, superimposed by the beamsplitter 836, and the output planes are 834 and 832, superimposed by beamsplitter 834. Note that 834 is both an input and output plane.

Figure 20B:
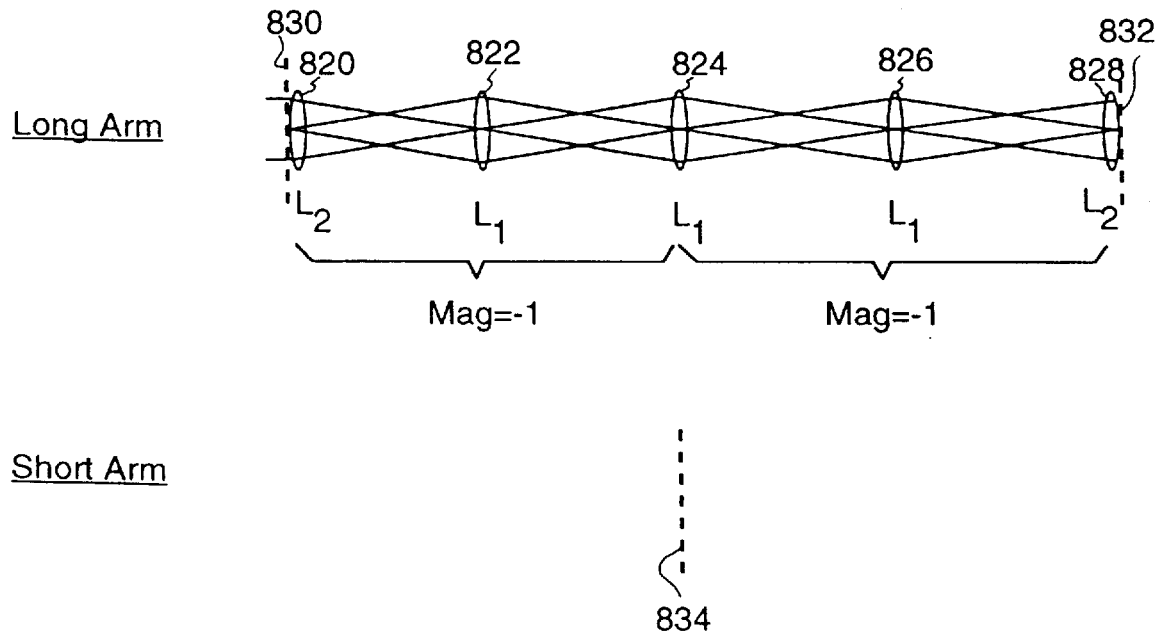
FIG. 20B shows the relay systems for the long and short arms of FIG. 20A laid out separately in a line.

For each arm, the input plane (830 or 834) is imaged by optics to the output plane (832 or 834). This is most easily seen by "unwinding" the two optical paths and displaying them separately in a line, in FIG. 20B. Since the input and output planes are flat, we desire that a point at left infinity be imaged by the relay optics to infinity on the right. (This is a way of matching wavefront curvatures between the two arms).

The focal lengths and positions of the lenses comprising the relay systems can be anything that satisfies the above conditions. The embodiment shown in FIG. 20A and B was chosen because it is simple to understand. The lenses 820 and 828 at the ends of the system have a focal length $L_2$ twice the focal length $L_1$ of the internal lenses 822, 824, 826. Each internal lens images the center of the lens to its left to the center of the lens to its right. Each end lens 820 and 828 focuses collimated light to/from the center of the lens neighboring it. This particular embodiment of the relay chain can be organized into two "stages", each which produces a magnification of negative unity. The total magnification of the system is therefore $(-1)(-1)=1$ is positive unity. This matches the magnification of the short arm, which is obviously unity because there is no relay system in the short arm.

Figure 21A:
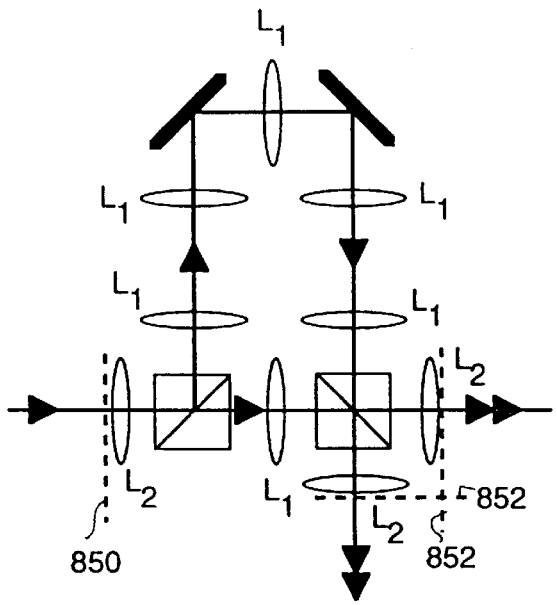
FIG. 21A shows another superimposing 2-path interferometer having a different overall polarity of magnification than in FIG. 20A.
Figure 21B:
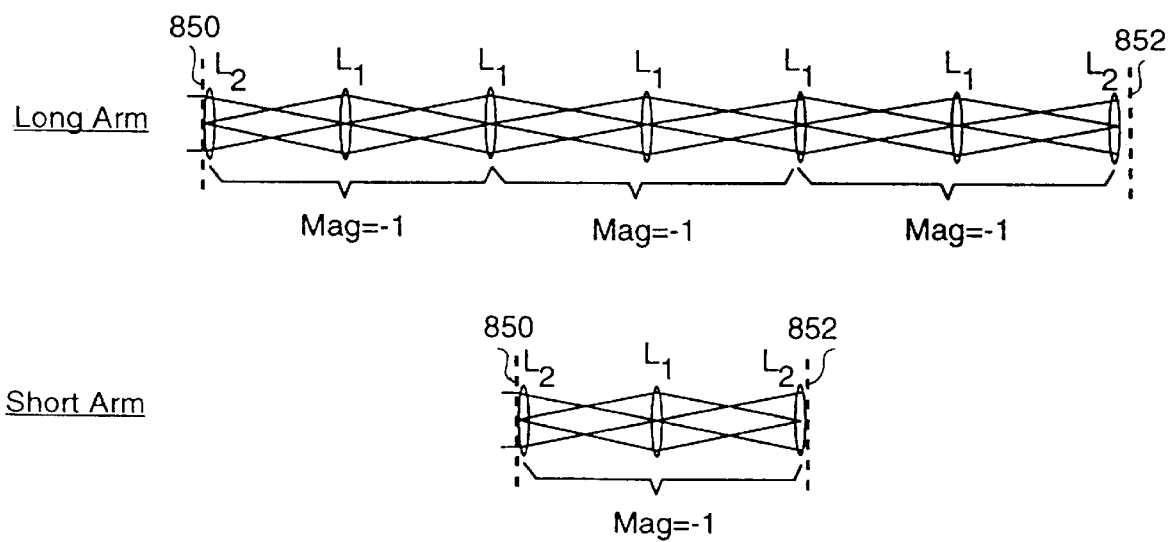
FIG. 21B shows the relay systems for the long and short arms of FIG. 21A laid out separately in a line.

FIG. 21A shows a similar 2-path superimposing interferometer, that differs from that in FIG. 20A by the inclusion of one more "stage" to the relay system of each arm. That is, now the short arm has one stage and the long arm three stages. Thus the magnification between the input 850 and output 852 planes is negative unity for both paths. FIG. 21B shows the relay systems of each arm of FIG. 21A when they are laid out in a line.

Figure 22:
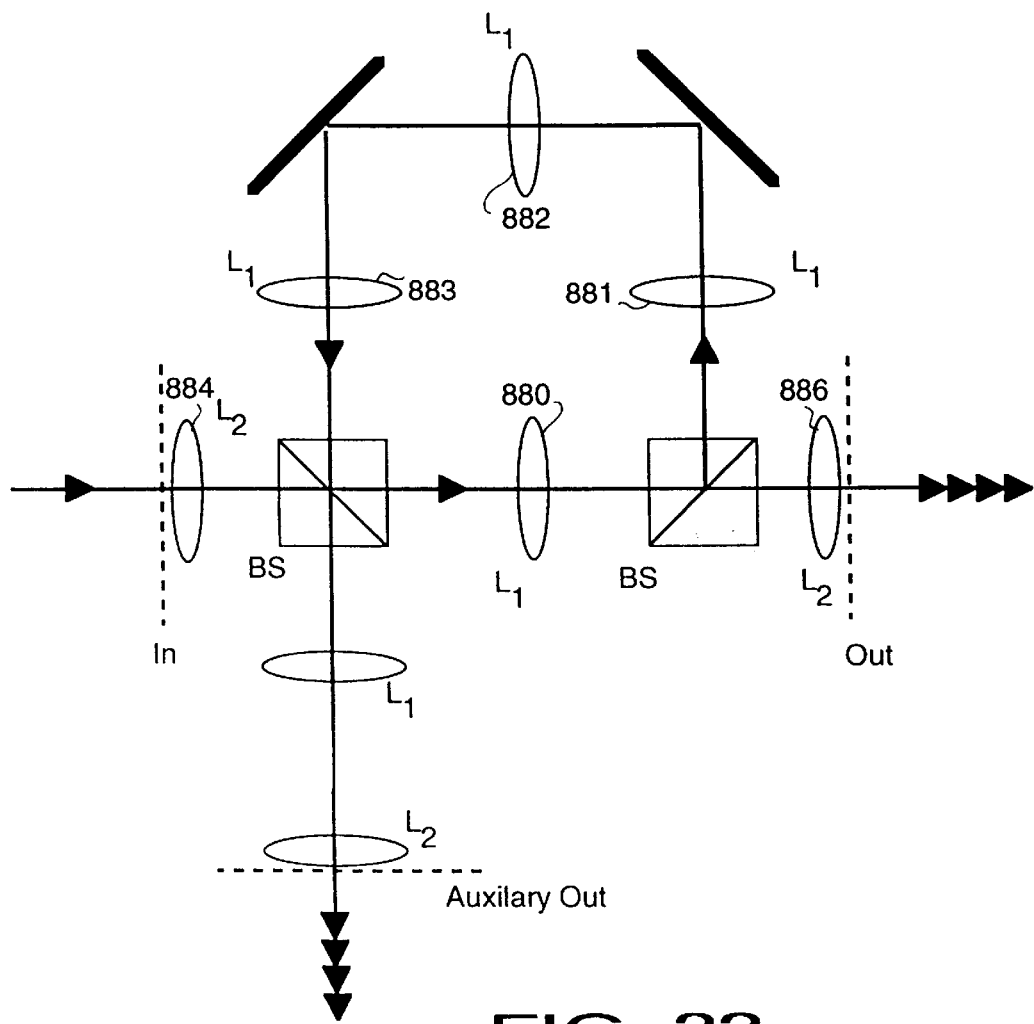
FIG. 22 shows a superimposing recirculating interferometer made without a delaying mirror by explicitly routing the beams into a circulating path using relaying optics.

FIG. 22 shows a recirculating superimposing interferometer made without a delaying mirror by explicitly routing the beams using relaying optics. Internal to cavity, the four lenses (880, 881, 882, 883) are chosen and positioned so that the magnification per round trip is exactly positive unity and the wavefront curvature is preserved per round trip. This is analogous to taking the relay system of FIG. 20B and making it into a circle by butting up the two end lenses 820 and 828 together. In this embodiment the four internal lenses have the same focal power $F_1$. The external lenses 884 and 886 help couple collimated external beams into/out of the cavity and have a focal length $L_2$ twice as long as $L_1$.

13. Zero Delay Applications of Superimposing Interferometers

Figure 23A:
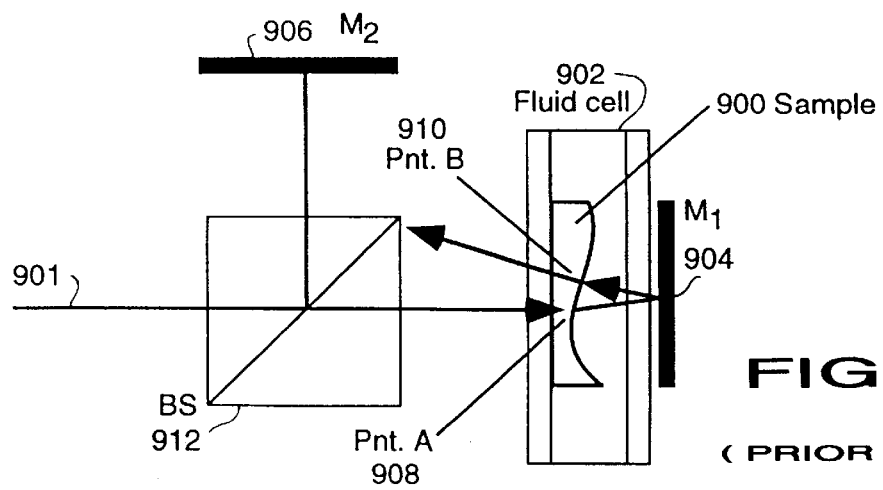
FIG. 23A shows how rays do not pass through the same spot in a irregular sample if the mirror of a conventional zero-delay Michelson is not close to the sample surface.

Although we have been primarily discussing interferometers having non-zero delays, interferometers having zero or near zero delay are also useful for position or thickness measuring applications. A superimposing interferometer is useful in these applications, particularly when a mirror needs to be placed internal or at the surface of an object when this is physically impossible or difficult with a conventional interferometer. FIG. 23A shows an application where a mirror surface would ideally be placed internal to an object, in this case a fluid cell 902 which contains a transparent sample 900 whose profile is to be measured interferometrically via transmission through the whole cell. The illuminating light incident along ray 901 may be chosen to have a low coherence length so that the zeroth fringe can be unambiguously determined. In this case, it is necessary to match the lengths of the two arms, between the beamsplitter 912 and mirror 906, and between beamsplitter 912 and mirror 904. If the sample 900 has an irregular surface profile it will deflect the rays through refraction. If the mirror 904 is not close to the surface of the sample, then a ray passing through point A (908) will not pass through the same point A after reflecting from the mirror 904. This can blur the measurement, since the light essentially samples two different places on the sample, points A (908) and point B (910).

Ideally, the mirror $M_1$ (904) should be as close to the sample's surface as possible, but this may not be practical because of the windows of the fluid cell.

Figure 23B:
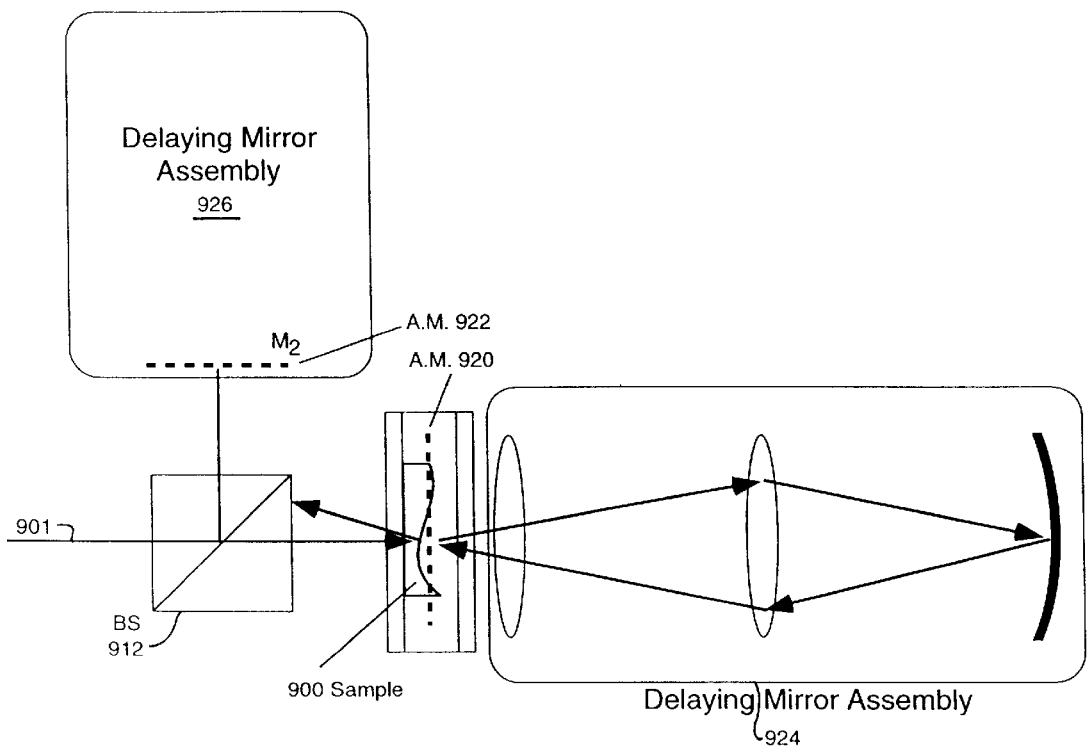
FIG. 23B shows how a delaying mirror can be used in a zero-delay Michelson to make rays pass through the same spot on an irregular sample.

A solution to this problem is to use a superimposing interferometer, such as shown in FIG. 23B. The use of at least one delaying mirrors allow the apparent mirror 920 of the delaying mirror assembly 924 to be placed internal to the fluid cell next to the irregular sample surface 900, because it is not a physically real surface. This way, the light reflecting from the A.M. 920 passes close to the same place on the sample surface that it passed incident toward the A.M. The A.M. should be in front of the elements that comprise the delaying mirror assembly. This can be done with a real imaging system by choosing the focal lengths and positions of the elements appropriately. For example, in the chart of FIG. 8A at a center lens position of 160 cm, the apparent mirror is in front of the field lens.

The zero or near-zero delay is achieved by using another delaying mirror 926 in the other arm having a matching delay, as in the differential interferometer configuration. If long coherence length illumination is used, then the second delaying mirror 926 is not required. Instead, an actual mirror could be placed at the position $M_2$ (922). In all cases, it is optimal to superimpose the two mirror surfaces 922 and 920 in partial reflection of the beamsplitter 912.

14. Electrical Circuit Equivalent

Figure 24A:
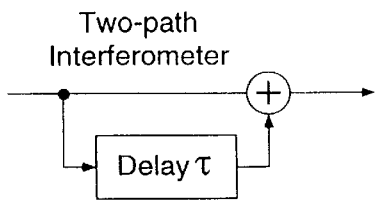
FIG. 24A is an electrical equivalent of a generic two-path interferometer.
Figure 4C:
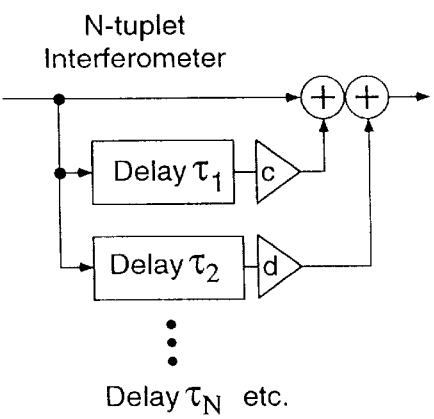
Figure 24B:
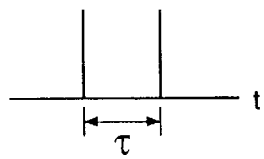
FIG. 24B is an impulse response for a two-path interferometer.

FIG. 24A shows the "electrical circuit" representation of a two-path superimposing interferometer, meaning that only the temporal behavior is represented and not the ray paths. FIG. 24B shows the impulse response of the optical field. Generally, the spectral behavior of an interferometer is obtained by Fourier transforming its impulse response. Since the superimposing interferometer can generate the same impulse response for all the incident rays, the spectral properties can be uniform for the whole beam. In contrast, the impulse response of a non-superimposing interferometer is the same as a superimposing kind only for the rays traveling exactly down the optic axis of the non-superimposing interferometer. That is, the superimposing interferometer has a fringe which could be infinitely wide and corresponds to the finite diameter center fringe (in a system of fringe rings) of a non-superimposing interferometer. The advantage of the superimposing interferometer is the ability to make the fringe infinitely wide if desired, or into a uniformly parallel comb of fringes, and be limited to a system of fringe rings with a periodicity set by the delay value.

Figure 24D:
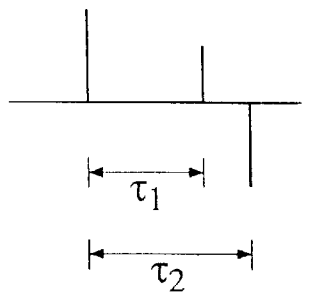
FIG. 24D is an example impulse response for a 3-path interferometer.

For FIG. 24A, a single applied pulse generates two output pulses separated by a delay $\tau$. FIG. 24C illustrates an interferometer with more than 2 paths, which could be called a N-tuplet interferometer with N representing the number of paths. For each path beyond the first, a delay is added in parallel to the circuit. The impulse response for FIG. 24C has one spike for each of N paths. FIG. 24D shows the case when N is three. In some applications the output spikes could be separated by different delay intervals.

A Michelson interferometer usually has just two arms and so is described by FIG. 24A. If an additional beamsplitter is now added to one of the arms (such as FIG. 26A), splitting it, then we essentially have 3 arms. This can be a 3-path interferometer described by FIG. 24C. Additional beamsplitters can be further added to any of these arms, creating more arms, and so on. The apparent mirrors or end mirrors associated with each arm could be made to superimpose. This is one method of creating an N-path superimposing interferometer with an arbitrary N. Another method is to use beamsplitters to explicitly route the beams along an N-path topology given by FIG. 24C. Relay lens systems can be used to superimpose the input/output planes of each path, as in FIG. 19A, so that the interferometer is superimposing. Any arbitrary number of paths N can be made. Combinations of the two methods are possible.

Figure 24E:
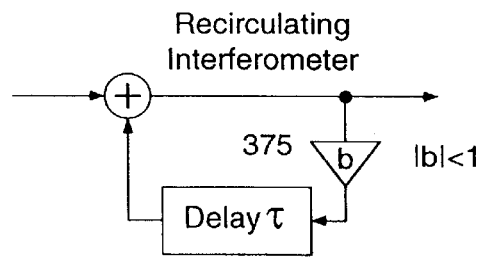
FIG. 24E is an electrical equivalent of a recirculating interferometer.
Figure 24F:
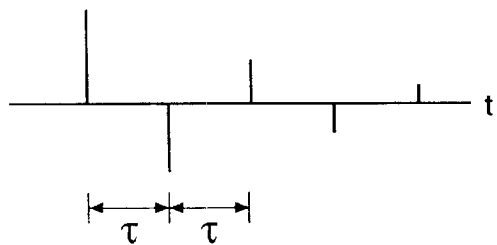
FIG. 24F is an example impulse response for a recirculating interferometer.

FIG. 24E shows the electrical equivalent to a recirculating interferometer. The factor "b" is a gain of an amplifier 375 which represents the loss per round trip incurred at the partial reflection of the mirrors or beamsplitters. The factor b has a magnitude less than unity, to represent loss. The impulse response (FIG. 24F) is an infinite geometric series of decreasing amplitude spikes, having an interval given by a round trip time $\tau$.

15. Two-Delay Interferometer

Figure 25:
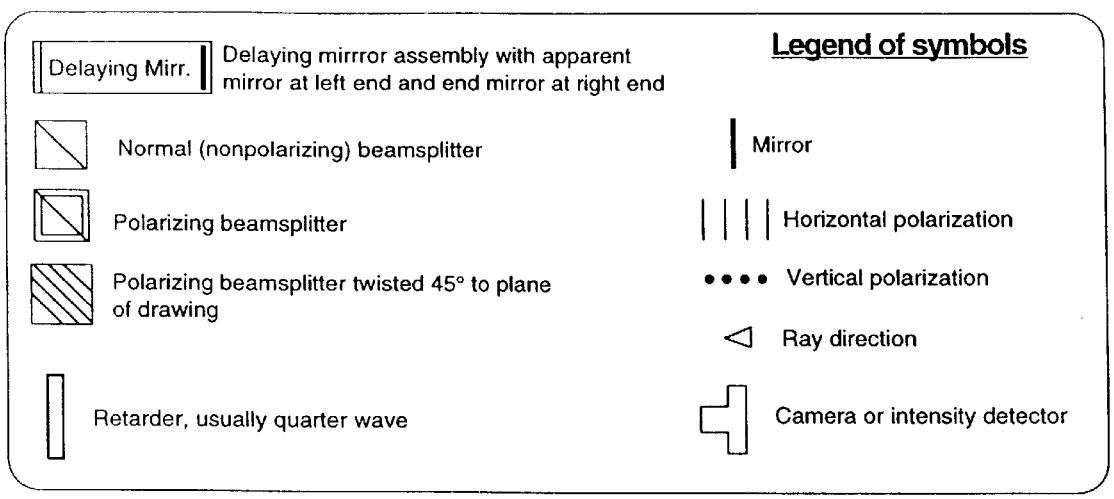
FIG. 25 is a legend of symbols.
Figure 26A:
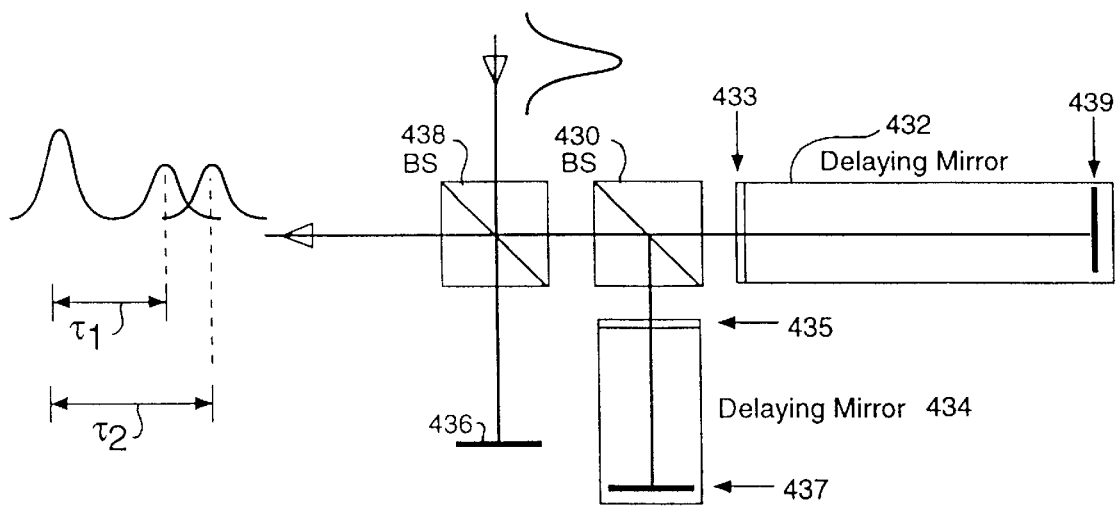
FIG. 26A shows a superimposing interferometer that imprints two echos having a different delay times.

A superimposing interferometer can be created having more than 2 arms by inserting additional beamsplitters into a Michelson, by using actual mirrors or delaying mirrors in each arm, and by superimposing all the apparent mirrors and end mirrors using the beamsplitters. FIG. 26A shows an embodiment which has a secondary beamsplitter in one arm, which splits the arm into two subparts, each which has a delaying mirror (432, 434). FIG. 25 is a legend of some symbols used. The apparent mirrors 433, 435 of each delaying mirror assembly superimpose the short arm end mirror 436 in partial reflection of the main beamsplitter 438. This creates a superimposing interferometer having two delay values, $\tau_1$ and $\tau_2$, which can be different.

The fringe pattern produced from a two delay interferometer is a combination of the separate fringe patterns from single delay interferometers having delay $\tau_1, \tau_2$ and $|\tau_1-\tau_2|$. This can be useful in velocity interferometry to reduce the ambiguity of a velocity determination, even when using one color. In other words, the velocity per fringe proportionality ($\lambda/2\tau$) is set by both the color and the interferometer delay. Having simultaneous measurements using different proportionalities can reduce the ambiguity of the velocity determination, and this can be achieved either by using simultaneously different colors or delays. It is possible, particularly when an inclined delay and short coherence light is used in an interferometer pair, to arrange for the place where fringes are visible for one delay to be where fringes are washed out for the other delays, so there is no confusion between overlapping fringe patterns.

Figure 26B:
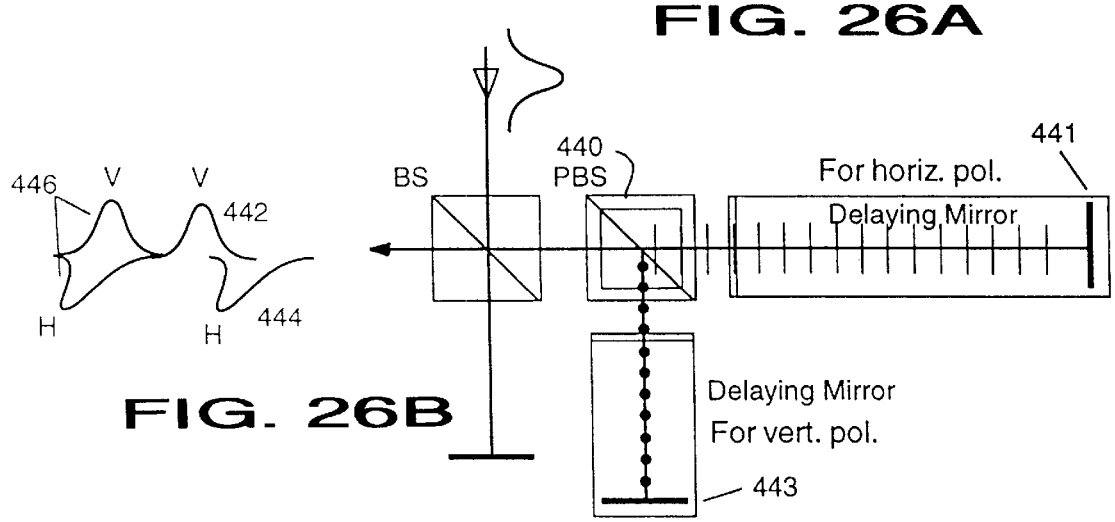
FIG. 26B shows use of polarizing beamsplitter to make a polarization dependent delay.

FIG. 26B is the configuration of FIG. 26A where the secondary beamsplitter 430 has been replaced by a polarizing beamsplitter 440. When the input beam has intensity in both horizontal and vertical polarizations, such as if it is polarized at 45°, then two echos 442 and 444 are outputted having orthogonal polarizations. The undelayed output pulse 446 has its original polarization. This is a method of distinguishing the two different delays of a two-delay interferometer so that the associated fringe patterns don't confuse each other. The fringe patterns share the same output path but are distinguishable by polarizers placed before the detectors. This could be useful in a Fourier Transform spectroscopic application, by measuring two delays at once to help distinguish output fluctuations due to common mode intensity fluctuations from the desired fluctuations due to spectral character. The end mirrors 441, 443 can be tilted independently to produce a fringe comb with a different spacing for different polarization.

Figure 26C:
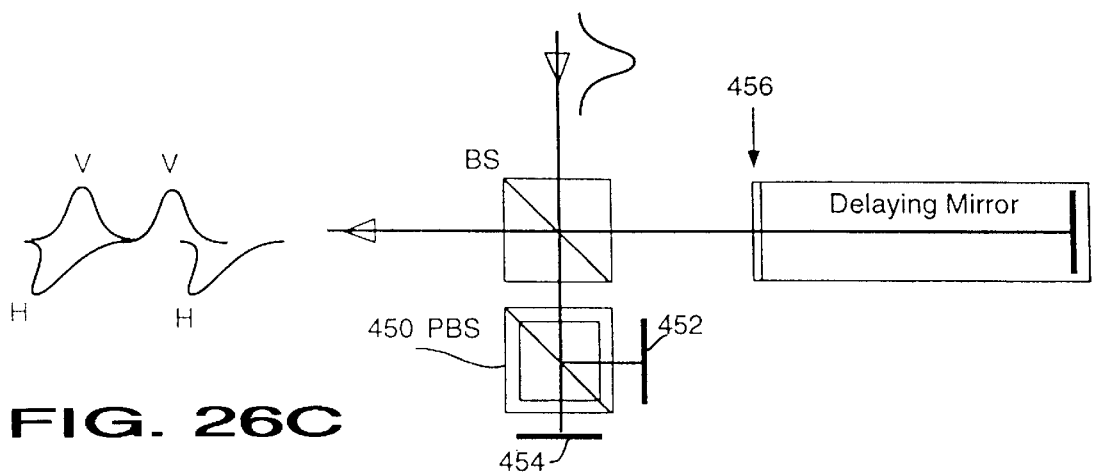
FIG. 26C shows a configuration producing polarization dependent delays that are only slightly different.

FIG. 26C shows another method of producing a polarization dependent delay value, where $\tau_1, \tau_2$ differ only slightly. The secondary polarizing beamsplitter 450 is placed in t he arm without the delaying mirror. This splits the short arm into two paths ending in two end mirrors 452, 454. These are nearly superimposed with the apparent mirror 456 of the delaying mirror assembly. Only small differences in the overlap between mirrors 452 and 454 can be tolerated, so only small differences between $\tau_1$ and $\tau_2$ are possible. Larger differences or inclinations can be achieved using etalons or wedges near the end mirrors 452, 454.

16. Delaying a Beam Using a Delaying Mirror

Figure 27A:
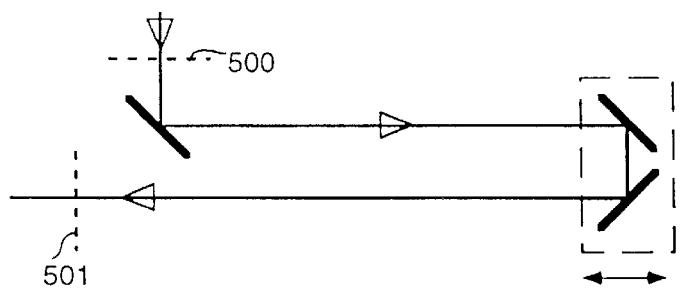
FIG. 27A shows a conventional adjustable length delay line.

Delaying mirrors have been discussed integral with their use in interferometers. However, they can be discussed as an independent element used to delay a beam. Other users may then use this element inside interferometers of their own design. For example, in stellar interferometers, the path lengths of the beams from satellite telescopes to a central station must be equalized coherently, before they can interfere. This is presently done without a delaying mirror by the design shown in FIG. 27A. These delays require parallel light to produce a coherent delay between input and output planes 500 and 501. Light from a telescope viewing an extended source may not be sufficiently parallel for the delay to be coherent. Delaying mirrors are useful because they can coherently delay any beam including an uncollimated beam, and this delay value may be adjustable.

Figure 27B:
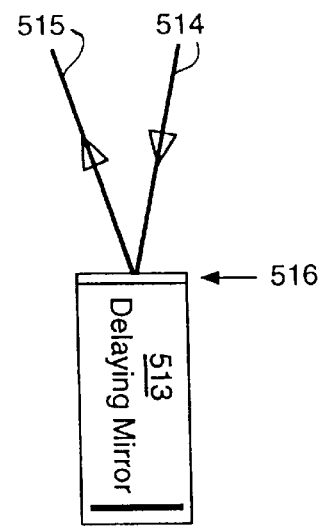
FIG. 27B shows an adjustable length delay using reflection from the apparent mirror of a delaying mirror.
Figure 27C:
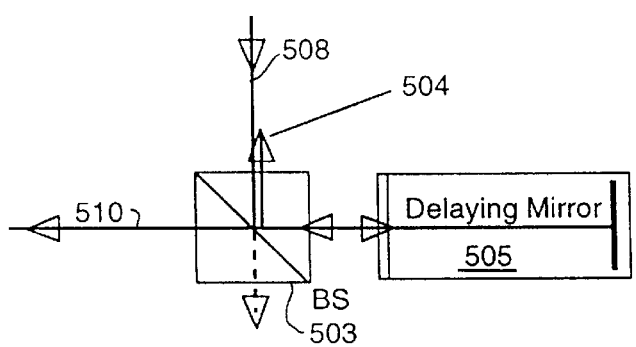
FIG. 27C shows an adjustable delay line implemented by a delaying mirror and a normal beamsplitter.
Figure 27D:
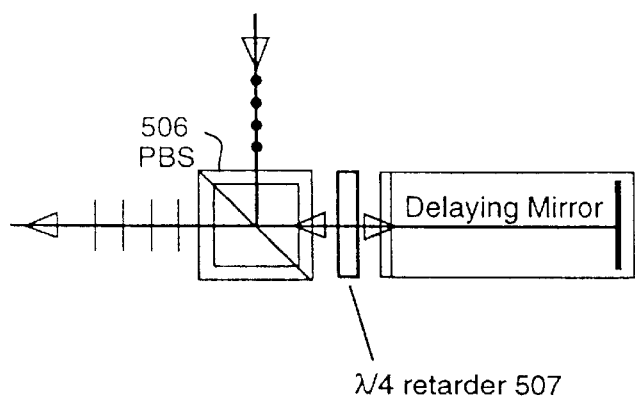
FIG. 27D shows a delay line with a polarizing beamsplitter and quarter wave retarder to avoid backward going beam.

An important practical concern is how to separate the input beam from the output beam reflected off the delaying mirror. FIGS. 26B, C and D show different methods. In general, the input and output planes are optimally placed at the A.M. of the delaying mirror. FIG. 27B shows the input 514 and output beams 515 distinguished by angle of incidence into the apparent mirror 516 at the beginning of the delaying mirror 513. The maximum practical angle of separation is determined by the details of the optics internal to the delaying mirror 513, such as the numerical aperture of the center lens, if real imaging is used. FIG. 27C uses non-polarizing beamsplitter 503 to separate a portion of the output beam 510 from the input path 504. The arrangement of FIG. 27D avoids the backwards output 504 by using a polarizing beamsplitter 506 (PBS) and a quarter wave retarder 507 with its axis rotated 45° to the vertical axis defined by the PBS. The light makes two passes through the retarder. This rotates the polarization by 90°, so that the path of the outgoing light is separated from incoming path by the PBS. The retarder 507 can be replaced by any optical element that rotates by 90° the polarization of light making a double pass, such as a prism assembly.

For delaying mirrors using real imaging, the delay time can be changed while holding the apparent mirror it creates fixed by moving the optics internal to the delaying mirror in a coordinated fashion analogous to the charts in FIG. 8 and 9. By keeping the apparent mirror fixed, the alignment of the external system using the delay is not disturbed while the delay value changes.

17. Superimposing Interferometer in Series with Spectrometer

It is useful to combine a superimposing interferometer in series with a chromatically dispersive spectrometer (such as prism or grating). This can enhance fringe visibility in spectroscopic and velocimetry applications because it prevents crosstalk between fringes of different wavelengths having different phases. The interferometer 726 can precede (FIG. 28A) or follow (FIG. 28C) the spectrometer 727. The advantage of using a superimposing interferometer instead of a non-superimposing interferometer, when combined with the spectrometer, is the ability to imprint a constant delay or a uniformly inclined delay with adjustable inclination across the spectrum.

Figure 28A:
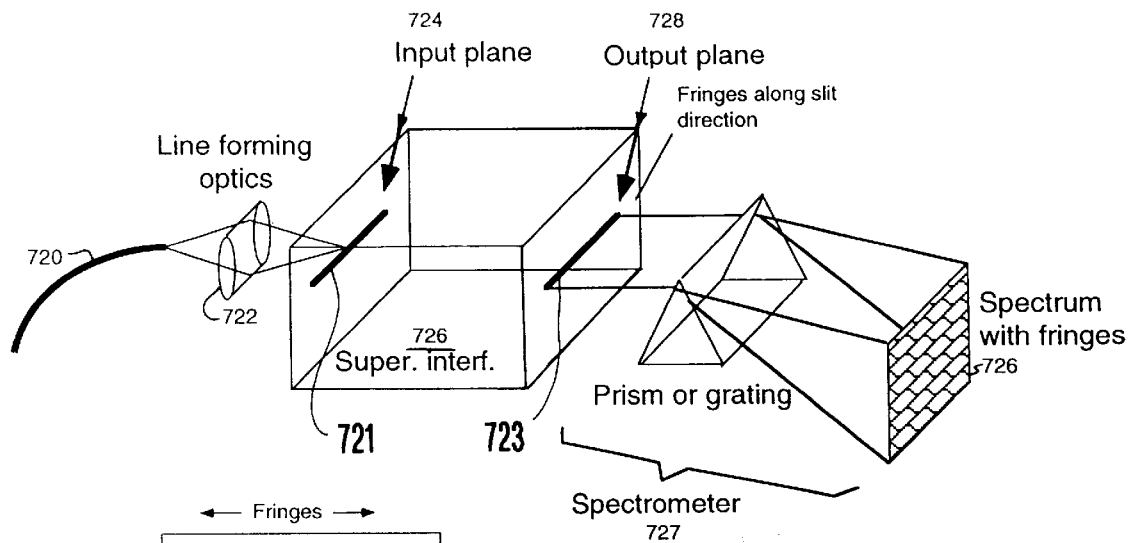
FIG. 28A shows a spectrometer following a superimposing interferometer chromatically dispersing the fringes.
Figure 28B:
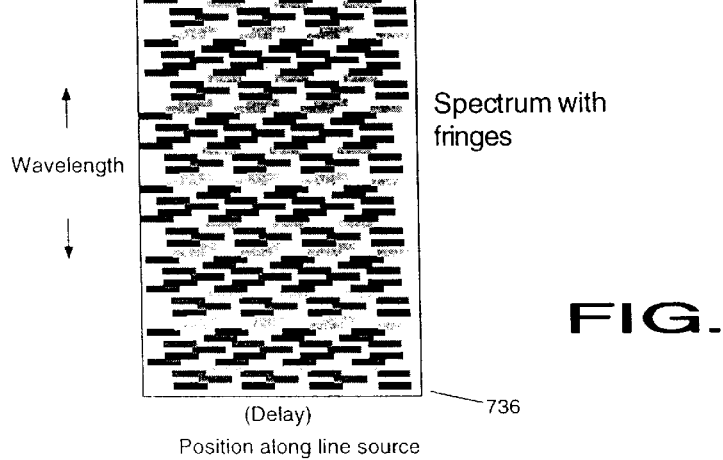
FIG. 28B is suggested appearance of a spectrum having fringes perpendicular to the wavelength axis.

FIG. 28A shows the interferometer 726 preceding the spectrometer 727. Since the spectrometer has a slit-like entrance pupil 723, the light passing through the interferometer should line-like in cross-section. If the source is an optical fiber 720, the light is formed into a line 721 by cylindrical optics 722, or by use of a fiber bundle where individual fibers are rearranged into a line. This line-like beam 721 is sent into the input plane 724 of the interferometer, leaves the interferometer at the output plane 728 and enters the spectrometer system slit 721 as a line-like beam having fringes. The spectrometer is represented by the prism symbol 732. The actual details internal to the interferometer and spectrometer are omitted. The spectrometer disperses the incident light perpendicular to the direction of the slit to form a rectangular spectrum 726. This spectrum could have fringes, as suggested by FIG. 28B.

The interferometer can imprint either a constant delay or a delay that varies rapidly across the slit-like length, so that periodicity of the fringes can be arbitrarily adjusted, and could be infinitely wide. In spectroscopy of sources that have a non-smooth spectrum, such as the absorption lines in sunlight or starlight, the fringes may vary in phase and amplitude from wavelength channel to channel. In velocimeter applications, where light from the detecting interferometer is dispersed by a spectrometer, then the fringes could form a systematically varying pattern versus wavelength and delay (position along the slit).

Figure 28C:
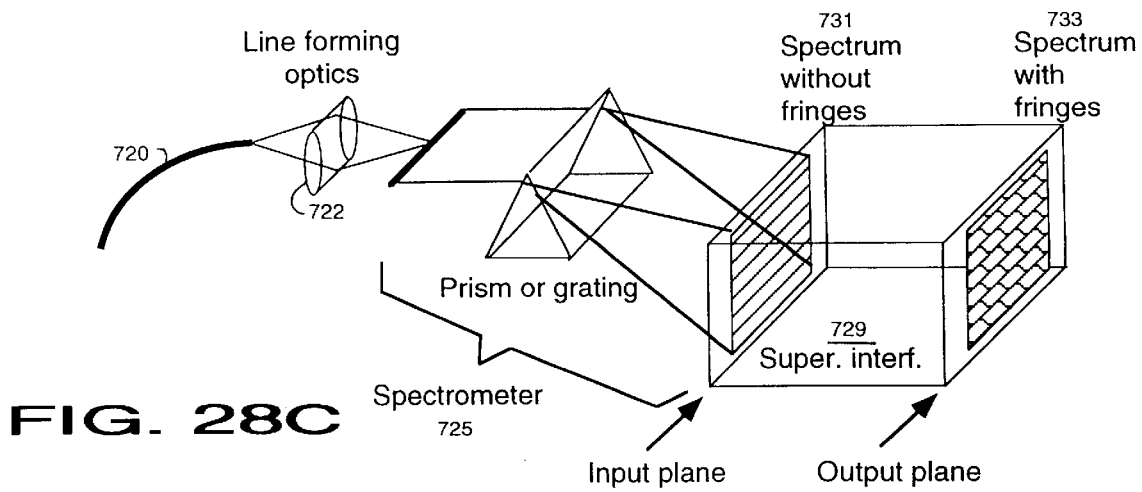
FIG. 28C shows a superimposing interferometer following a spectrometer imprinting fringes in any direction relative to the wavelength axis.

FIG. 28C shows the spectrometer 725 preceding the interferometer 729. In this case the spectrometer presents a rectangular spectrum as an input 731 to the interferometer. The interferometer passes this spectrum to its output image plane 733 while imprinting a fringe pattern on the spectrum. The orientation of the fringes could be in any direction relative to the wavelength axis, depending on which direction the inclined delay is made.

18. Double Superimposing Interferometer

A system of two superimposing interferometers in series having matched delays and dispersion characteristics is useful for Doppler velocity measurement and optical communications. FIG. 5A is a topological schematic of a double interferometer for a velocimeter application consisting of an illuminating interferometer 3 having delay $\tau_1$ and detecting interferometer 7 having delay $\tau_2$, with a target 5 interposed between the interferometers. When the delays match $\tau_1 \approx \tau_2$ within the coherence length of the source 1, partial fringes are produced in the detecting interferometer outputs 8, 9. The target displacement during the interval $\tau_1$, which is an average velocity, is proportional to the fringe phase shift by multiplying by $\lambda/2\tau$, for the typical case when the target-reflected light and illuminating light are anti-parallel. A change in refractive index along the optical path between the apparatus and the target will also produce a fringe shift analogous to target motion.

19. Optical Communication with a Double Superimposing Interferometer

When the target 5 is replaced by any arbitrary optical path which could be an optical fiber, an open beam, or a beam reflected off obstacles, communication can be achieved between the illuminating and detecting sides. The fringe phase in outputs 8, 9 can be modulated by varying $\tau_1$ slightly about its nominal value $\tau_1 \approx \tau_2$. Thus a message can be communicated, if the illuminating 3 and detecting 7 interferometers are matched in delay within a coherence length of the illumination, and matched in dispersion. (Delay dispersion is the variation of $\tau$ with wavelength.) If delay and dispersion are not matched, then significantly visible fringes are not produced. This has been discussed in the prior art using non-superimposing interferometers and called "coherence multiplexing".

Figure 5B:
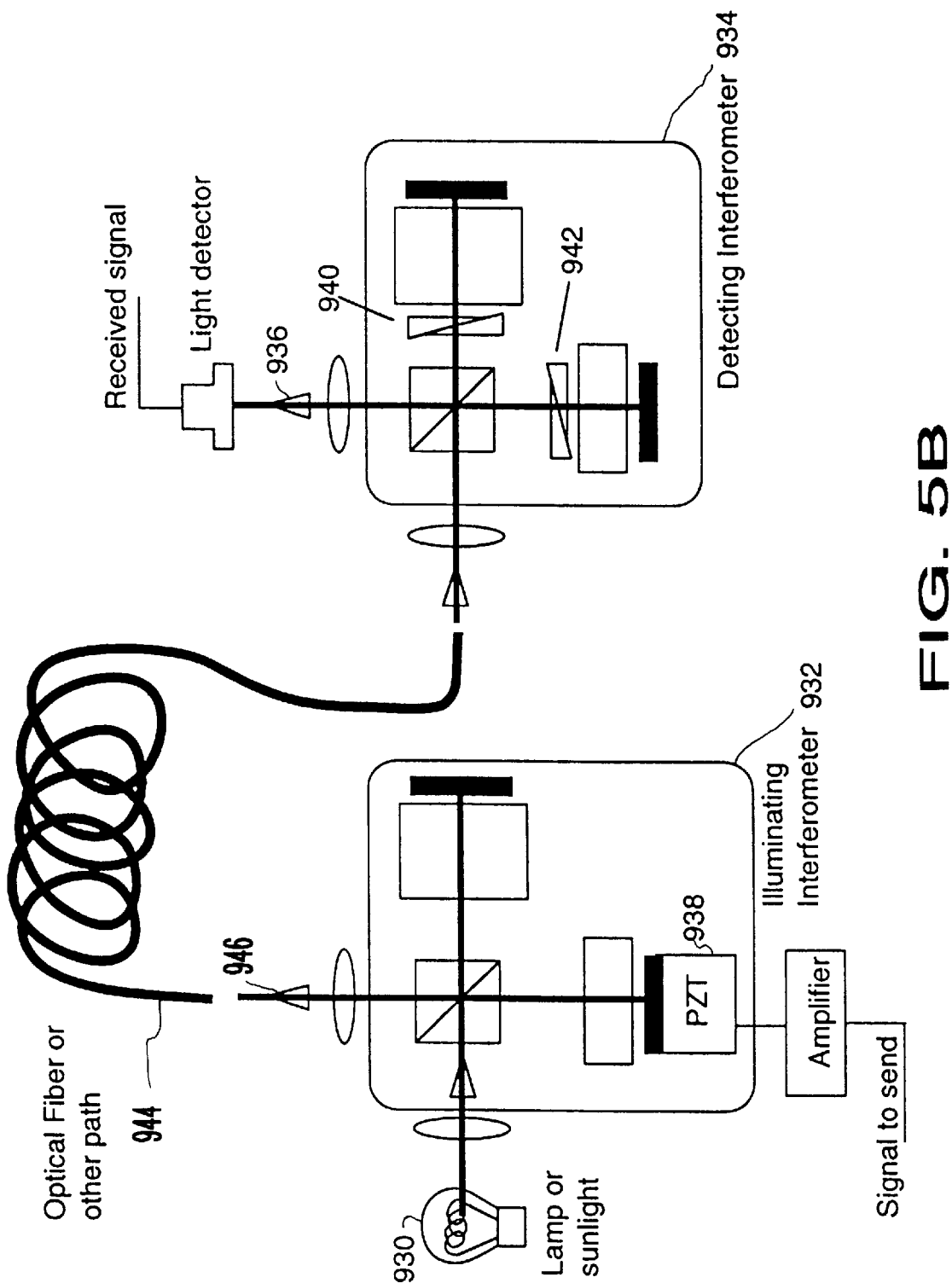
FIG. 5B is a double superimposing interferometer system capable of communication.

FIG. 5B shows an embodiment for optical communication. The use of superimposing interferometers gives the apparatus the useful ability to use any commonly available light source 930, such as a candle, an incandescent lamp or sunlight, and the ability to use a wide diameter optical fiber 944 or any imaging or non-imaging path, which can include reflection off buildings or other obstacles. The delay and dispersion of the illuminating 932 and detecting interferometer 934 are arranged to be matched. Optimally, when a non-imaging path 944 is used, there should be no inclination of the illuminating interferometer delay, so that all transmitted rays have the same imprinted delay. This way they can scramble together without blurring the imprinted delay.

The signal is sent by modulating the delay of the illuminating interferometer by a slight amount such as $\lambda/2$ so that a fringe shift is seen in the detected light of the detecting interferometer. Analog or digital signals could be sent depending on whether the fringe is smaller than or similar to $\lambda/2$; analog modulation would be easier with small phase changes. The delay could be modulated by a piezoelectric transducer 938. Alternatively, a mechanical means could be provided so that the pressure of a finger of the operator moves the mirror by a small amount comparable to $\lambda/4$.

By using sunlight, this is a means of communicating in the outdoors in an encrypted form using little or no electrical power, which could be useful for military or surreptitious applications. Only the intended recipient of the message will see fringes in the transmitted beam 946. Other viewers lacking the interferometer or lacking knowledge of the proper delay and dispersion will not detect a significantly visible fringe. Since the phase of the optical field is not possible to be recorded by conventional detectors (which only measure intensity) without the proper interferometer, it is not possible to record the coherence properties of the signal and then later analyze it for an encoded message. The signal must be detected in real time using an interferometer of the matching delay and dispersion.

Analogous to channels on a radio, if the receiving party does not use an interferometer with the matching delay and dispersive qualities, no fringes are seen and the light from the transmitter 932 appears innocuous. A variety of superimposing designs could be used for the interferometers 932 and 934. FIG. 5B shows use of achromatic etalons, as discussed in FIG. 15F, along with adjustable thickness etalons 940 and 942 to help match dispersion. Because the method of detecting the communication involves the coherence properties of the light, and not the intensity, it is possible to detect the communication even in the presence of extraneous light such as daylight. This could make the technique useful for surreptitious communication by shining the encoded beam on the side of a building where it would be hidden by virtue of combining inconspicuously with other natural light. The interferometers could be fashioned into a small portable case similar in size to an ordinary pair of binoculars. The interferometer pair would be matched initially before being separated and used "in the field". Since there is a large number of possible delays and dispersive qualities available to choose from, it would be unlikely that an unintended recipient could search for the delay and dispersion values during the short time that a message would be sent, thus providing the security.

20. Matching Delay and Dispersion in a Double Superimposing Interferometer

The advantage of using superimposing interferometers for a double interferometer systems is that this allows the source 1 to be broadband and extended, such as an incandescent or flash lamp. It allows the use of wide diameter optical fibers, other non-imaging conduits, or poorly imaging (out of focus or blurry) systems to conduct light between the target 5 to/from the detecting/illuminating interferometers. This can be a great practical advantage because the sources can then be inexpensive, lightweight, rugged, compact and consume much less electrical power than many lasers. Secondly, it allows a large depth of field (range of target motion) because strictly parallel light does not have to be maintained through the detecting interferometer.

Since the coherence length of white light is about 1.5 micron (a micron is 1/1000th of a millimeter), it can be tedious to achieve the matching condition $\tau_1 \approx \tau_2$ and the dispersion matching condition while simultaneously optimizing the superimposing overlap in both interferometers.

Figure 29A:
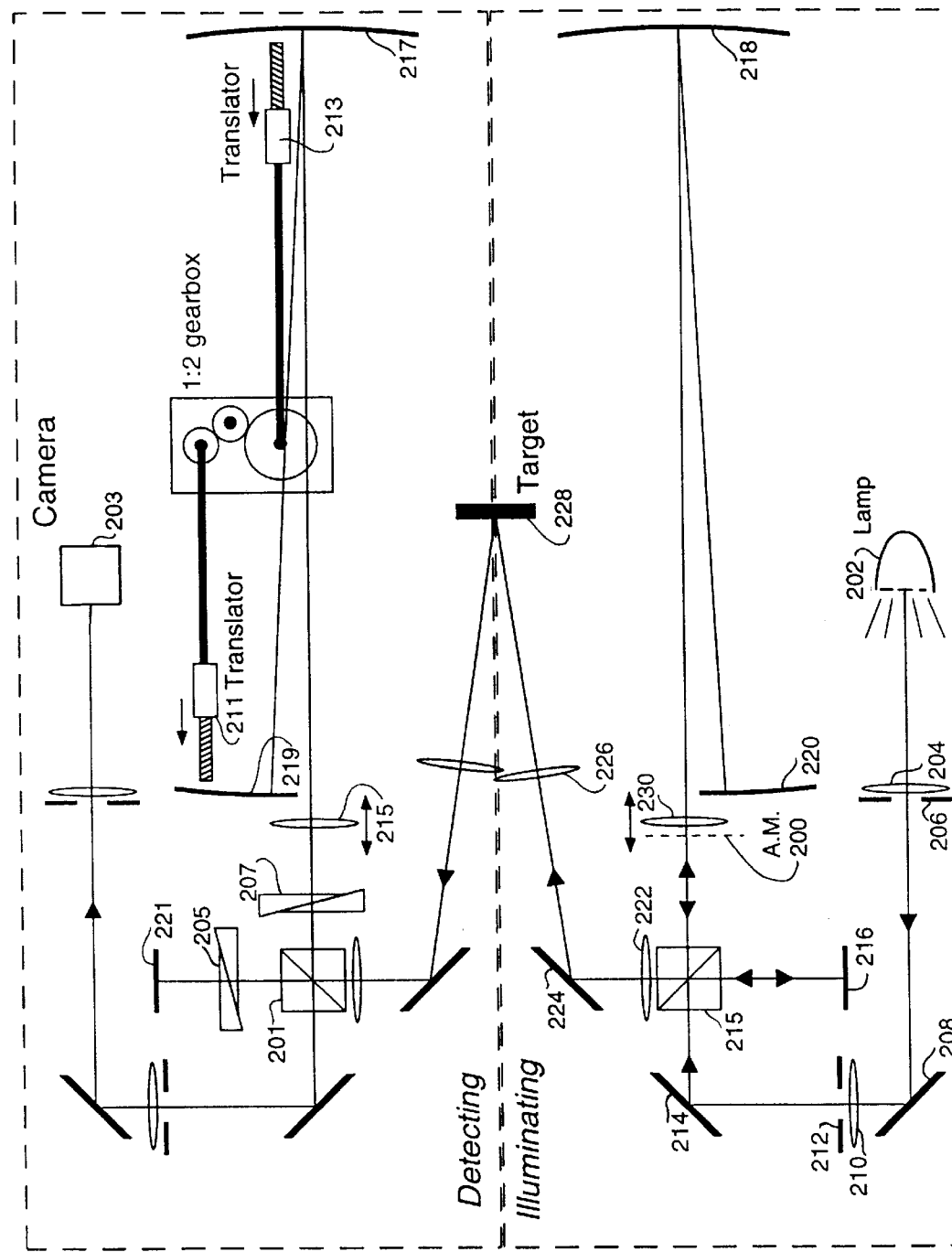
FIG. 29A shows a double superimposing interferometer with means for matching delay, dispersion while optimizing apparent mirror overlap.

FIG. 29A shows a double superimposing interferometer embodiment which can achieve this matching, using two superimposing interferometers of the type shown in FIG. 6B. The embodiment includes a target 228. Other targets more remote from the apparatus could be measured by relaying their image through a telescope to the plane 228. The apparatus of FIG. 29A can be used for other double interferometer applications such as communication by introducing a means for modulating the illuminating interferometer delay and substituting an optical conduit such as a fiber for the target 5.

The apparatus of FIG. 29A consists of two nearly identical halves; each is a superimposing interferometer system enclosed in dashed boxes and labeled "illuminating" and "detecting." The optics in the two halves are not required to be identical, but this makes it easier to match dispersive characteristics. Some parts that are not identical between the two halves include the lamp 202, which is replaced by a camera 203, and the adjustable thickness etalons 205 and 207, which are necessary in only one of the two interferometers. The gearbox or other means for translating the mirrors 217 and 219 in a 2:1 ratio is shown only in one half. The gearbox may also exist on the illuminating side instead of or in addition to being on the detecting side. Either gearbox is a convenience and are not required. Some duplicated optics are not labeled for clarity.

Figure 29B:
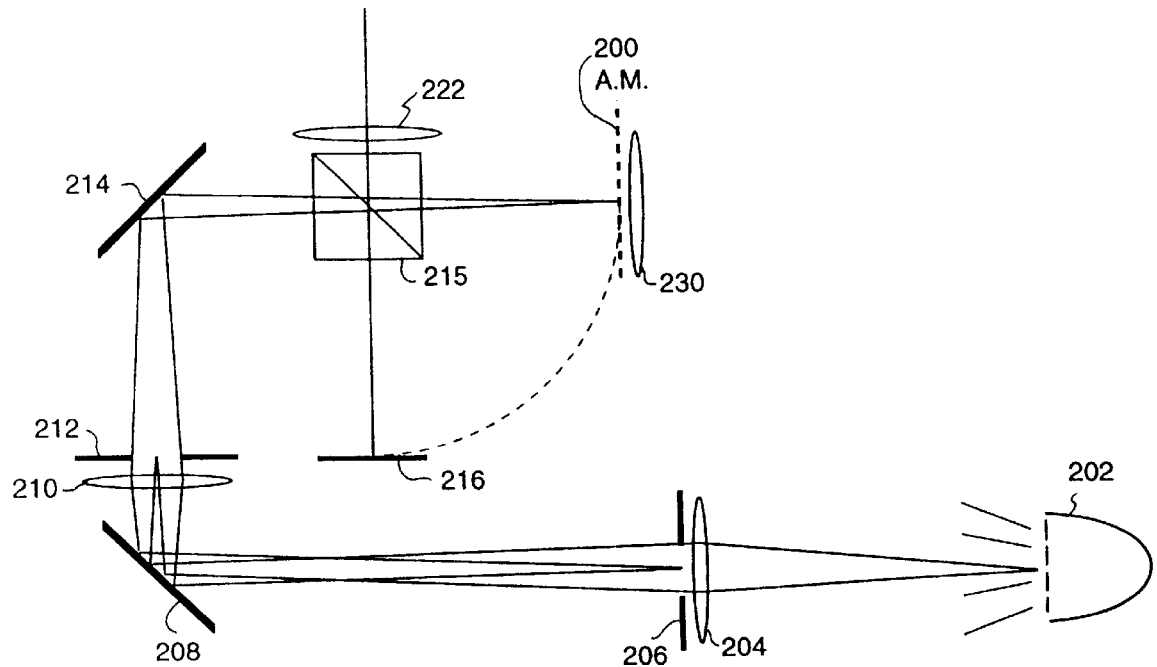
FIG. 29B details the subsystem in FIG. 29A conveying light from the lamp to the apparent mirror of the interferometer.

Each half enclosed in the respective dashed box consists of three subsystems: a subsystem conveying light between the lamp/camera and the interferometer; the interferometer; and a subsystem conveying light between the interferometer and the target. FIG. 29B shows the first subsystem in detail. An important purpose of this subsystem is to limit the range of ray angles (numerical aperture) and transverse extent of the beam passing through the interferometer by means of irises 206 and 212, so that none of the light is vignetted by mirrors 218, 216 or 220. That is, so that every ray of the beam passes through each of the arms, so that there is no unequal vignetting of the different paths that would let rays travel through some paths but not others. This limiting can be accomplished either before or after the rays travel through the interferometer. Lens 204 images the lamp/camera 202 to iris 212. Lens 210 images iris 206 to the A.M. surface 200. Mirrors 208, 214 steer the beam to make the configuration more compact. Iris 212 controls the ray angle range, and iris 206 controls the width of the beam at the A.M. 200.

Some kind of numerical aperture limiting system should be included with every superimposing interferometer described in this document, unless the light source is known to have a limited numerical aperture less than the smallest numerical aperture of any interferometer arm.

Figure 29C:
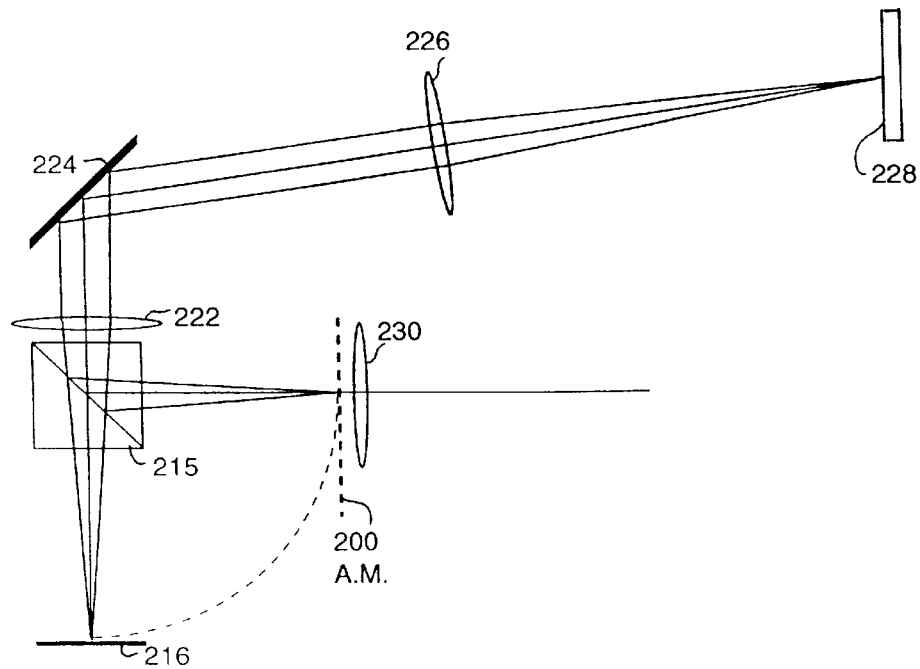
FIG. 29C details the subsystem in FIG. 29A conveying light between the apparent mirror of the interferometer and target.

FIG. 29C shows the subsystem conveying light between the interferometer and the target. Lens 222 and lens 226 together image the A.M. 200 to the target surface 228. Lens 222 is a field lens to reduce vignetting and should be as close to the A.M. surface as possible and yet be outside the interferometer cavity (so that it doesn't introduce wavefront distortion inside the cavity where it is critical). Thus, it lies close to the beamsplitter 215. Mirror 224 folds the beam to make the configuration more compact.

21. Matching Dispersion

Adjustable thickness etalons 205 and 207 are used to balance dispersion between the illuminating and detecting interferometers. Only one of the two interferometers needs to have its dispersion adjusted. One embodiment of a variable thickness etalon is the combination of two identical wedge prisms that slide against each other. A fluid filled parallel cavity is another method of creating a variable thickness etalon. One or more tiltable parallel glass plates at an angle to the beam, is a third method.

The source of the unbalanced dispersion is the variance in thickness of transmissive optics (lenses and beamsplitters) that are purchased off-the-shelf. This amount of unbalanced dispersion is usually equivalent to less than 1 millimeter of glass. Since a single thin glass etalon is not rigid and hard to polish flat, it is better to use two separate thick etalons 205 and 207 placed in opposite interferometer arms, so that their effects subtract from each other. For example, a 5 millimeter etalon and 4.8 millimeter etalon placed in opposite arms would have the same dispersion as a 0.2 millimeter etalon. This allows adjustable dispersion in the neighborhood of zero to be made.

It is optimal that the adjustment of the effective etalon length does not change the angle or position of the beam from one arm compared to the other, because that could degrade alignment of the interferometer. Thus the etalons should be normal to the beam, and if tiltable etalons are used, their effect on the beam position needs to be considered.

22. Constant-delay Mirror Motion

To adjust the position of the apparent mirror without changing the interferometer delay, the center mirror 217 should be moved without changing the total path length from mirror 219 to mirror 217 to the beamsplitter 201. This requires moving mirror 217 half the displacement of the displacement of mirror 219. This can be done manually by incrementing the micrometer screws of the translators 211 and 213 in a 2:1 ratio, or done automatically by an electrical or mechanical means, such as a gearbox or a coordinated pair of stepper motors. After movement of mirrors 217, 219, the field lens 215 is adjusted to keep the A.M. flat. Since it is a transmissive lens, its adjustment does not change the time delay.

23. Matching Procedure

Due to the small (~1 micron) positional tolerance of the delay matching condition $\tau_1 = \tau_2$, the interrelation between the mirror positions, time delay, and A.M. position, the interrelation between the etalon thickness and time delay, and the weakness of the fringes when not under a perfectly matched and aligned state, the process of matching the two interferometers can be tedious if the correct procedure is not followed. The following procedure is recommended:

a) Using string and a ruler, to the nearest millimeter, position the optics of both interferometers to have the same delay lengths and be at the same calculated positions which will overlap the A.M. with the short arm mirror. (This adjustment will be called adjustment of longitudinal overlap.) Set the variable thickness etalons to have equal thickness in each arm of the detecting interferometer.

b) Use broad diameter HeNe laser illumination to focus the relay lens systems 230, 218, 220 and 215, 217, 219 to each produce a flat A.M. by producing parallel comb of fringes instead of rings.

c) Add neutral density fibers if necessary to balance the intensities between the two arms of each interferometer.

d) By moving the short arm mirrors 216 and 221, optimize the longitudinal overlap of each interferometer by the retro-reflection method described below. Confirm this with the stationary fringe method described below.

e) The delay $\delta_1$ of the illuminating interferometer is now set. For the remainder of the procedure, the illuminating interferometer optics will not be disturbed, only the detecting interferometer will be touched. Search for the matched delay condition $\delta_1 = \delta_2$, by changing the detecting interferometer delay until "white light" fringes are seen using a short coherence length source. The delay can be changed by movement of the short arm mirror 221. The temporary use of a sodium vapor lamp can help localize fringes to a few tenths of a mm. Initially, the fringes may be very weak due to uncompensated dispersion. The fringes are most visible when a fringe comb is presented instead of a single infinitely wide fringe. A fringe comb obtained by slightly tilting one of the mirrors, such as the short arm mirror 221. This can be done while temporarily observing fringes under HeNe illumination, since the HeNe fringes and the eventual white light fringes will have the same approximate appearance.

f) Null the dispersion. By viewing the white light fringes through a red color filter, and then through a green color filter, the delay location of the maximum visibility of the red and green fringe components is noted and compared. That is, scan the micrometer screw which changes the detecting interferometer delay $\delta_2$ until the red/green fringes are at maximum contrast and note the associated micrometer value. When uncompensated dispersion is present, the red and green maxima while lie at different locations. Change one of the etalon thicknesses slightly and remeasure the red/green maxima. Keep changing the etalon thickness until the red and green maxima overlap. This will also produce white light fringes with a minimum width and maximal visibility.

g) Re-optimize the longitudinal overlap in the detecting interferometer while keeping the delay constant. The short arm mirror is left fixed and mirrors 217 and 219 are moved in a 1:2 ratio to maintain constant path length between end mirror and beamsplitter, while changing the inter-mirror (217 to 219) separation. A chart analogous to FIG. 8B should be calculated to confirm that the configuration is not at a stagnant point. Confirm optimal overlap by the stationary fringe method.

24. Retro-reflecting Overlap Adjustment Subprocedure

The retro-reflecting method of optimizing the longitudinal overlap between the A.M. and the short mirror is as follows. A target is temporarily used which strongly retro-reflects light, such as a bead-painted surface. A 50% beamsplitter is inserted into the illuminating beam so that the temporary target can be observed in partial reflection off this beamsplitter. Iris 206 is reduced to a small pinhole to ease the light load on the eye, since a specular back-reflection of the lamp of the beamsplitter and mirror 216 will be in the same field of view as the white light fringes to be observed. The short arm mirror 216 is translated longitudinally several millimeters until white light fringe rings are seen which vary in size as a function of mirror position. The mirror is translated until the rings become infinite in diameter. This has empirically been determined to approximately produce optimal longitudinal overlap between the A.M. with the short arm mirror. Leave the mirror in this position. The beamsplitter and temporary target are then removed and the iris restored to its original size.

25. Stationary Fringe Overlap Adjustment Subprocedure

The stationary fringe method of confirming longitudinal overlap is as follows: an approximately collimated and wide diameter HeNe laser beam is used as a temporary source of illumination in place of the white light beam from lens 210. A temporary mirror may be inserted into the path after the iris 212 to introduce this HeNe beam. This temporary mirror is swiveled by hand while inspecting the fringe pattern produced on the target. In an aberrationless superimposing interferometer, when the longitudinal overlap is optimum, the fringe pattern is stationary despite tilting the angle of incidence of the input rays. In the presence of aberrations such as spherical or astigmatic, only the portion of the fringe at the center of the image area may appear stationary with respect to tilting of the temporary mirror, while the periphery changes somewhat. It is optimal that this stationary portion be as large as possible.

26. Retro-reflecting Interferometer as Double Interferometer

Instead of using two separate interferometer apparati, a single interferometer apparatus can function as a pair by sending light reflected from the target back through the same or nearly the same optics. This is called a retro-reflecting configuration, even though the light may actually travel a slightly different path than true retro-reflection (differing in angle, polarization or position in the image plane).

The retro-reflecting configuration provides a great practical advantage because the delays $\delta_1$, $\delta_2$ and the dispersion are then automatically nearly matched, even in the presence of large mechanical vibration that changes the delay. Thus this configuration is attractive for use in industrial settings where vibration is present. Secondly, a rigid optical platform and mounting hardware is not as important. This reduces cost and weight. Alignment is greatly simplified.

There are two kinds of light which must be distinguished from each other: first passed light and second passed light. The first passed light is light going through the interferometer for the first time and is used to illuminate the target. It does not carry any useful velocity information about the target. The second passed light is first passed light after it has reflected from the target and is going through the interferometer for the second time. It is the light which should be detected to produce fringe carrying target velocity information. There should be methods in place which prevent the first passed light from reaching the detector and being confused with the second passed light. Because the first and second passed light may be sharing portions of the same optical path, unwanted reflection from air/glass interfaces or dust on the optics may cause the first passed light to reach the detector. This is a concern, especially since the first passed light could be much brighter than the second passed light, especially for dark targets. Thus, methods for discriminating the two kinds of light are important to practical use of the retro-reflecting configuration.

Since any diffusely reflecting target will produce some light scattering back toward the source, any single interferometer, including single interferometers of a double interferometer system, can be used in a retro-reflecting mode if a means is provided to separate second passed light from first passed light. This is useful as a diagnostic tool in aligning each individual interferometer to achieve good superposition, prior to being used as a pair. This method was previously described in the section on pair-matching procedures.

There are several methods of distinguishing the second passed light from first passed in a retro-reflecting configuration by angle of incidence, by position in the image plane, and by polarization. These are discussed below.

27. Discrimination by Beam Angle

FIG. 30 shows use of beam angle to provide discrimination between first and second passed rays. The first passed rays are indicated by the open arrowheads and the second passed light by the dark arrowheads. Consider that for each pass, the interferometer offers two output paths. For the first passed light, the outputs are $Out_{1A}$ 540, which heads back approximately toward the source 541, and $Out_{1B}$ 542, which heading in the target 543 direction. For the second passed light originating at the target 543, the two outputs are $Out_{2A}$ heading exactly toward the source, and $Out_{2B}$ 544 heading only generally toward the target. The mirrors of each arm (short arm mirror 550 and the apparent mirror 552 of the delaying mirror assembly 554) are tilted so that light does not reflect normally off these mirrors. That is to say, the light reflecting off the mirrors 550, 552 makes two different spots 546, 548 where they intersect the beamsplitting surface 556. This puts the output 544 at a sufficiently different angle from the target beam to allow separation from it.

28. Discrimination by Polarization and Image Offset

Figure 31:
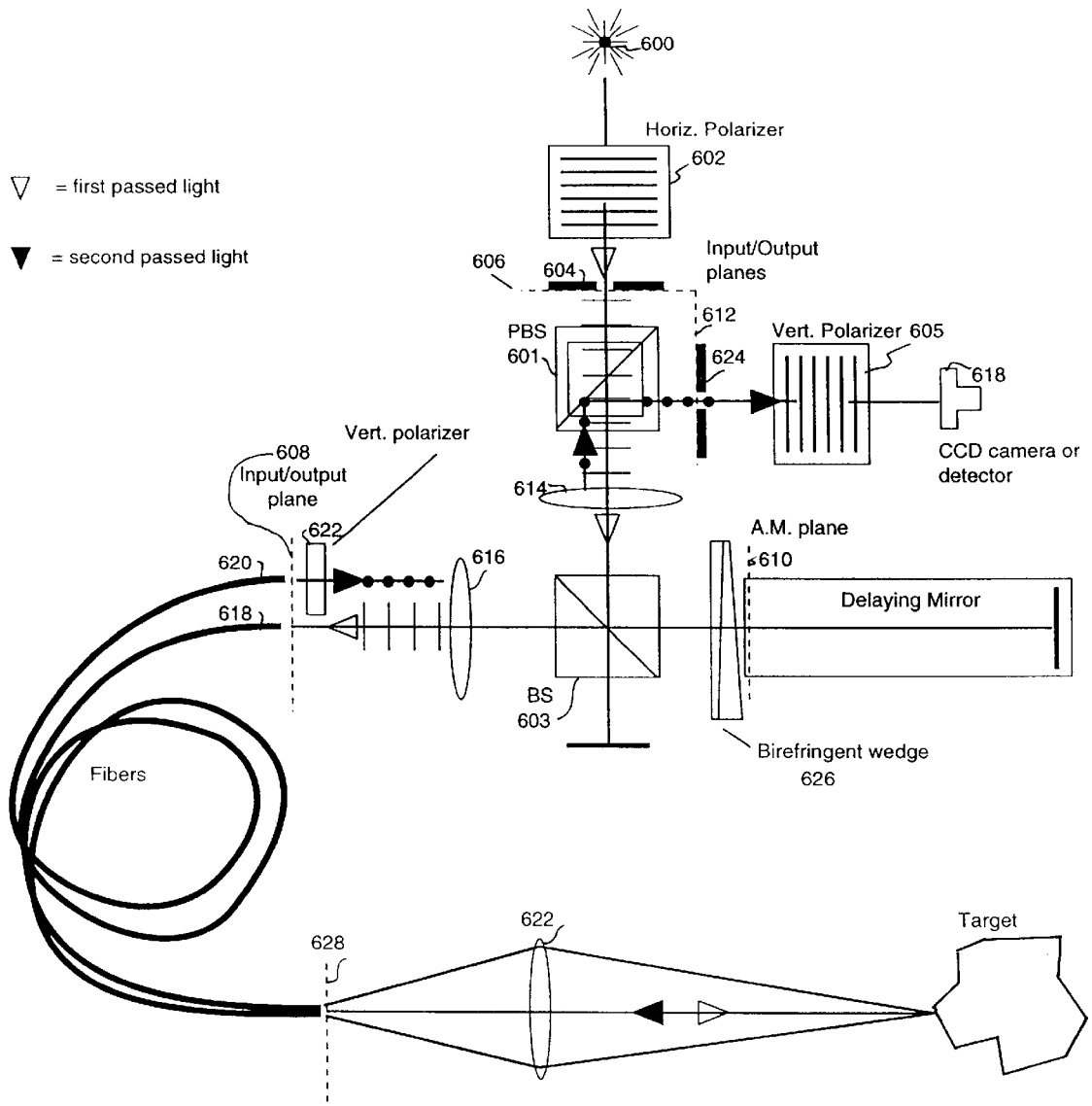
FIG. 31 shows use of offset images to separate double passed light from first passed light in a retro-reflecting application of an interferometer.

FIG. 31 shows a retro-reflecting superimposing interferometer embodiment using two methods of discrimination: polarization and image position, which could be used independently. Thirdly, a birefringent wedge is used to produce a inclined delay for the second passed light while the first passed light sees a uniform delay. Light from source 600 is horizontally polarized by polarizer 602 and passes through aperture 604 which defines the extent of the first passed light at the image planes 606, 608, 612 and the A.M. 610. These planes are all imaged to each other by lenses, such as 614, 616. Field lenses analogous to lenses 222 or 204 of FIG. 29A may optimally also be used, but are not shown in FIG. 31 for clarity. The field lenses could be placed near the image planes or near the beamsplitter to reduce vignetting.

A polarizing beamsplitter 601 transmits the first passed light, but reflects the second passed light, which will be arrange to be polarized in the orthogonal direction. The first passed light leaves the interferometer through input/output plane 608 to be conducted to the target either by an imaging, non-imaging or combination of imaging and non-imaging systems (618, 622).

FIG. 31 shows a combination of imaging and non-imaging systems. Fiber 618 conducts light to the target image 628 created by lens 622. Both fibers 618, 620 conduct light from the target due to intentional slight defocusing of the lens 522 between target surface and plane 628. However, in this embodiment the exactly retro-reflected light coming back through fiber 618 is not used, since spurious glare from the end of this fiber at plane 608 would compete with light from the target. (However, an anti-reflection coating could be used to reduce this.)

Instead, a second fiber 620 is used to conduct light back toward the interferometer. This way it can be positioned in a separate location in the input/output plane 608 from the first passed light beam, so that it can be distinguished by position. This is done by the use of an aperture 624 that is offset in location in reflection of the beamsplitter 601 so that it does not overlap with the aperture 604, so that aperture 624 blocks first passed light reaching the detector.

In addition to discrimination by position in the image plane, the light can be discriminated by polarization. The fiber 620 is twisted 90° so that there is significant intensity in the vertical polarization. (For long fibers, twisting may be unnecessary because of the polarization scrambling that occurs). The light then passes through a vertical polarizer to eliminate polarization parallel to the first passed light. If a purely imaging system is used which is unlikely to scramble or twist the polarization, then a retarder (not shown) can be inserted into the reflected light beam prior to the polarizer 622 to create significant intensity in the orthogonal (vertical) polarization. The polarizing beamsplitter 616 diverts the second passed light and not the first passed light toward the detector 618. A vertical polarizer offers additional polarization discrimination, in case the polarizing beamsplitter is not ideal.

29. Birefringent Wedge

A birefringent wedge 626 can be used to create an inclined delay for second passed light but not for first passed light, because it acts like a wedge for one polarization and a different wedge (or a wedge with zero angle) for the other polarization. When light travels to the target through a non-imaging system (the fiber), there must be a uniform delay imprinted to the light. Otherwise rays having different imprinted delay values differing more than $\lambda/4$ will scramble together, and no fringes may be produced when the target is subsequently observed through an interferometer. However, for the second passed light an inclined delay is possible, since the interferometer uses imaging systems so that pixels between the input/output planes are not scrambled.

An inclined delay is useful for determining fringe phase by recording the fringe comb with a multi-channel detector, such as the CCD camera 618. When using an inclined delay, the source of the second passed light at the plane 608 should optimally be a line source so there is light at every delay value in a range. This could be created by use of cylindrical optics (not shown) or a fiber bundle whose component fibers rearrange from a circle to a line. The line direction would be into the Figure, perpendicular to the offset direction.

The birefringent wedge 626 appears as a parallel slab for first passed light (horizontal polarization) and a wedge for second passed light (vertical polarization). The net wedge can be constructed of component wedges 401, 412, as in FIG. 16, and the net wedge angle and birefringent properties adjusted by rotating the component wedges about the common optic axis.

30. Other Offset Target Image Methods

Figure 32A:
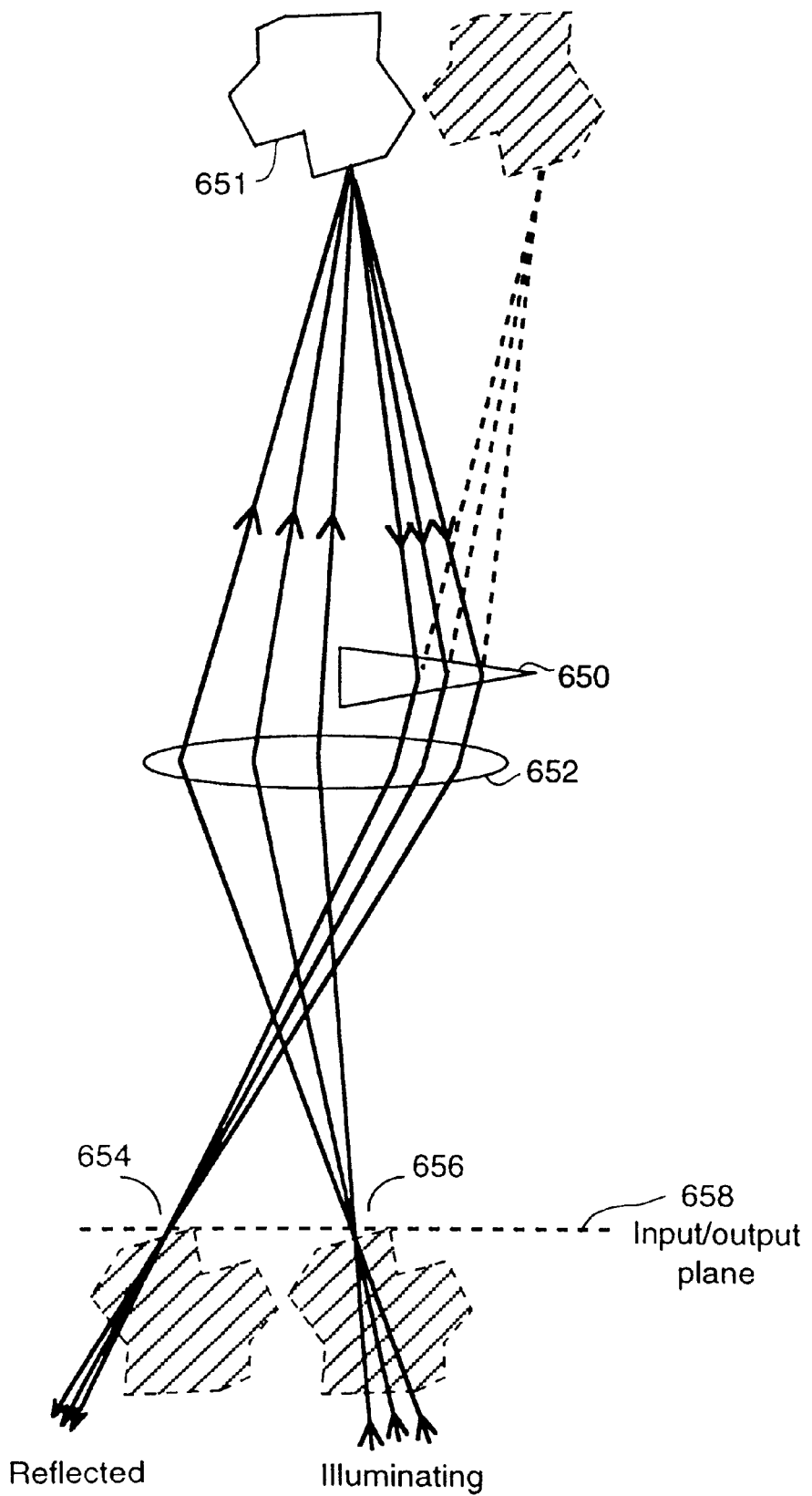
FIG. 32A shows use of a prism to create a double image of target to distinguish illuminating from reflected light.

In FIG. 31, distinctly different fibers were used to position input and output light in the image plane 608, so that first passed and second passed light could be distinguished by position. FIGS. 32A, B, C shows other methods of offsetting the incoming from outgoing light, by creating twin images of the target.

FIG. 32A shows a prism 650 overlapping a portion of the lens 652 which images the target 651 to the input/output plane 658. This plane could be the input/output of the interferometer 608 or the plane 628 where the fibers are placed. The latter case is a more light efficient method of sending light to fiber 620 without blurring the lens 622. The prism deviates the angles so the target appears in two places 656 and 654. One place is used for aiming the illumination, the other for aiming the collection of reflected light. Places 656 and 654 are analogous to where fibers 618 and 620 meet the plane 608 in FIG. 31.

Figure 32B:
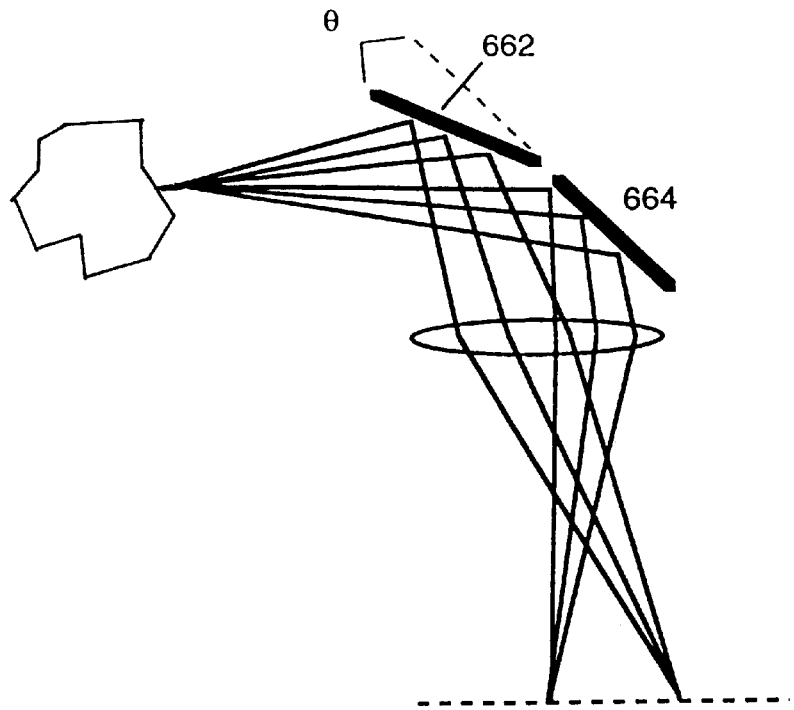
FIG. 32B shows use of a segmented mirror instead of prism in FIG. 32A.

FIG. 32B shows image offsetting accomplished by a segmented mirror with a nonzero angle $\theta$ between the segments 662, 664. This has the advantage over the method of FIG. 32A in that it is acromatic. (However, the chromatic blurring of prism 650 may be unimportant if a non-imaging system is used or if the target has a uniform velocity across its surface.)

Figure 32C:
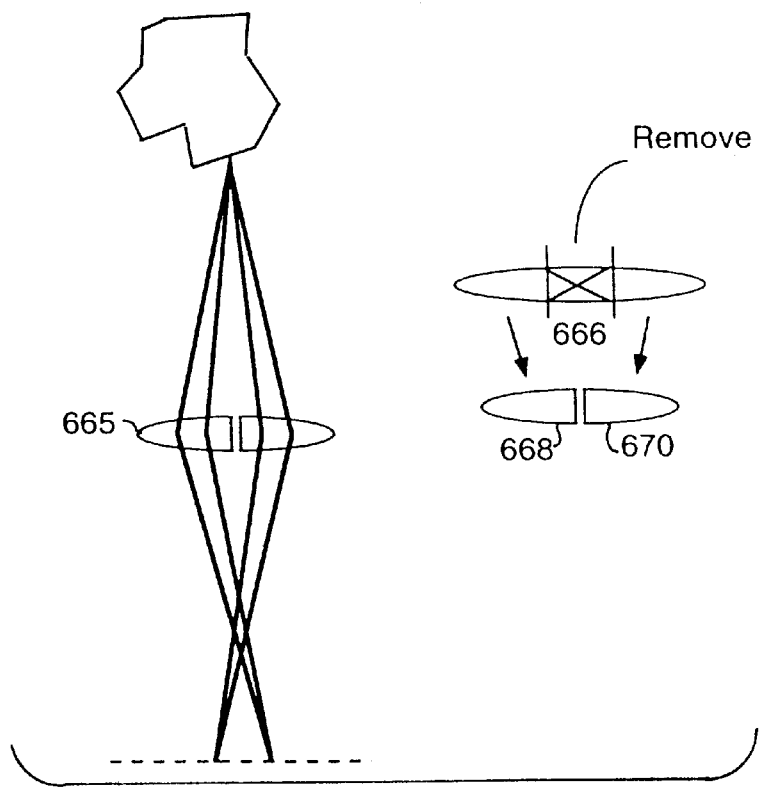
FIG. 32C shows use of a split lens instead of the prism in FIG. 32A.

FIG. 32C shows image offsetting accomplished by a segmented imaging lens 665, where the optical center of each lens segment are not co-axial with the others. This could be created conceptually by removing a rectangular section 666 from a lens and moving the separate segments 668, 670 together.

31. Kinds of Waves

For concreteness, light was discussed as the illumination wave kind. However, the interferometer and delaying mirror designs can be used with any wave kind which travels as rays in 2 or 3 dimensions, such as sound, electromagnetic waves (infrared, ultraviolet, x-rays etc.) or matter waves (de Broglie waves) provided elements that function analogous to the necessary beamsplitters, lenses and mirrors etc. are used.

Changes and modifications in the specifically described embodiments can be carried out without departing from the scope of the invention, which is intended to be limited by the scope of the appended claims.

What is claimed is:

1. An interferometer, comprising:
    means for splitting an input beam of light into a first beam of light and a second beam of light;
    means for producing a difference between the apparent and actual path lengths of said first beam, wherein said difference is called beam shortening;
    means for coupling said first beam of light out of said interferometer to produce a first output beam of light; and
    means for coupling said second beam of light out of said interferometer to produce a second output beam of light,
    wherein said first output beam of light and said second output beam of light superimpose to produce a superimposed beam, wherein an object in said input beam seen through the interferometer appears in both images which superimpose longitudinally, transversely and in magnification, wherein said means for producing a difference between the apparent and actual path lengths of said first beam comprise an apparent mirror, wherein said interferometer further comprises means for producing a difference between the apparent and actual path lengths of said second beam, wherein said means for producing a difference between the apparent and actual path lengths of said second beam comprise a second apparent mirror.

2. The interferometer of claim 1, wherein said first apparent or said second apparent mirror is formed by real imaging of an actual mirror.

3. The interferometer of claim 1, wherein the difference between the beam shortening of said first beam and the beam shortening of said second beam is small compared to the absolute value of either beam shortening.

4. The interferometer of claim 1, wherein said apparent mirror is formed by real imaging of a first actual mirror and said second apparent mirror is formed by real imaging of a second actual mirror.

5. An interferometer, comprising:
    means for splitting an input beam of light into a first beam of light and a second beam of light;
    means for producing a difference between the apparent and actual path lengths of said first beam using virtual imaging, wherein said difference is called beam shortening; wherein said virtual imaging is accomplished by a lens and a curved mirror;
    means for coupling said first beam of light out of said interferometer to produce a first output beam of light; and means for coupling said second beam of light out of said interferometer to produce a second output beam of light, wherein said first output beam of light and said second output beam of light superimpose to produce a superimposed beam, wherein an object in said input beam seen through the interferometer appears in both images which superimpose longitudinally, transversely and in magnification.

6. An interferometer, comprising:

means for splitting an input beam of light into a first beam of light and a second beam of light;

means for producing a difference between the apparent and actual path lengths of said first beam, wherein said difference is called beam shortening;

means for coupling said first beam of light out of said interferometer to produce a first output beam of light; and means for coupling said second beam of light out of said interferometer to produce a second output beam of light, wherein said first output beam of light and said second output beam of light superimpose to produce a superimposed beam, wherein an object in said input beam seen through the interferometer appears in both images which superimpose longitudinally, transversely and in magnification, wherein said means for producing a difference between the apparent and actual path lengths of said first beam comprise an apparent mirror, wherein said beam shortening is produced by imaging using a waveguide.

7. An interferometer, comprising:

means for splitting an input beam of light into a first beam of light and a second beam of light;

means for producing a difference between the apparent and actual path lengths of said first beam using at least one transparent wedge; wherein said difference is called beam shortening; wherein said at least one transparent wedge creates a beam shortening that varies across said first beam;

means for coupling said first beam of light out of said interferometer to produce a first output beam of light; and means for coupling said second beam of light out of said interferometer to produce a second output beam of light, wherein said first output beam of light and said second output beam of light superimpose to produce a superimposed beam, wherein an object in said input beam seen through the interferometer appears in both images which superimpose longitudinally, transversely and in magnification.

8. The interferometer of claim 7, wherein said at least one transparent wedge comprises a plurality of wedges, wherein each wedge of said plurality of wedges has a unique dispersive power with respect to the other wedges of said plurality of wedges, wherein the thickness of each wedge of said plurality of wedges is chosen so that the slope of said beam shortening versus location across said first beam is achromatic.

9. The interferometer of claim 7, wherein an etalon is placed in said second beam, wherein the thickness and dispersion of said etalon are chosen to compensate the wavelength dependence of the beam shortening created by said wedge.

10. The interferometer of claim 7, wherein said at least one transparent wedge comprises birefringent properties; wherein the slope of the beam shortening for one polarization of light may be different than for the orthogonal polarization; wherein a slope of beam shortening is a rate of change of beam shortening versus position across a beam.

11. The interferometer of claim 7, further comprising a means for producing a difference between the apparent and actual path lengths of said second beam.

12. The interferometer of claim 11, wherein said means for producing a difference between the apparent and actual path lengths of said second beam uses real imaging.

13. The interferometer of claim 11, wherein said means for producing a difference between the apparent and actual path lengths of said second beam uses virtual imaging.

14. The interferometer of claim 7, further comprising a second means for producing a difference between the apparent and actual path lengths of said first beam.

15. An interferometer, comprising:

means for splitting an input beam of light into a first beam of light and a second beam of light;

means for producing a difference between the apparent and actual path lengths of said first beam, wherein said difference is called beam shortening;

means for coupling said first beam of light out of said interferometer to produce a first output beam of light; and means for coupling said second beam of light out of said interferometer to produce a second output beam of light, wherein said first output beam of light and said second output beam of light superimpose to produce a superimposed beam, wherein an object in said input beam seen through the interferometer appears in both images which superimpose longitudinally, transversely and in magnification, wherein said means for producing a difference between the apparent and actual path lengths of said first beam comprise an apparent mirror, said interferometer further comprising means for producing a difference between the apparent and actual path lengths of said second beam, wherein said means for producing a difference between the apparent and actual path lengths of said second beam are selected from a group consisting of a second apparent mirror and at least one transparent wedge, wherein said at least one transparent wedge creates a beam shortening which varies across said second beam.

16. The interferometer of claim 15, wherein said at least one transparent wedge comprises a plurality of wedges, wherein each wedge of said plurality of wedges has a unique dispersive power with respect to the other wedges of said plurality of wedges, wherein the thickness of each wedge of said plurality of wedges is chosen so that the slope of said beam shortening versus location across said first beam is achromatic.

17. The interferometer of claim 16, wherein an etalon is placed in said first beam, wherein the thickness and dispersion of said etalon are chosen to compensate the wavelength dependence of the beam shortening created by said wedge.

18. An interferometer, comprising:

means for splitting an input beam of light into a first beam of light and a second beam of light;

means for producing a difference between the apparent and actual path lengths of said first beam using a first etalon, wherein said difference is called first beam shortening;

means for producing a difference between the apparent and actual path lengths of said second beam using a second etalon, wherein said difference is called second beam shortening; wherein the refractive properties of said second etalon over the operational wavelength range of said interferometer differ from refractive properties of said first etalon;

means for coupling said first beam of light out of said interferometer to produce a first output beam of light; and means for coupling said second beam of light out of said interferometer to produce a second output beam of light, wherein said first output beam of light and said second output beam of light superimpose to produce a superimposed beam, wherein an object in said input beam seen through the interferometer appears in both images which superimpose longitudinally, transversely and in magnification.

19. The interferometer of claim 18, wherein the thicknesses of said first etalon and said second etalon are chosen to minimize the wavelength dependence of net beam shortening; wherein said net beam shortening is the difference between said first beam shortening and said second beam shortening.

20. An interferometer, comprising:

means for splitting an input beam of light into a first beam of light and a second beam of light;

means for producing a difference between the apparent and actual path lengths of said first beam wherein said difference is called beam shortening;

means for beamsplitting inserted into either said first beam or said second beam to create a finite number of additional split beams; wherein said split beams are coupled out of said interferometer to produce additional output beams;

means for coupling said first beam of light out of said interferometer to produce a first output beam of light; and means for coupling said second beam of light out of said interferometer to produce a second output beam of light, wherein said first output beam of light and said second output beam of light and said additional output beams superimpose to produce a superimposed beam, wherein an object in said input beam seen through the interferometer appears in multiple images which superimpose longitudinally, transversely and in magnification.

21. The interferometer of claim 20, wherein said at least one means for beamsplitting are polarization dependent, wherein the polarization state among said said first output beam of light and said second output beam of light and said additional output beams may differ.

22. An interferometer, comprising:

means for splitting an input beam of light into a first beam of light and a second beam of light;

means for producing a difference between the apparent and actual path lengths of said first beam, wherein said difference is called beam shortening;

means for coupling said first beam of light out of said interferometer to produce a first output beam of light; and means for coupling said second beam of light out of said interferometer to produce a second output beam of light, wherein said first output beam of light and said second output beam of light superimpose to produce a superimposed beam, wherein an object in said input beam seen through the interferometer appears in both images which superimpose longitudinally, transversely and in magnification; and means for separating into distinct paths light incident upon a target from light returning from said target when said target is placed in the superimposed path of said first output beam and said second output beam; wherein said means for separating includes an optical system that creates a double image of a target, wherein each image of said double image of said target are transversely shifted as they appear to said interferometer output beam.

23. An interferometer, comprising:

means for splitting an input beam of light into a first beam of light and a second beam of light;

means for producing a difference between the apparent and actual path lengths of said first beam, wherein said difference is called beam shortening;

means for coupling said first beam of light out of said interferometer to produce a first output beam of light; and means for coupling said second beam of light out of said interferometer to produce a second output beam of light, wherein said first output beam of light and said second output beam of light superimpose to produce a superimposed beam, wherein an object in said input beam seen through the interferometer appears in both images which superimpose longitudinally, transversely and in magnification, wherein said interferometer further comprises at least one variable thickness etalon, wherein the amount of dispersion in said first beam relative to said second beam can be adjusted.

24. The interferometer of claim 23, wherein said means for adjusting the amount of dispersion comprises at least one variable thickness etalon.

25. The interferometer of claim 23, wherein said means for adjusting the amount of dispersion comprises at least one element selected from a group of wedge and etalon; wherein orientation of said at least one element relative to said first beam is changed thereby producing a changing pathlength through said at least one element.

26. The interferometer of claim 23, wherein said means for adjusting the amount of dispersion comprises a plurality of wedges; wherein orientation of component wedges of said plurality of wedges relative to each other is changed thereby producing a changing pathlength through said plurality.

27. An interferometer, comprising:

means for splitting an input beam of light into a first beam of light and a second beam of light;

means for producing a difference between the apparent and actual path lengths of said first beam, wherein said difference is called beam shortening;

means for coupling said first beam of light out of said interferometer to produce a first output beam of light; and means for coupling said second beam of light out of said interferometer to produce a second output beam of light, wherein said first output beam of light and said second output beam of light superimpose to produce a superimposed beam, wherein an object in said input beam seen through the interferometer appears in both images which superimpose longitudinally, transversely and in magnification, wherein said interferometer further comprises means for chromatically dispersing said superimposed beam, wherein said means for chromatically dispersing include means for directing said superimposed beam into multiple channels organized by wavelength.

28. An interferometer, comprising:

means for splitting an input beam of light into a first beam of light and a second beam of light;

means for producing a difference between the apparent and actual path lengths of said first beam, wherein said difference is called beam shortening;

means for coupling said first beam of light out of said interferometer to produce a first output beam of light; and means for coupling said second beam of light out of said interferometer to produce a second output beam of light, wherein said first output beam of light and said second output beam of light superimpose to produce a superimposed beam, wherein an object in said input beam seen through the interferometer appears in both images which superimpose longitudinally, transversely and in magnification, wherein said interferometer further comprises means for chromatically dispersing said input beam into a spectrum.

29. A double interferometer, comprising:

a source of illumination;

a first interferometer comprising:
 means for splitting an input beam of light into a first beam of light and a second beam of light;
 means for producing a difference between the apparent and actual path lengths of said first beam, wherein said difference is called beam shortening;
 means for coupling said first beam of light out of said interferometer to produce a first output beam of light; and
 means for coupling said second beam of light out of said interferometer to produce a second output beam of light,
 wherein said first output beam of light and said second output beam of light superimpose to produce a superimposed beam, wherein an object in said input beam seen through the interferometer appears in both images which superimpose longitudinally, transversely and in magnification, wherein delay between said first output beam and said second output beam is called delay 1;

a second interferometer comprising:
 second means for splitting a second input beam of light into a third beam of light and a fourth beam of light, wherein said second input beam of light comprises said superimposed beam;
 second means for producing a difference between the apparent and actual path lengths of said third beam, wherein said difference is called beam shortening;
 second means for coupling said third beam of light out of said second interferometer to produce a third output beam of light; and
 second means for coupling said fourth beam of light out of said second interferometer to produce a fourth output beam of light, wherein said third output beam of light and said fourth output beam of light superimpose to produce a second superimposed beam, wherein a second object in said second input beam seen through said second interferometer appears in both images which superimpose longitudinally, transversely and in magnification wherein delay between said third output beam and said fourth output beam is called delay 2; wherein said delay 2 approximately matches said delay 1 so that fringes are observed in second superimposed beam, wherein communication is transmitted from said first interferometer to said second interferometer by modulating said delay 1, which changes appearance of said fringes in said second interferometer.

30. A method of matching delay and dispersion of two interferometers of a double interferometer, comprising:

setting a first delay of a first interferometer and second delay of a second interferometer to be the same within a few millimeters by initial positioning of optical elements of said first interferometer and said second interferometer, wherein said first delay is called delay 1 and said second delay is called delay 2;

maximizing the longitudinal overlap of said first interferometer,;

maximizing the longitudinal overlap of said second interferometer,;

adjusting said delay 2 to match said delay 1, wherein a short coherence length illumination source is used to send a beam through said first interferometer which then passes through said second interferometer, wherein the visibility of fringes seen in said second interferometer are maximized while said delay 2 is adjusted by movement of optical elements of said second interferometer;

matching dispersion between said first interferometer and said second interferometer; wherein at least one variable thickness etalon is adjusted in thickness to minimize difference in location of the center of fringes for two different wavelengths of illumination, wherein said delay 2 is held constant; and maximizing longitudinal overlap of said second interferometer using a retro-reflective configuration, further comprising holding said delay 2 constant, wherein positions of optical elements of said second interferometer are moved in a coordinated schedule calculated to hold said delay 2 constant while adjusting said longitudinal overlap of said second interferometer.

31. A delay line comprising:

an input beam;

a beamsplitter which redirects some or all of said input beam of light into a new direction to produce a first beam of light;

means for producing a difference between the apparent and actual path lengths of said first beam of light using real imaging of a mirror, wherein said first beam of light is reflected from said apparent mirror to form a reflected beam; wherein said reflected beam has a path distinct from said input beam.

32. The delay line of claim 31, wherein said beamsplitter is polarization dependent; wherein said beamsplitter has enhanced reflectance for a specific state of polarization of said input beam and enhanced transmission for the complementary polarization state; further comprising a means for changing polarization of said reflected beam to enhance in said reflected beam the amount of intensity in said complementary polarization state.

* * * * *